(12) United States Patent
Shi et al.

(10) Patent No.: US 11,298,884 B2
(45) Date of Patent: Apr. 12, 2022

(54) ADDITIVE MANUFACTURING SYSTEMS AND METHODS OF PRETREATING AND ADDITIVELY PRINTING ON WORKPIECES

(71) Applicant: General Electric Company, Boston, MA (US)

(72) Inventors: Jinjie Shi, Mason, OH (US); Richard Roy Worthing, Jr., Liberty Township, OH (US); Hongqing Sun, Rexford, NY (US)

(73) Assignee: General Electric Company, Schenectady, NY (US)

( * ) Notice: Subject to any disclaimer, the term of this patent is extended or adjusted under 35 U.S.C. 154(b) by 227 days.

(21) Appl. No.: 16/434,384

(22) Filed: Jun. 7, 2019

(65) Prior Publication Data
US 2020/0384692 A1     Dec. 10, 2020

(51) Int. Cl.
*B33Y 10/00*     (2015.01)
*B29C 64/393*    (2017.01)
(Continued)

(52) U.S. Cl.
CPC .......... *B29C 64/393* (2017.08); *B29C 64/153* (2017.08); *B29C 64/268* (2017.08);
(Continued)

(58) Field of Classification Search
CPC ..... B29C 64/393; B29C 64/153; B29C 64/35; B29C 64/268; B29C 64/386; B29C 64/30;
(Continued)

(56) References Cited

U.S. PATENT DOCUMENTS

| 2,722,867 A | 11/1955 | Dackor et al. |
| 5,415,384 A | 5/1995 | Obrist et al. |

(Continued)

FOREIGN PATENT DOCUMENTS

| CN | 105598450 A | 5/2016 |
| CN | 107282923 A | 10/2017 |

(Continued)

OTHER PUBLICATIONS

European Search Report Corresponding to Application No. 20151670 dated Jun. 8, 2020.
(Continued)

*Primary Examiner* — Lawrence Averick
(74) *Attorney, Agent, or Firm* — Dority & Manning, P.A.

(57) ABSTRACT

Methods of additively printing an extension segment on a workpiece may include pretreating a workpiece-interface of a workpiece using an energy beam from an additive manufacturing machine, providing a pretreated workpiece-interface having received a pretreatment, with the pretreatment remediating an aberrant feature of the workpiece and/or the workpiece-interface. Such methods may additionally include additively printing an extension segment on the pretreated workpiece-interface using the energy beam from the additive manufacturing machine. Exemplary additive manufacturing system for printing an extension segment on a workpiece may include a controller operably coupled to a vision system and an additive manufacturing machine.

20 Claims, 34 Drawing Sheets

(51) Int. Cl.
   *B29C 64/153* (2017.01)
   *B29C 64/35* (2017.01)
   *B29C 64/268* (2017.01)
   *F01D 5/00* (2006.01)
   *B33Y 30/00* (2015.01)
   *B33Y 50/02* (2015.01)
   *B33Y 80/00* (2015.01)
   *B29L 31/08* (2006.01)

(52) U.S. Cl.
   CPC .............. *B29C 64/35* (2017.08); *F01D 5/005* (2013.01); *B29L 2031/08* (2013.01); *B33Y 10/00* (2014.12); *B33Y 30/00* (2014.12); *B33Y 50/02* (2014.12); *B33Y 80/00* (2014.12); *F05D 2230/80* (2013.01)

(58) Field of Classification Search
   CPC ....... B29C 64/314; B29C 64/20; F01D 5/005; B33Y 10/00; B33Y 30/00; B33Y 50/02; B33Y 80/00; B33Y 40/10; B33Y 50/00; B29L 2031/08; F05D 2230/80; G05B 2219/49008; G05B 2219/49023; G05B 19/4099; B22F 3/105; B28B 1/001
   See application file for complete search history.

(56) References Cited

U.S. PATENT DOCUMENTS

| | | | |
|---|---|---|---|
| 5,702,574 A | 12/1997 | Foster et al. | |
| 5,810,344 A | 9/1998 | Nishimoto | |
| 5,879,753 A | 3/1999 | Zajchowski et al. | |
| 5,913,555 A | 6/1999 | Richter et al. | |
| 6,161,826 A | 12/2000 | Forrer | |
| 6,401,000 B1 | 6/2002 | Suzuki et al. | |
| 6,435,596 B1 | 8/2002 | Phillips | |
| 6,449,529 B1 | 9/2002 | Oleksy | |
| 6,532,656 B1 | 3/2003 | Wilkins et al. | |
| 6,641,128 B2 | 11/2003 | Fries | |
| 6,895,350 B2 | 5/2005 | Suzuki et al. | |
| 6,908,288 B2 | 6/2005 | Jackson et al. | |
| 6,986,654 B2 | 1/2006 | Imiolek et al. | |
| 6,993,818 B2 | 2/2006 | Smith et al. | |
| 7,009,137 B2 | 3/2006 | Guo | |
| 7,034,246 B2 | 4/2006 | Muylaert et al. | |
| 7,261,550 B2 | 8/2007 | Herzog | |
| 7,357,629 B2 | 4/2008 | Weiskopf et al. | |
| 7,449,658 B2 | 11/2008 | Mielke | |
| 7,520,495 B2 | 4/2009 | Stark | |
| 7,587,818 B2 | 9/2009 | Gorman et al. | |
| 7,665,717 B2 | 2/2010 | Lenzini | |
| 7,674,107 B2 | 3/2010 | Perret et al. | |
| 7,790,096 B2 | 9/2010 | Merot et al. | |
| 8,056,606 B2 | 11/2011 | Hasz | |
| 8,801,502 B2 | 8/2014 | Ng et al. | |
| 8,875,392 B2 | 11/2014 | Richter | |
| 8,920,063 B1 | 12/2014 | Easley | |
| 8,996,156 B2 | 3/2015 | Melzer-Jokisch et al. | |
| 9,073,156 B2 | 7/2015 | Clark et al. | |
| 9,216,484 B2 | 12/2015 | Bishop et al. | |
| 9,283,593 B2 | 3/2016 | Bruck et al. | |
| 9,289,861 B2 | 3/2016 | Czerner | |
| 9,302,359 B2 | 4/2016 | Hediger | |
| 9,435,211 B2 | 9/2016 | Xu | |
| 9,452,474 B2 | 9/2016 | Xu | |
| 9,522,426 B2* | 12/2016 | Das .......................... B23P 6/007 |
| 9,555,522 B2 | 1/2017 | Evans et al. | |
| 9,884,393 B2 | 2/2018 | Roberts et al. | |
| 9,919,474 B2 | 3/2018 | Napadensky | |
| 9,943,933 B2 | 4/2018 | Zu et al. | |
| 10,035,223 B2 | 7/2018 | Ladewig et al. | |
| 10,086,481 B2 | 10/2018 | Krol et al. | |
| 2002/0104973 A1 | 8/2002 | Kerekes | |
| 2003/0214571 A1 | 11/2003 | Ishikawa et al. | |
| 2004/0191064 A1 | 9/2004 | Guo | |
| 2006/0107610 A1 | 5/2006 | Boserio | |
| 2007/0003416 A1 | 1/2007 | Bewlay et al. | |
| 2007/0077323 A1 | 4/2007 | Stonesmith et al. | |
| 2010/0028158 A1 | 2/2010 | Richter | |
| 2010/0044944 A1 | 2/2010 | Korn et al. | |
| 2012/0076578 A1 | 3/2012 | Schron, Sr. et al. | |
| 2012/0085875 A1 | 4/2012 | Hoyt et al. | |
| 2013/0136868 A1* | 5/2013 | Bruck ................... B23K 26/144 |
| | | | 427/554 |
| 2014/0023426 A1 | 1/2014 | Schron, Sr. et al. | |
| 2014/0163717 A1* | 6/2014 | Das .......................... G01J 5/004 |
| | | | 700/119 |
| 2014/0259668 A1 | 9/2014 | Henderson et al. | |
| 2015/0079306 A1 | 3/2015 | Schoeneborn et al. | |
| 2015/0165556 A1 | 6/2015 | Jones et al. | |
| 2015/0224607 A1 | 8/2015 | Bruck et al. | |
| 2015/0336271 A1 | 11/2015 | Spicer et al. | |
| 2016/0023403 A1 | 1/2016 | Ramos et al. | |
| 2016/0069184 A1 | 3/2016 | Ribic et al. | |
| 2016/0074965 A1 | 3/2016 | Jakimov et al. | |
| 2016/0121438 A1 | 5/2016 | Ladewig et al. | |
| 2016/0151859 A1* | 6/2016 | Sparks ................. B23K 26/034 |
| | | | 219/121.62 |
| 2016/0159011 A1 | 6/2016 | Marchione et al. | |
| 2016/0167172 A1 | 6/2016 | Goncharov et al. | |
| 2016/0250724 A1 | 9/2016 | Krol et al. | |
| 2016/0305777 A1 | 10/2016 | Racine et al. | |
| 2016/0318257 A1 | 11/2016 | Brooks et al. | |
| 2017/0009584 A1 | 1/2017 | Cui et al. | |
| 2017/0056975 A1 | 3/2017 | Carter et al. | |
| 2017/0106482 A1 | 4/2017 | Roberts et al. | |
| 2017/0120337 A1 | 5/2017 | Kanko et al. | |
| 2017/0165922 A1 | 6/2017 | Hakkaku | |
| 2017/0259502 A1 | 9/2017 | Chapiro et al. | |
| 2018/0038385 A1 | 2/2018 | Welch | |
| 2018/0056393 A1 | 3/2018 | Herzog et al. | |
| 2018/0079033 A1 | 3/2018 | Krueger et al. | |
| 2018/0111319 A1 | 4/2018 | Brezoczky et al. | |
| 2018/0200800 A1 | 7/2018 | Hart et al. | |
| 2018/0207875 A1 | 7/2018 | Menchik | |
| 2018/0236504 A1 | 8/2018 | Pourcher et al. | |
| 2018/0236556 A1 | 8/2018 | Garay et al. | |
| 2018/0236558 A1 | 8/2018 | Garay et al. | |
| 2018/0238172 A1 | 8/2018 | Garay et al. | |
| 2018/0238173 A1 | 8/2018 | Garay et al. | |
| 2018/0243866 A1 | 8/2018 | Srinivasan et al. | |
| 2018/0250772 A1* | 9/2018 | Symeonidis ........ B23K 26/0608 |
| 2018/0333813 A1 | 11/2018 | Hornbeck | |
| 2018/0348367 A1 | 12/2018 | Crear et al. | |
| 2019/0009472 A1 | 1/2019 | Mark | |
| 2019/0015899 A1 | 1/2019 | Chaput et al. | |
| 2019/0022760 A1 | 1/2019 | Coskun et al. | |
| 2019/0060998 A1 | 2/2019 | Kelkar et al. | |
| 2019/0072933 A1 | 3/2019 | Wu et al. | |
| 2019/0358755 A1 | 11/2019 | Ott | |

FOREIGN PATENT DOCUMENTS

| | | |
|---|---|---|
| DE | 29907262 U1 | 7/1999 |
| DE | 102011102543 A1 | 11/2012 |
| DE | 102010001414 B4 | 5/2013 |
| DE | 102012011217 A1 | 12/2013 |
| DE | 102013213260 A1 | 1/2015 |
| DE | 102017201994 A1 | 8/2018 |
| DE | 102018112248 A1 | 12/2018 |
| EP | 1637274 | 3/2006 |
| EP | 2848335 A1 | 3/2015 |
| EP | 3023177 A1 | 5/2016 |
| EP | 3159080 A1 | 4/2017 |
| EP | 3450058 A1 | 3/2019 |
| FR | 3054799 A1 | 2/2018 |
| GB | 2181374 A | 4/1987 |
| GB | 2453945 | 4/2009 |
| JP | 2009/056511 A | 3/2009 |
| JP | 2010/120104 A | 6/2010 |
| JP | 2016/532586 A | 10/2016 |
| JP | 2017/217674 A | 12/2017 |
| JP | 2018/001723 A | 1/2018 |
| WO | WO2015118180 A1 | 8/2015 |

(56) References Cited

FOREIGN PATENT DOCUMENTS

| WO | WO2016/075802 A1 | 5/2016 |
|---|---|---|
| WO | WO2017074373 A1 | 5/2017 |
| WO | WO2017/100695 A1 | 6/2017 |
| WO | WO2018145912 A1 | 8/2018 |

OTHER PUBLICATIONS

European Search Report Corresponding to Application No. 20151679 dated Apr. 2, 2020.
European Search Report Corresponding to Application No. 20151688 dated Mar. 30, 2020.
European Search Report Corresponding to Application No. 20151734 dated Apr. 2, 2020.
European Search Report Corresponding to Application No. 20151810 dated May 15, 2020.
European Search Report Corresponding to Application No. 20178188 dated Nov. 3, 2020.
International Search Report Corresponding to Application No. PCT/SG2019/050049 dated Mar. 27, 2019.
Machine Translated Japanese Office Action Corresponding to Application No. 2020010732 dated Jan. 19, 2021.
Machine Translated Japanese Search Report Corresponding to Application No. 2020010713 dated Nov. 18, 2020.
USAF C-5 Galaxy, as shown in Etsy desk model set (Galaxy). (Year: 2021).
U.S. Appl. No. 16/261,738, filed Jan. 30, 2019.
U.S. Appl. No. 16/261,936, filed Jan. 30, 2019.
U.S. Appl. No. 16/261,760, filed Jan. 30, 2019.
U.S. Appl. No. 16/261,827, filed Jan. 30, 2019.
U.S. Appl. No. 16/261,982, filed Jan. 30, 2019.
U.S. Appl. No. 16/262,031, filed Jan. 30, 2019.
U.S. Appl. No. 16/262,060, filed Jan. 30, 2019.
U.S. Appl. No. 16/262,088, filed Jan. 30, 2019.
U.S. Appl. No. 16/262,133, filed Jan. 30, 2019.
U.S. Appl. No. 16/261,861, filed Jan. 30, 2019.
U.S. Appl. No. 16/261,717, filed Jan. 30, 2019.
PCT Application Serial No. PCT/SG2019/050049 Filed Jan. 30, 2019.
Mitee-Bite Products, LLC, Workholding Specialists, Aug. 2017 Catalog, 52 Pages.
Jones et al., Remanufacture of turbine blades by laser cladding, machining and in-process scanning in a single machine, Proceedings from $23^{rd}$ Annual International Solid Freeform Fabrication Symposium, Aug. 16, 2012, pp. 821-827.
Peng et al., Influence of Energy Density on Energy Demand and Porosity of 316L Stainless Steel Fabricated by Selective Laser Melting, International Journal of Precision Engineering and Manufacturing—Green Technology, vol. 5, No 1, Jan. 2018, pp. 5562
Gu et al., Influences of Energy Density on Porosity and Microstructure of Selective Laser Melted 17-4PH Stainless Steel. 24th International SFF Symposium—An Additive Manufacturing Conference, Aug. 16, 2013, pp. 474-489.
Liu et al., Effects of melt-pool geometry on crystal growth and microstructure development in laser surface-melted superalloy single crystals, Mathematical modeling of single-crystal growth in a melt pool (Part 1), Science Direct, Acta Materialia, vol. 52, 2004, pp. 4833-4847.
Praniewicz et al, "Adaptive geometry transformation and repair for hybrid manufacturing", Procedia Manufacturing 26,2018, pp. 228-236.
Praniewicz et al, "An Adaptive Geometry Transformation and Repair Method for Manufacturing", Journal of Manufacturing Science and Engineering, vol. 141, Sep. 2018, pp. 2-8.
Wilson et al, "Remanufacturing of turbine blades by laser direct deposition with its energy and environmental impact analysis", Journal of Cleaner Production 80, 2014, pp. 170-178.

* cited by examiner

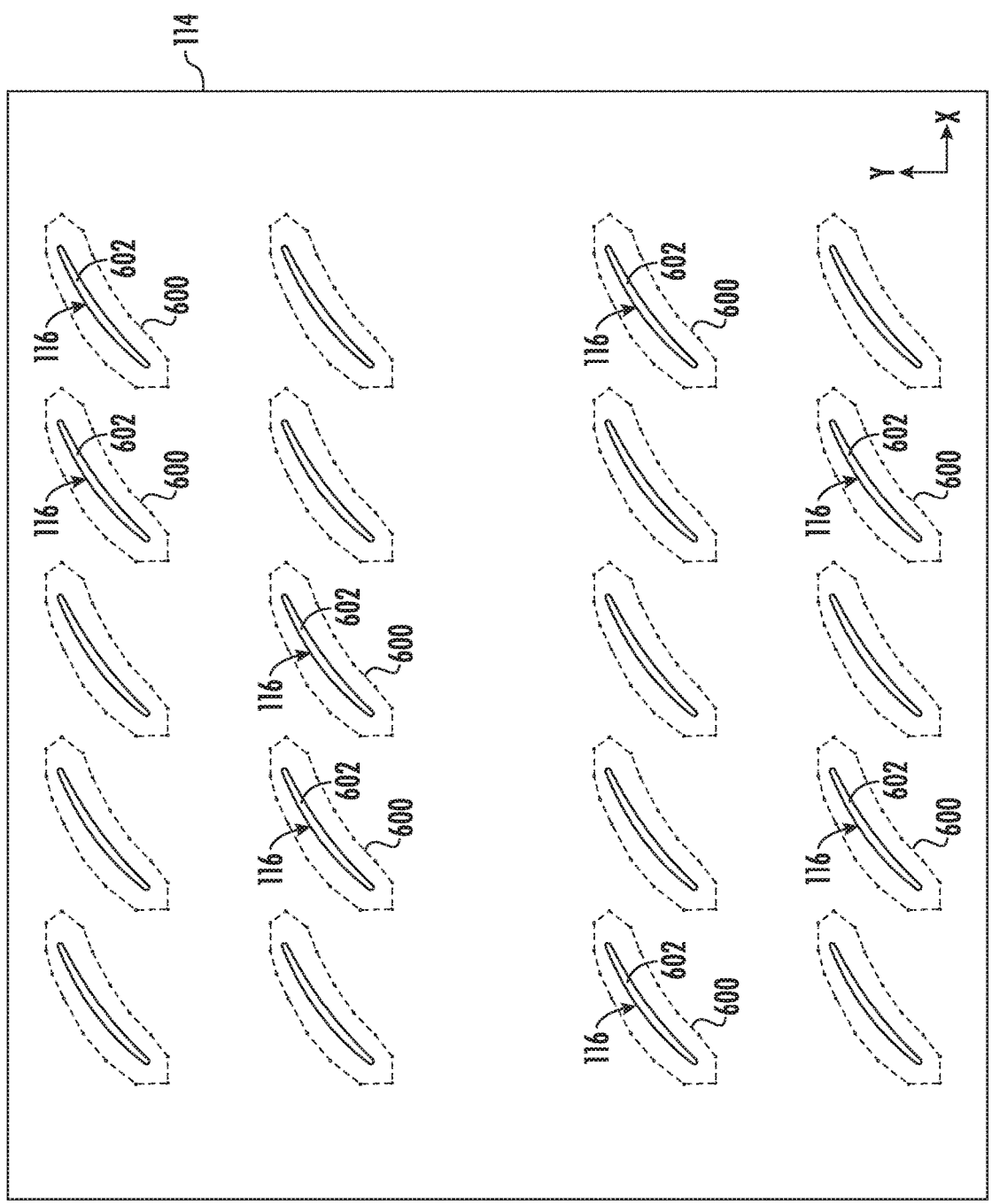

| REGISTRATION POINT | NOMINAL COORDINATES | | MEASURED COORDINATES | | SYSTEM OFFSET | |
|---|---|---|---|---|---|---|
| | X | Y | X | Y | X | Y |
| 1 | $X_1^0$ | $Y_1^0$ | $X_1$ | $Y_1$ | $\Delta X_1$ | $\Delta Y_1$ |
| 2 | $X_2^0$ | $Y_2^0$ | $X_2$ | $Y_2$ | $\Delta X_2$ | $\Delta Y_2$ |
| ... | | | | | | |
| n | $X_n^0$ | $Y_n^0$ | $X_n$ | $Y_n$ | $\Delta X_n$ | $\Delta Y_n$ |

ADDITIVE MANUFACTURING SYSTEMS AND METHODS OF PRETREATING AND ADDITIVELY PRINTING ON WORKPIECES

FIELD

The present disclosure generally pertains to additive manufacturing systems and methods of additively printing on workpieces, and more particularly to systems and methods that include a vision system configured to locate workpieces and an additive manufacturing machine configured to pretreat workpieces and additively print on the pretreated workpieces.

BACKGROUND

An additive manufacturing machine or system may be utilized to produce components according to a three-dimensional computer model. A model of the component may be constructed using a computer aided design (CAD) program, and an additive manufacturing machine or system may additively print the component according to the model. With previous additive manufacturing machines or systems, typically, components are additively printed on a build plate and/or within a build chamber. After the additive printing process is completed, the components are removed from the build plate and/or the build chamber for further processing. The build plate and/or the build chamber are not part of the component being additively printed, but rather, the build plate and the build chamber respectively provide a surface and/or a medium to support components during the additive printing process. As a result, the specific location of the final additively printed components on the build plate and/or within the build chamber may not be of particular importance provided that the components are successfully printed as intended by the CAD model.

However, according to the present disclosure, it would be desirable to utilize an additive manufacturing machine or system to additively print onto pre-exiting workpieces, including additively printing onto a plurality of pre-existing workpieces as part of a single build. When additively printing onto such workpieces, it would be desirable for additive manufacturing machines, systems, and methods to additively print onto pre-existing workpieces with sufficient precision and accuracy so as to provide near net shape components. Accordingly, there exists a need for improved additive manufacturing machines and systems, and methods of additively printing on workpieces.

It is contemplated in the present disclosure that when additively printing on a workpiece, it is desirable for the material additively printed thereon to sufficiently bond with the workpiece. In a powder-based additive manufacturing system, sequential layers of powder are bonded (e.g., melted or fused) to one another using an energy source that has a focal point generally corresponding to the elevation of the layer of powder being melted or fused to material immediately below such layer. However, when additively printing on a pre-existing workpiece, variation in the elevation across a surface of a workpiece may cause variations or interruptions in the powder spread across the surface of the workpiece as well as the bond between the surface of the workpiece and the sequential layer of powder being melted or fused thereto. Additionally, the surface of a pre-existing workpiece may have oxidation or other surface features that may affect the bonding of powder thereto. Accordingly, there further exists a need for improved additive manufacturing machines and systems, and methods of pretreating and additively printing on workpieces.

The workpieces contemplated by the present disclosure include originally fabricated workpieces, as well as workpieces intended to be repaired, rebuilt, upgraded, and so forth, such as machine or device components that may experience damage, wear, and/or degradation throughout their service life. It would be desirable to additively print on workpieces such as machine or device components so as to repair, rebuild, or upgrade such components. It would also be desirable to additively print on workpieces so as to produce new components such as components that may exhibit an enhanced performance or service life.

One example of a machine or device component includes an air foil, such as a compressor blade or a turbine blade used in a turbomachine. These air foils frequently experience damage, wear, and/or degradation throughout their service life. For example, serviced air foils, such as compressor blades of a gas turbine engine show erosion, defects, and/or cracks after long term use. Specifically, for example, such blades are subject to significant high stresses and temperatures which inevitably cause blades to wear over time, particularly near the tip of the blade. For example, blade tips are susceptible to wear or damage from friction or rubbing between the blade tips and turbomachine shrouds, from chemical degradation or oxidation from hot gasses, from fatigue caused by cyclic loading and unloading, from diffusion creep of crystalline lattices, and so forth.

Notably, worn or damaged blades may result in machine failure or performance degradation if not corrected. Specifically, such blades may cause a turbomachine to exhibit reduced operating efficiency as gaps between blade tips and turbomachine shrouds may allow gasses to leak through the turbomachine stages without being converted to mechanical energy. When efficiency drops below specified levels, the turbomachine is typically removed from service for overhaul and repair. Moreover, weakened blades may result in complete fractures and catastrophic failure of the engine.

As a result, compressor blades for a turbomachine are typically the target of frequent inspections, repairs, or replacements. It is typically expensive to replace such blades altogether, however, some can be repaired for extended lifetime at relatively low cost (as compared to replacement with new blades). Nevertheless, traditional repair processes tend to be labor intensive and time consuming.

For example, a traditional repair process uses a welding/cladding technique whereby repair material may be supplied to a repair surface in either powder or wire form, and the repair material may be melted and bonded to the repair surface using a focused power source such as a laser, e-beam, plasma arc, or the like. However, blades repaired with such a welding/cladding technique also undergo tedious post-processing to achieve the target geometry and surface finish. Specifically, due to the bulky feature size of the welding/cladding repair material bonded to the repair surface, the repaired blades require heavy machining to remove extra material followed by polishing to achieve a target surface finish. Notably, such machining and polishing processes are performed on a single blade at a time, are labor intensive and tedious, and result in large overall labor costs for a single repair.

Alternatively, other direct-energy-deposition (DED) methods may be used for blade repair, e.g., such as cold spray, which directs high-speed metal powders to bombard the target or base component such that the powders deform and deposit on the base component. However, none of these DED methods are suitable for batch processing or for repairing a large number of components in a time-efficient manner, thus providing little or no business value.

Accordingly, it would be desirable to provide improved system and method for repairing or rebuilding serviced components. More particularly, additive manufacturing machines and systems for quickly and effectively rebuilding or repairing worn compressor blades would be particularly desirable.

BRIEF DESCRIPTION

Aspects and advantages will be set forth in part in the following description, or may be obvious from the description, or may be learned through practicing the presently disclosed subject matter.

In one aspect, the present disclosure embraces methods of additively printing an extension segment on a workpiece. An exemplary method may include pretreating a workpiece-interface of a workpiece using an energy beam from an additive manufacturing machine, providing a pretreated workpiece-interface having received a pretreatment, with the pretreatment remediating an aberrant feature of the workpiece and/or the workpiece-interface. An exemplary method may additionally include additively printing an extension segment on the pretreated workpiece-interface using the energy beam from the additive manufacturing machine.

In another aspect, the present disclosure embraces additive manufacturing systems. An exemplary additive manufacturing system may include a controller operably coupled to a vision system and an additive manufacturing machine. The controller may include one or more computer readable medium and one or more processors, and the one or more computer readable medium may include computer-executable instructions, which, when executed by the one or more processors, cause the additive manufacturing system to pretreat a workpiece interface, providing a pretreated workpiece-interface, and/or additively print an extension segment on the pretreated workpiece-interface. Pretreating a workpiece interface may be performed using an energy beam from the additive manufacturing machine. Pretreating the workpiece-interface may include additive-leveling the workpiece-interface and/or melt-leveling the workpiece-interface. Additively printing an extension segment on the pretreated workpiece-interface may be performed using the energy beam from the additive manufacturing machine.

In yet another aspect, the present disclosure embraces computer readable medium including computer-executable instructions, which, when executed by one or more processors of an additive manufacturing system, cause the additive manufacturing system to pretreat a workpiece-interface using an energy beam from the additive manufacturing machine, providing a pretreated workpiece-interface, with pretreat the workpiece-interface comprises additive-leveling the workpiece-interface and/or melt-leveling the workpiece-interface. The computer readable medium may additionally include computer-executable instructions, which, when executed by one or more processors of an additive manufacturing system, cause the additive manufacturing system to additively print an extension segment on the pretreated workpiece-interface using the energy beam from the additive manufacturing machine.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIG. 6B schematically depicts an exemplary digital representation of one or more fields of view that includes a plurality of workpieces, captured using the vision system;

Figure 1A:
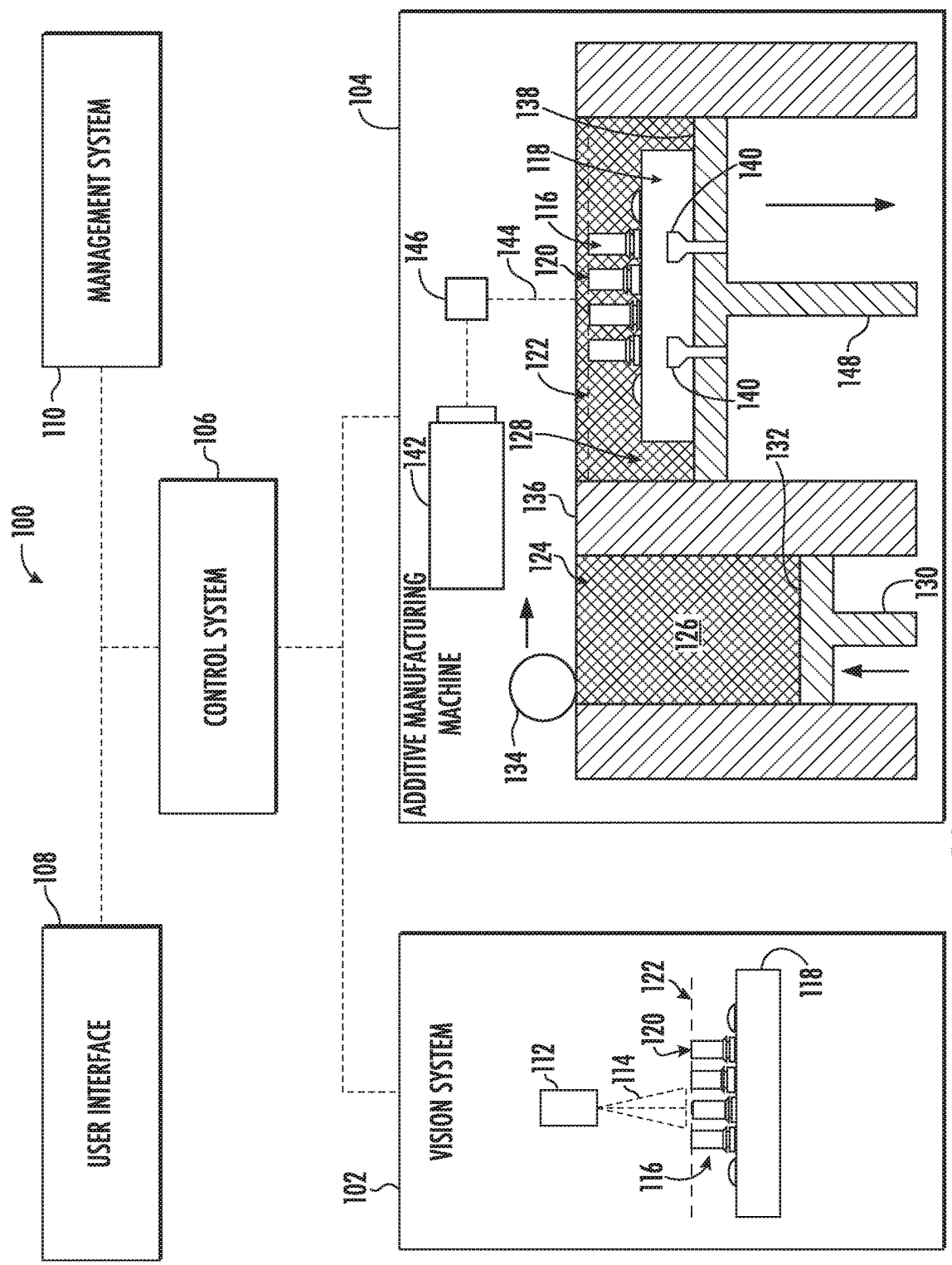
FIGS. 1A and 1B schematically depict exemplary additive manufacturing systems.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "op", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

As described in detail below, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

As used herein, the term "near net shape" refers to an additively printed feature that has an as-printed shape that is very close to the final "net" shape. A near net shape component may undergo surface finishing such as polishing, buffing, and the like, but does not require heaving machining so as to achieve a final "net" shape. By way of example, a near net shape may differ from a final net shape by about 1,500 microns or less, such as about 1,000 µm or less, such as about 500 µm or less, such as about 250 µm or less, such as about 150 µm or less, such as about 100 µm or less, such as about 50 µm or less, or such as about 25 µm or less.

Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

In addition to using a direct metal laser sintering (DMLS) or direct metal laser melting (DMLM) process where an energy source is used to selectively sinter or melt portions of a layer of powder, it should be appreciated that according to alternative embodiments, the additive manufacturing process may be a "binder jetting" process. In this regard, binder jetting involves successively depositing layers of additive powder in a similar manner as described above. However, instead of using an energy source to generate an energy beam to selectively melt or fuse the additive powders, binder jetting involves selectively depositing a liquid binding agent onto each layer of powder. The liquid binding agent may be, for example, a photo-curable polymer or another liquid bonding agent. Other suitable additive manufacturing methods and variants are intended to be within the scope of the present subject matter.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). These materials are examples of materials suitable for use in the additive manufacturing processes described herein and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

After fabrication of the component is complete, various post-processing procedures may be applied to the component. For example, post processing procedures may include removal of excess powder by, for example, blowing or vacuuming. Other post processing procedures may include a stress relief process. Additionally, thermal, mechanical, and/or chemical post processing procedures can be used to finish the part to achieve a desired strength, surface finish, and other component properties or features.

Notably, in exemplary embodiments, several aspects and features of the present subject matter were previously not possible due to manufacturing restraints. However, the present inventors have advantageously utilized current advances in additive manufacturing techniques to improve various components and the method of additively manufacturing such components. While the present disclosure is not limited to the use of additive manufacturing to form these components generally, additive manufacturing does provide a variety of manufacturing advantages, including ease of manufacturing, reduced cost, greater accuracy, etc.

Also, the additive manufacturing methods described above enable much more complex and intricate shapes and contours of the components described herein to be formed with a very high level of precision. For example, such components may include thin additively manufactured layers, cross sectional features, and component contours. In addition, the additive manufacturing process enables the manufacture of a single component having different materials such that different portions of the component may exhibit different performance characteristics. The successive, additive nature of the manufacturing process enables the construction of these novel features. As a result, components formed using the methods described herein may exhibit improved performance and reliability.

The present disclosure generally provides additive manufacturing machines, systems, and methods configured to pretreat and additively print on pre-existing workpieces. The pre-existing workpieces may include new workpieces as well as workpieces being repaired, rebuilt, or upgraded. The presently disclosed additive manufacturing systems and methods utilize a vision system to capture digital representations of one or more workpieces situated in a field of view, which may be in the form of digital images or the like. The shape and location of each workpiece may be determined using the vision system and pretreatment commands and/or print commands may be generated based at least in part on the digital representation of the one or more workpieces. The pretreatment commands may be configured to cause an additive manufacturing machine to utilize an energy source of the additive manufacturing machine to pretreat one or more workpieces, and the print commands may be configured to cause an additive manufacturing machine to additively print an extension segment directly on each of the one or more workpieces.

The workpieces may include a workpiece-interface, which refers to a surface that may be pretreated using the energy source from the additive manufacturing machine and upon which an additive manufacturing machine may additively print an extension segment. For some workpieces, the workpiece-interface may include a surface that has undergone pre-processing prior to such pretreatment and in preparation for additively printing. For example, a surface may be machined, ground, brushed, etched, polished, or otherwise substantively modified so as to provide a workpiece-interface. Such subtractive modification may remove at least a portion of a surface that has been worn or damaged, and/or may improve bonding between the workpiece and the additively printed material. In the case of previously used components, such as compressor blades or turbine blades, the surface may be damaged or worn to some degree, including artifacts such as microcracks, pits, abrasions, defects, foreign material, depositions, imperfections, and the like. The subtractive modification process may remove such damage or wear to provide a workpiece with a workpiece-interface that is ready for additive printing. The workpiece-interface resulting from such subtractive modification may be pretreated according to the present disclosure, and an extension segment may be additively printed on the pretreated workpiece-interface. However, in some embodiments, the subtractive modification and/or the pretreatment may be omitted, for example, when a workpiece includes a workpiece-interface suitable for additively printing thereon. Of course, a subtractive modification and/or a pretreatment may be performed even when a workpiece includes a suitable workpiece-interface, for example, to provide an improved workpiece-interface.

One exemplary type of workpiece includes airfoils for a turbomachine, such as compressor blades and/or turbine blades. A typical turbomachine includes one or more compressor sections, each of which may include multiple compressor stages, and one or more turbine sections, each of which may include multiple turbine stages. The compressor sections and turbine sections are typically oriented along an axis of rotation and respectively include a series of airfoils disposed circumferentially around the respective stage and circumferentially surrounded by a shroud.

Typically, the nature and extent of damage or wear to a set of blades removed from a turbomachine for repair or rebuild varies from blade to blade. As a result, the amount of material that may need to be removed during a subtractive modification process so as to prepare a workpiece-interface may vary from one blade to the next. Additionally, some of the blades may be deformed from their original net shape through exposure to high stresses and temperatures and/or through damage from rubbing on shrouds and so forth. As a result, each individual blade may differ from its original net shape in varying degrees from one blade to the next.

Additionally, the size and shape of the airfoils may differ from one stage to the next, and the tips of the airfoils provides a relatively small workpiece-interface. As an example, exemplary high-pressure compressor blades may be about 1 to 2 inches tall and may have a blade tip with a cross-sectional width of about 0.5 mm to about 5 mm, which provides for a particularly small workpiece-interface, which provides for a particularly small workpiece-interface. Other exemplary high-pressure compressor blades, as well as low-pressure compressor blades and blades from a turbine section (e.g., high-pressure turbine blades and low-pressure turbine blades) may be somewhat larger, such as up to about 10 inches tall, but nevertheless provide for a small workpiece-interface.

This variability from one workpiece to the next, including variability as to differences from original net shape, differing amounts of subtractive modification, and/or differences in size and shape, presents several key challenges in additively printing on the workpiece-interface of such workpieces, which are addressed by the present disclosure. In particular, the present disclosure provides for additively printing extension segments on the workpiece-interface of respective workpieces with sufficient precision and accuracy so as to provide near net shape components even though the respective workpieces may differ from one another because of one or more of such sources of variability.

In some embodiments, the present disclosure provides systems and methods of securing workpieces to a build plate and/or within a build chamber so that an additive manufacturing machine or system may additively print onto the workpiece-interfaces of the respective workpieces as part of a common build even when the workpieces have different sizes or shapes. For example, the present disclosure provides build plates that include one or more biasing members configured to align the workpiece-interfaces with one another, and one or more clamping mechanisms which operate to secure the workpieces to the build plate. The workpieces may be secured to the build plate at locations which may be determined by registration points mapped to a coordinate system that may be utilized by the additive manufacturing system to locate the workpieces and/or their workpiece-interfaces.

The present disclosure provides systems and methods of pretreating workpiece-interfaces, such as those having one or more aberrant features. The pretreatment may remediate aberrant features and/or enhance one or more features of the workpiece-interface. For example, the pretreatments may level one or more regions of the workpiece-interface and/or may provide desirable metallurgical properties across one or more regions of the workpiece-interface. The pretreatment may also improve bonding between the workpiece and an extension segment additively printed on the workpiece following pretreatment. Additionally, the pretreatment may improve the precision and/or accuracy with which an extension segment may be additively printed on a workpiece. Exemplary pretreatments may include additive-leveling, melt-leveling, and/or heat-conditioning. In some embodiments, a workpiece-interface may be leveled using a pretreatment that includes additive-leveling and/or melt-leveling. Additionally, or in the alternative, a pretreatment may remove oxidation, contaminants, debris, and/or subtractive modification artifacts (e.g., grooves, scratches, burrs, etc.) from the workpiece-interface 120.

In some embodiments, the present disclosure provides systems and methods of determining or generating a CAD model that includes a model of one or more extension segments, such as an extension segment-CAD model, that conform to the location and shape of one or more corresponding workpieces upon which the extension segments are to be additively printed. Such an extension segment-CAD model may be utilized to generate print commands for an additive manufacturing machine, allowing the additive manufacturing machine to additively print extension segments onto workpiece-interfaces with sufficient precision or accuracy to provide near net shape components.

The present disclosure provides for determining and/or generating an extension segment CAD model, for example, from a library-CAD model that includes a nominal model of one or more nominal workpieces, components, or extension segments. The library-CAD model may be selected from a library of CAD models based at least in part on a digital representation of a field of view of one or more workpiece-interfaces obtained from the vision system. A nominal model-interface traversing a nominal model may be determined in a library-CAD model, and a model of an extension segment may be selected and/or generated based at least in part on a comparison of the nominal model-interface to a digital representation of a workpiece-interface. A model of one or more extension segments may be output to an extension segment-CAD model and print commands for the additive manufacturing machine may be generated using the extension segment-CAD model.

The present disclosure additionally provides for determining and/or generating a pretreatment-CAD model. By way of example, a pretreatment-CAD model may be determined or generated from an extension segment-CAD model and/or from a library-CAD model that includes a nominal model of one or more nominal workpieces, components, or extension segments. A model of a pretreatment region may be selected and/or generated based at least in part on a comparison of a nominal model-interface to a digital representation of a workpiece-interface. A model of one or more pretreatment regions may be output to a pretreatment-CAD model and pretreatment commands for pretreating workpiece-interfaces may be generated using the pretreatment-CAD model.

In some embodiments, generating a model of an extension segment may include extracting the nominal model-interface from the nominal model, transforming the nominal model-interface based at least in part on the comparison to the digital representation of the workpiece-interface, and/or extending the transformed model-interface so as to provide the model of the extension segment. Additionally, or in the alternative, a model of an extension segment may be generated from a three-dimensional portion of a nominal model, which may include transforming such three-dimensional portion so as to provide a model of an extension segment conforming to the digital representation of the workpiece-interface. Similarly, generating a model of a pretreatment region may include extracting a nominal model-interface from the nominal model, transforming the nominal model-interface based at least in part on a comparison to the digital representation of the workpiece-interface, and/or extending the transformed model-interface so as to provide the model of the pretreatment region. Additionally, or in the alternative, a model of a pretreatment region may be generated from a three-dimensional portion of a nominal model, which may include transforming such three-dimensional portion so as to provide a model of a pretreatment region conforming to the digital representation of the workpiece-interface.

The present disclosure also provides for systems and methods of performing calibration adjustments so as to prevent or mitigate discrepancies, biases, misalignments, calibration errors, or the like which may otherwise arise from time to time as between one or more aspects of the additive manufacturing system. Such calibration adjustments may be configured to address potential discrepancies, biases, misalignments, calibration errors, or the like between a vision system and an additive manufacturing machine, between a vision system and one or more CAD models generated, or between one or more CAD models and an additive manufacturing machine, as well as combinations of these.

When additively printing an extension segment on a workpiece-interface, misalignment between the workpiece and the extension segment may result in a failed build or a defective component. Previous additive manufacturing system may exhibit systematic bias in the mapping between the scan path coordinates and the coordinates of a CAD model. Such systematic bias may cause additively printed components to be shifted globally, which may have been of little consequence for previous additive manufacturing systems. However, the present disclosure provides for near net shape components, such that the extension segment conforms to the location and shape of the workpiece-interface of the workpiece. To provide such near net shape components, not only is the precision of the additive manufacturing tool of importance, but it is also of importance that the location and shape of the workpieces and corresponding extension segments be accurately and precisely aligned with one another.

In some embodiments, the additive material used for the extension segments may differ from the material of the workpieces. Differences in material may provide for different properties or performance characteristics of the extension segments relative to the workpieces, including enhanced wear resistance, improved hardness, strength, and/or ductility. New or unused components may be additively manufactured or upgraded in accordance with the present disclosure so as to provide an extension segment with a material that differs from that of the workpiece. For example, airfoils such as compressor blades or turbine blades may be upgraded with blade tips formed of a superior performing material. Likewise, damaged or worn components may be repaired or rebuild using a material that differs from that of the workpiece, for example, using a superior performing material. Further, a material used in connection with a pretreatment may differ from a material used for an extension segment and/or a material included in the workpiece.

Figure 1B:
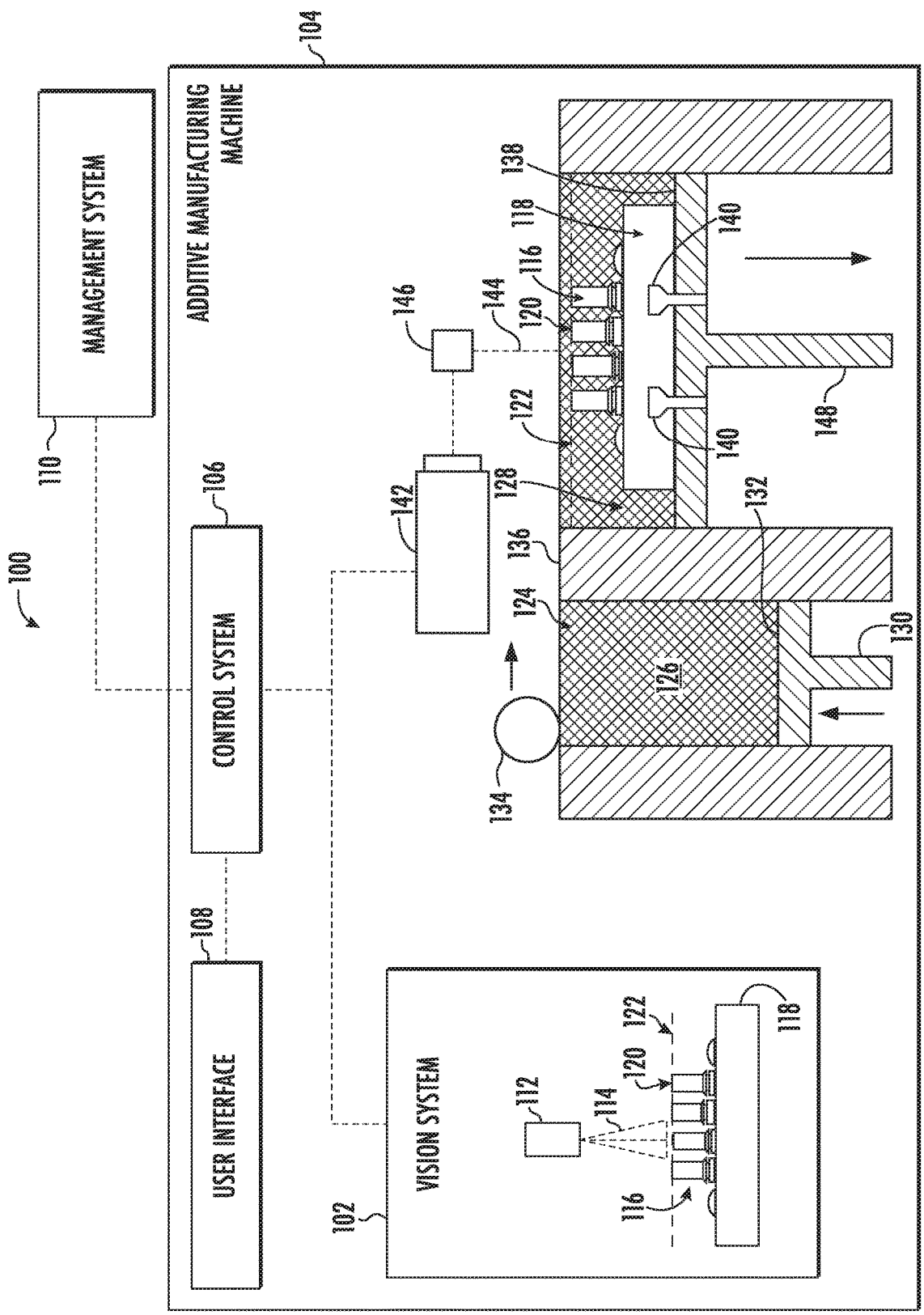

Exemplary embodiments of the present disclosure will now be described in further detail. Exemplary embodiments of an additive manufacturing system 100 are shown in FIGS. 1A and 1B. An exemplary additive manufacturing system 100 includes a vision system 102, an additive manufacturing machine 104, and a control system 106 operably configured to control the vision system 102 and/or the additive manufacturing machine 104. The vision system 102 and the additive manufacturing machine 104 may be provided as a single, integrated unit or as separate stand-alone units. The vision system 102 and the additive manufacturing machine 104 may be operably coupled with one another via a communication interface utilizing wired or wireless communication lines, which may provide a direct connection between the vision system 102 and the additive manufacturing machine 104. The control system 106 may include one or more control systems 106. For example, a single control system 106 may be operably configured to control operations of the vision system 102 and the additive manufacturing machine 104, or separate control systems 106 may be operably configured to respectively control the vision system 102 and the additive manufacturing machine 104. A control system 106 may be realized as part of the vision system 102, as part of the additive manufacturing machine 104, and/or as a stand-alone unit provided separately from the vision system 102 and/or the additive manufacturing machine 104. A control system 106 may be operably coupled with the vision system 102 and/or the additive manufacturing machine 104 via a communication interface utilizing wired or wireless communication lines, which may provide a direct connection between the control system 106 and the vision system 102 and/or between the control system 106 and the additive manufacturing machine 104. An exemplary additive manufacturing system 100 may optionally include a user interface 108 and/or a management system 110.

In some embodiments, a first control system 106 may determine an extension segment-CAD model, generate one or more print commands based at least in part on the extension segment-CAD model, and/or transmit the one or more print commands to a second control system 106, and the second control system 106 may cause the additive manufacturing machine 104 to additively print the extension segments based at least in part on the print commands. The first control system 106 may be realized as part of a vision system 102, and/or the second control system 106 may be realized as part of the additive manufacturing machine 104. Alternatively, or in addition, the first control system 106 and/or the second control system 106 may be realized stand-alone units separate from the vision system 102 and/or the additive manufacturing machine 104.

In some embodiments, a first control system 106 may determine and transmit an extension segment-CAD model to a second control system 106, the second control system 106 may slice the extension segment-CAD model so as to generate one or more print commands and concurrently or subsequently transmit the one or more print commands to a third control system 106, and the third control system may cause the additive manufacturing machine 104 to additively print the extension segments based at least in part on the one or more print commands. The first control system 106 may be realized as part of a vision system 102, the second control system 106 may be realized as a stand-alone unit, and the third control system 106 may be realized as part of the additive manufacturing machine 104. Alternatively, or in addition, the first control system 106 and/or the second control system 106 may be realized as stand-alone units separate from the vision system 102 and/or the additive manufacturing machine 104.

In some embodiments, a control system 106 may determine a pretreatment-CAD model and/or generate one or more pretreatment commands based at least in part on the pretreatment-CAD model. For example, a first control system 106 may determine the pretreatment-CAD model and/or transmit the pretreatment-CAD model to a second control system 106, and the second control system 106 may generate one or more pretreatment commands based at least in part on the pretreatment-CAD model, and the second control system 106 may also cause the additive manufacturing machine 104 to subject the extension segments to a pretreatment based at least in part on the pretreatment commands. As another example, the first control system 106 may determine and transmit a pretreatment-CAD model to a second control system 106, the second control system 106 may generate one or more pretreatment commands based at least in part on the pretreatment-CAD model and concurrently or subsequently transmit the one or more pretreatment commands to a third control system 106, and the third control system may cause the additive manufacturing machine 104 to subject the extension segments to a pretreatment based at least in part on the pretreatment commands. The first control system 106 may be realized as part of a vision system 102, the second control system 106 may be realized as a stand-alone unit, and the third control system 106 may be realized as part of the additive manufacturing machine 104. Alternatively, or in addition, the first control system 106 and/or the second control system 106 may be realized as stand-alone units separate from the vision system 102 and/or the additive manufacturing machine 104.

The vision system 102 may include any suitable camera or cameras 112 or other machine vision device that may be operably configured to obtain image data that includes a digital representation of one or more fields of view 114. Such a digital representation may sometimes be referred to as a digital image or an image; however, it will be appreciated that the present disclosure may be practiced without rendering such a digital representation in human-visible form. Nevertheless, in some embodiments, a human-visible image corresponding to a field of view 114 may be displayed on the user interface 108 based at least in part on such a digital representation of one or more fields of view 114.

The vision system 102 allows the additive manufacturing system 100 to obtain information pertaining to one or more workpieces 116 onto which a pretreatment may be applied and/or onto which one or more extension segments may be respectively additively printed. In particular, the vision system 102 allows the one or more workpieces 116 to be located and defined so that the additive manufacturing machine 104 may be instructed to pretreat the workpiece-interfaces 120 of one or more workpieces with suitably high accuracy and precision and/or to print one or more extension segments on a corresponding one or more workpieces 116 with suitably high accuracy and precision. The one or more workpieces 116 may be secured to a build plate 118 with a workpiece-interface (e.g. a top surface) 120 of the respective workpieces 116 aligned to a build plane 122.

The one or more cameras 112 of the vision system 102 may be configured to obtain two-dimensional or three-dimensional image data, including a two-dimensional digital representation of a field of view 114 and/or a three-dimensional digital representation of a field of view 114. Alignment of the workpiece-interfaces 120 with the build plane 122 allows the one or more cameras 112 to obtain higher quality images. For example, the one or more cameras 112 may have a focal length adjusted or adjustable to the build plane 122. With the workpiece-interface 120 of one or more workpieces 116 aligned to the build plane 122, the one or more cameras may readily obtain digital images of the workpiece-interfaces 120. The one or more cameras 112 may include a field of view 114 that that encompasses all or a portion of the one or more workpieces 116 secured to the build plate 118. For example, a single field of view 114 may be wide enough to encompass a plurality of workpieces 116, such as each of a plurality of workpieces secured to a build plate 118. Alternatively, a field of view 114 may more narrowly focus on an individual workpiece 116 such that digital representations of respective workpieces 116 are obtained separately. It will be appreciated that separately obtained digital images may be stitched together to obtain a digital representation of a plurality of workpieces 116. In some embodiments, the camera 112 may include a collimated lens configured to provide a flat focal plane, such that workpieces or portions thereof located towards the periphery of the field of view 114 are not distorted. Additionally, or in the alternative, the vision system 102 may utilize a distortion correction algorithm to address any such distortion.

Image data obtained by the vision system 102, including a digital representation of one or more workpieces 116 may be transmitted to the control system 106. The control system 106 may be configured to determine a workpiece-interface 120 of each of a plurality of workpieces 116 from one or more digital representations of one or more fields of view 114 having been captured by the vision system 102, and then determine one or more coordinates of the workpiece-interface 120 of respective ones of the plurality of workpieces 116. Based on the one or more digital representations, the control system 106 may generate one or more print commands and/or one or more pretreatment commands, which may be transmitted to an additive manufacturing machine 104 such that the additive manufacturing machine 104 may additively print a plurality of extension segments on respective ones of the plurality of workpieces 116 and/or subject the plurality of workpieces 116 to a pretreatment prior to additively printing the plurality of extension segments thereon. The one or more print commands may be configured to additively print a plurality of extension segments with each respective one of the plurality of extension segments being located on the workpiece-interface 120 of a corresponding workpiece 116. The pretreatment commands may be configured to expose the workpiece-interfaces 120 of the workpieces 116 to a pretreatment so as to prepare the workpiece-interfaces 120 for additively printing extension segments thereon.

The additive manufacturing machine 104 may utilize any desired additive manufacturing technology. In an exemplary embodiment, the additive manufacturing machine may utilize a powder bed fusion (PBF) technology, such as direct metal laser melting (DMLM), electron beam melting (EBM), selective laser melting (SLM), directed metal laser sintering (DMLS), or selective laser sintering (SLS). The additive manufacturing machine 104 may include any such additive manufacturing technology, or any other suitable additive manufacturing technology may also be used. By way of example, using a powder bed fusion technology, respective ones of a plurality of extension segments may be additively printed on corresponding respective ones of a plurality of workpieces 116 in a layer-by-layer manner by melting or fusing a layer of powder material to the workpiece-interface 120. In some embodiments, a component may be additively printed by melting or fusing a single layer of powered material to the workpiece-interface 120. Additionally, or in the alternative, subsequent layers of powder material may be sequentially melted or fused to one another. The pretreatment may be applied using the same additive manufacturing machine 104 utilized to additively print the extension segments.

Still referring to FIGS. 1A and 1B, an exemplary additive manufacturing machine 104 includes a powder supply chamber 124 that contains a supply of powder 126, and a build chamber 128. A build plate 118 having one or more workpieces 116 secured thereto may be positioned in the build chamber 128, where the workpieces 116 may be additively printed in a layer-by-layer manner. The powder supply chamber 124 includes a powder piston 130 which elevates a powder floor 132 during operation of the system 100. As the powder floor 132 elevates, a portion of the powder 126 is forced out of the powder supply chamber 124.

A recoater 134, such as a roller or a blade, pushes some of the powder 126 across a work surface 136 and onto a build platform 138. The build plate 118 may be secured to the build platform 138 with a chuck system 140 in a manner configured to position the build plate 118 on the build platform 138 and/or within the build chamber 128 with sufficiently high accuracy and precision. The workpieces 116 may be secured to the build plate 118 prior to securing the build plate 118 to the build platform 138. The recoater 134 fills the build chamber 128 with powder 126 and then sequentially distributes thin layers of powder 126 across a build plane 122 near the top of the workpieces 116 to additively print sequential layers of the workpieces 116. For example, the thin layers of powder 126 may be about 10 to 100 microns thick, such as about 20 to 80 µm thick, such as about 40 to 60 µm thick, or such as about 20 to 50 µm thick, or such as about 10 to 30 µm thick. The build plane 122 represents a plane corresponding to a next layer of the workpieces 116 to be formed from the powder 126.

To form a layer of an extension segment on the workpiece 116 (e.g., an interface layer or a subsequent layer), an energy source 142 directs an energy beam 144 such as a laser or an electron beam onto the thin layer of powder 126 along the build plane 122 to melt or fuse the powder 126 to the top of the workpieces 116 (e.g., to melt or fuse a layer to the workpiece-interfaces 120 and/or melt or fuse subsequent layers thereto). A scanner 146 controls the path of the energy beam 144 so as to melt or fuse the portions of the powder 126 layer that are to become melted or fused to the workpieces 116. Typically, with a DMLM, EBM, or SLM system, the powder 126 is fully melted, with respective layers being melted or re-melted with respective passes of the energy beam 144. Conversely, with DMLS, or SLS systems, layers of powder 126 are sintered, fusing particles of powder 126 with one another generally without reaching the melting point of the powder 126. After a layer of powder 126 is melted or fused to the workpieces 116, a build piston 148 gradually lowers the build platform 138 by an increment, defining a next build plane 122 for a next layer of powder 126 and the recoater 134 to distributes the next layer of powder 126 across the build plane 122. Sequential layers of powder 126 may be melted or fused to the workpieces 116 in this manner until the additive printing process is complete.

The extension segments may be additively printed on the workpiece-interfaces 120 of respective workpieces 116 at an energy density selected so as to provide a proper bond between the workpiece-interface 120 and the layers of melted or fused powder 126 that form the extension segment 206. As used herein, the term "energy density" refers to the volumetric energy density E, which may have units of Joules per cubic millimeter (J/mm$^3$) and may be described according to equation (1) as follows:

$$E = \frac{P}{v \cdot h \cdot t} k_o k_r, \tag{1}$$

where P is the power of the energy beam 144 in watts (W), v is the scan speed of the energy beam 144 in millimeters per second (mm/s), h is the hatch spacing between adjacent scan path passes in millimeters (mm), t is the incremental layer thickness in millimeters (mm) as indicated by the incremental amount of lowering of the build platform 138 between sequential layers of powder applied across the build plane 122, $k_o$ is an overlap constant corresponding to the amount of overlap between adjacent scan path passes, and $k_r$ is a remelt constant corresponding to the amount of remelt between adjacent layers.

Variations of the parameters affecting energy density may greatly influence additive printing quality, and in some embodiments the energy density and/or various parameters thereof that may be suitable for forming an original component may be unsuitable for additively printing an extension segment on a pre-existing workpiece 116. For example, the energy density used to additively print an extension segment on a pre-existing workpiece 116 may be substantially greater than a typical energy density used to additively print an original component. The energy density may be substantially greater, for example, to achieve a desired porosity of the extension segment. The porosity may be described with reference to relative density according to equation (2) as follows:

$$\rho_{rel} = \frac{\rho^*}{\rho_s}, \tag{2}$$

where $\rho^*$ is the density of the additively printed material, and $\rho_s$ is the density of the raw material used.

Post-processing such as heat treatment applied to the workpiece 116 and/or exposure to high temperature operating conditions may modify the relative density of the workpiece 116 (e.g., through grain growth, precipitates, twinning, etc.) from that which existed when the workpiece 116 was originally formed. The energy density of the energy beam 144 may be selected so as to provide an extension segment having a relative density, crystal structure, or other properties corresponding to that of the workpiece 116, such as after accounting for effects of such post-processing or operating conditions on the workpiece 116. For example, it may be undesirable to subject a component formed by additively printing the extension segment on a workpiece 116 to certain post processing such as heat treatment because the workpiece 116 may have already been subjected to such post processing. As a result, it may be desirable for the additive printing process to provide extension segments having a desired relative density, crystalline structure, and so forth without contribution from post-processing such as heat treatment.

In some embodiments, the relative density of an extension segment may be selected so as to substantially match the relative density of a workpiece 116 and/or so as to be equal to or greater than the relative density of the workpiece 116. In some embodiments the relative density of the extension segment may be substantially greater than the relative density of the workpiece. By way of example, an extension segment may have a relative density of from about 0.950 to 0.9999, such as from 0.970 to 0.9999, such as from 0.990 to 0.9999, such as from 0.997 to 0.9999, such as at least 0.990, such as at least 0.995, such as at least 0.997, such as at least 0.998, such as at least 0.9990, such as at least 0.9995, such as at least 0.9997, such as at least 0.9998, such as at least 0.9999. In some embodiments, an extension segment may exhibit a first relative density and a workpiece may exhibit a second relative density, in which the first relative density exceeds the second relative density by from about 10 to about 100 thousandths, such as from about 10 to about 80 thousandths, such as from about 10 to about 60 thousandths, such as from about 10 to about 40 thousandths, such as from about 10 to about 20 thousandths, such as from about 20 to about 80 thousandths, such as from about 40 to about 80 thousandths, such as from about 60 to about 100 thousandths.

To achieve such a relative density, the energy density used to additively print an extension segment on a pre-existing workpiece 116 may be substantially greater than a typical energy density values. For example, whereas typical energy density values may range from about 20 J/mm$^3$ to about 70 J/mm$^3$, exemplary energy density values used to additively print an extension segment on a workpiece 116 may range from about 20 J/mm$^3$ to about 200 J/mm$^3$, such as from about 70 J/mm$^3$ to about 200 J/mm$^3$, such as from about 80 J/mm$^3$ to about 200 J/mm$^3$, such as from about 100 J/mm$^3$ to about 160 J/mm, such as from about 120 J/mm$^3$ to about 140 J/mm$^3$, such as from about 140 J/mm$^3$ to about 180 J/mm$^3$, such as from about 160 J/mm$^3$ to about 200 J/mm$^3$ Such energy density may be at least about 20 J/mm$^3$, such as at least about 50 J/mm$^3$, such as at least about 70 J/mm, such as at least about 100 J/mm$^3$, such as at least about 120

J/mm³, such as at least about 140 J/mm³, such as at least about 160 J/mm³. Such energy density may be less than about 200 J/mm³, such as less than about 160 J/mm³, such as less than about 140 J/mm³, such as less than about 120 J/mm³. For example, in some embodiments, the foregoing energy density values may be achieved when the product of $k_o$ and $k_r$ is about 1.0, such as from about 0.2 to about 2.0, such as from about 0.5 to about 1.5, or such as from about 0.8 to about 1.2.

In some embodiments, the workpieces 116 (e.g., the workpiece-interfaces 120) may be subjected to a pretreatment, which may be performed with and/or without powder 126 applied to the workpiece-interface 120. To perform a pretreatment, an energy source 142 directs an energy beam 144 such as a laser or an electron beam onto the workpiece-interface 120 and/or a thin layer of powder 126 along the build plane 122. The pretreatment may be performed at an energy density selected so as to provide the desired effect of the pretreatment, such as additive-leveling, melt-leveling, and/or heat conditioning. When the pretreatment is performed with powder 126 applied to the workpiece-interface 120, the energy density may be described according to equation (1) above. When the pretreatment is performed without powder 126, such as in the case of a melt-leveling pretreatment and/or a heat-conditioning pretreatment, the energy density may be described according to equation (1), where t equals 1. Variations of the parameters affecting energy density may also greatly influence the character and effect of the pretreatment, and in some embodiments the energy density and/or various parameters thereof that may be suitable for forming an original component or for printing an extension segment on a pre-existing workpiece may be unsuitable for pretreatment. For example, in some embodiments the energy density used to pretreat a workpiece-interface 120 may be substantially lower than a typical energy density used to additively print an original component and/or an extension segment. For example, some heat-conditioning pretreatments may be performed at an energy density that does not generate a melt pool. In some embodiments, a workpiece-interface may be pretreated using a first energy density that is from about 10% to about 100% of a second energy density used to additively print an extension segment on the workpiece-interface, such as a first energy density that is from about 10% to about 90% of the second energy density, such as a first energy density that is from about 10% to about 70% of the second energy density, such as from about 20% to about 50% of the second energy density, such as from about 40% to about 80% of the second energy density, or such as from about 60% to about 90% of the second energy density. Such first energy density and/or such second energy density may be utilized for all or a portion of the respective pretreatment or additive-printing operation.

However, in other embodiments an energy density used to pretreat a workpiece-interface may be comparable to an energy density used to additively print an extension segment on a workpiece 116. For example, in some embodiments, an additive-leveling pretreatments and/or a melt-leveling pretreatments may be performed at an energy density comparable to an energy density used to additively print an extension segment on the pretreated workpiece-interface. However, in other embodiments, an additive-leveling pretreatments and/or a melt-leveling pretreatments may be performed at an energy density that differs significantly from an energy density used to print an extension segment on the pretreated workpiece-interface. For example, an energy density used to perform an additive-leveling pretreatment and/or a melt-leveling pretreatment may be selected so as to provide a desired relative density at or near the workpiece-interface of the workpiece. For example, an energy density may be selected for the additive-leveling pretreatment and/or the melt-leveling pretreatment so as to provide a graduated relative density that transitions from a first relative density of the workpiece to a second relative density of the workpiece-interface.

In still further embodiments, the energy density selected for a pretreatment such as an additive-leveling pretreatment and/or a melt-leveling pretreatment may be significantly greater than the energy density selected for additively printing an extension segment on the pretreated workpiece-interface. For example, some aberrant features may be more effectively remediated using an energy density that is significantly higher than suitable energy density values for additively-printing an extension segment on the pretreated workpiece-interface. In some embodiments, a workpiece-interface may be pretreated using a first energy density that is from about 100% to about 300% of a second energy density used to additively print an extension segment on the workpiece-interface, such as a first energy density that is from about 110% to about 300% of the second energy density, such as a first energy density that is from about 110% to about 200% of the second energy density, such as from about 110% to about 150% of the second energy density, such as from about 150% to about 200% of the second energy density, or such as from about 200% to about 300% of the second energy density. Such first energy density and/or such second energy density may be utilized for all or a portion of the respective pretreatment or additive-printing operation.

In various embodiments, the pretreatment may be performed without powder 126 applied across the workpiece-interface 120, while in other embodiments a thin layer of powder 126 may be applied across all or a portion of the workpiece-interface 120. The energy beam 144 may follow a tool path in a manner generally similar to a scan path followed when additively printing on a workpiece-interface; however, the energy beam 144 may exhibit a different characteristic and/or may achieve a different effect as compared to additively printing depending on the objectives of the pretreatment.

Regardless of whether or not there is powder 126 applied across the workpiece-interface 120, the energy beam may generate a melt pool path and/or a heat treatment path across the workpiece-interface 120. The pretreatment may prepare the workpiece-interface 120 for subsequently additively printing thereon, for example, by remediating aberrant features of the workpiece 116 and/or of the workpiece-interface 120 and/or by enhancing one or more features of the workpiece 116 and/or of the workpiece-interface 120 in preparation for additively printing an extension segment on the workpiece-interface 120. A workpiece 116 and/or a workpiece-interface 120 that includes one or more aberrant features may sometimes be referred to respectively as an aberrant workpiece 116 or an aberrant workpiece-interface 120. By way of example, an aberrant workpiece-interface 120 may be at least partially askew relative to the build plane 122. Additionally, or in the alternative, an aberrant workpiece-interface 120 may include one or more regions that differ in elevation relative to the build plane 122 and/or relative to one another, and/or that are at least partially askew relative to one another. As further example, an aberrant workpiece 116 or workpiece-interface 120 may include oxidation, contaminants, debris, subtractive modification artifacts (e.g., grooves, scratches, burrs, etc.), incongruent or undesirable grain structures and/or grain sizes, dislocations, microcracks, and/or voids.

The pretreatment may remediate such aberrant features and/or enhance one or more features. For example, in some embodiments, the pretreatment may by level the workpiece-interface 120 through melt-leveling and/or additive-leveling. Additionally, or in the alternative, the pretreatment may remove oxidation, contaminants, debris, and/or subtractive modification artifacts (e.g., grooves, scratches, burrs, etc.) from the workpiece-interface 120. The pretreatment may include melt-leveling and/or additive-leveling. Additionally, or in the alternative, the pretreatment may include heat-conditioning.

A pretreatment that includes melt-leveling pretreatment may include using the energy beam to generate a melt pool across at least a portion of the workpiece-interface 120. A pretreatment that includes additive-leveling may include applying powder 126 across at least a portion of the workpiece-interface 120 and melting or fusing the powder 126 to at least a portion of the workpiece-interface, such as at one or more regions of the workpiece-interface having a lower elevation relative to the build plane 122 and/or relative to one or more other regions of the workpiece-interface. It will be appreciated that a pretreatment may include additive-leveling and/or melt-leveling, individually or in combination. For example, a first region of the workpiece-interface 120 may be subjected to melt-leveling and a second region of the workpiece-interface 120 may be subjected to additive leveling. Additionally, or in the alternative, at least a portion of a workpiece interface 120 may be subjected to melt leveling followed by additive-leveling.

A pretreatment that includes heat-conditioning may include generating a heat-treatment scan path and/or a melt-pool scan path across at least a portion of the workpiece-interface. The heat-treatment scan path and/or a melt-pool scan path heat-conditioning pretreatment may include modifying the grain structure of the workpiece 116 at or near the workpiece-interface 120, for example, remediating aberrant grain structures and/or grain sizes, dislocations, microcracks, and/or voids. Heat-conditioning may also include enhancing grain structures and/or grain sizes, for example, providing a more uniform grain structure and/or a grain structure with enhanced hardness, tensile strength and/or ductility properties, providing a smaller or larger grain size, changing grain size distribution, and/or providing a grain size or distribution with enhanced hardness, tensile strength, and/or ductility properties. Such a heat-conditioning pretreatment may be provided concurrently with or as a result of melt-leveling or additive-leveling. Additionally, or in the alternative, a heat-conditioning pretreatment may be provided separately from a melt-leveling or additive-leveling pretreatment. A pretreatment may include heat-conditioning individually or in combination with melt-leveling and/or additive-leveling.

A pretreatment that includes additive-leveling may include applying one or more layers of powder 126 across the workpiece-interface 120 and using the energy beam 144 to melt or fuse the powder 126 to the top of the workpieces 116 (e.g., to melt or fuse a layer to the workpiece-interfaces 120 and/or melt or fuse subsequent layers thereto) similarly to additively printing an extension segment 206 on the workpiece 116. However, the characteristic and/or the effect of powder 126 melted or fused to a workpiece 116 as part of a pretreatment may be distinguished from the characteristic and/or the effect of powder 126 melted or fused to a workpiece 116 as part of additively printing an extension segment 206 on the workpiece 116. For example, in some embodiments, the powder 126 used for the pretreatment may have a different composition from the powder 126 used for additively printing an extension segment 206. Additionally, or in the alternative, in some embodiments, the energy beam 144 may provide a higher or lower energy density during the pretreatment relative to the energy density used when additively printing the extension segment 206. The one or more powder 126 layers melted or fused to the workpiece-interface during the pretreatment may be provided so as to additively-level the workpiece-interface and/or to provide desirable metallurgical properties across the workpiece-interface 120. The one or more powder 126 layers may be applied to all or a portion of a workpiece-interface 120, and a pretreatment command may be configured to melt or fuse the powder 126 to all or a portion of the workpiece-interface 120. Such characteristics and/or effects of pretreatment may improve bonding between the workpiece 116 and an extension segment 206 additively printed on the workpiece following pretreatment. Additionally, or in the alternative, such characteristics and/or effects of pretreatment may improve the precision and/or accuracy with which an extension segment 202 may be additively printed on a workpiece 116.

In some embodiments, when an aberrant workpiece-interface 120 exhibits skewness and/or differing elevations relative to the build plane 122 and/or relative to various regions, the skewness or differing elevation may range from about 1 micrometer (µm) to about 500 µm. For example, a first region of the workpiece-interface 120 may exhibit skewness and/or a differing elevation relative to the build plane 122 and/or relative to a second region of the workpiece-interface 120, such as from about 1 micrometer (µm) to about 500 µm, such as from about 25 µm to about 400 µm, such as from about 50 µm to about 250 µm, or such as from about 75 µm to about 150 µm, such as at least 10 µm, such as at least 25 µm, such as at least 50 µm, such as at least 75 µm, such as at least 150 µm, such as at least 250 µm, or such as at least 400 µm. Regardless of whether the pretreatment includes additive-leveling or melt-leveling, the pretreatment may at least partially level the workpiece-interface 120, reducing such skewness and/or differences in elevation. For example, skewness and/or a difference in elevation of an aberrant workpiece-interface 120 may be reduced by from 50% to 100%, such as from 75% to 100%, such as from 90% to 100%. A pretreatment may level the workpiece-interface 120, for example, as between a first region of the workpiece-interface 120 to a second region of the workpiece-interface 120, to from about 1 µm to about 75 µm, such as from about 1 µm to about 50 µm, such as from about 1 µm to about 25 µm, such as from about 1 µm to about 10 µm.

Still referring to FIGS. 1A and 1B, to perform a pretreatment, a scanner 146 controls the path of the energy beam 144 so as to melt or heat at least a portion of the workpiece-interface 120 and/or to melt or fuse at least portions of the powder 126 layer to the workpiece-interface 120. In some embodiments, after a layer of powder 126 is melted or fused to the workpieces 116, a build piston 148 gradually lowers the build platform 138 by an increment, defining a next build plane 122 for a next layer of powder 126, and the recoater 134 may then distribute the next layer of powder 126 across the next build plane 122. Sequential layers of powder 126 may be melted or fused to the workpieces 116 in this manner until the pretreatment process is complete.

Figure 2A:
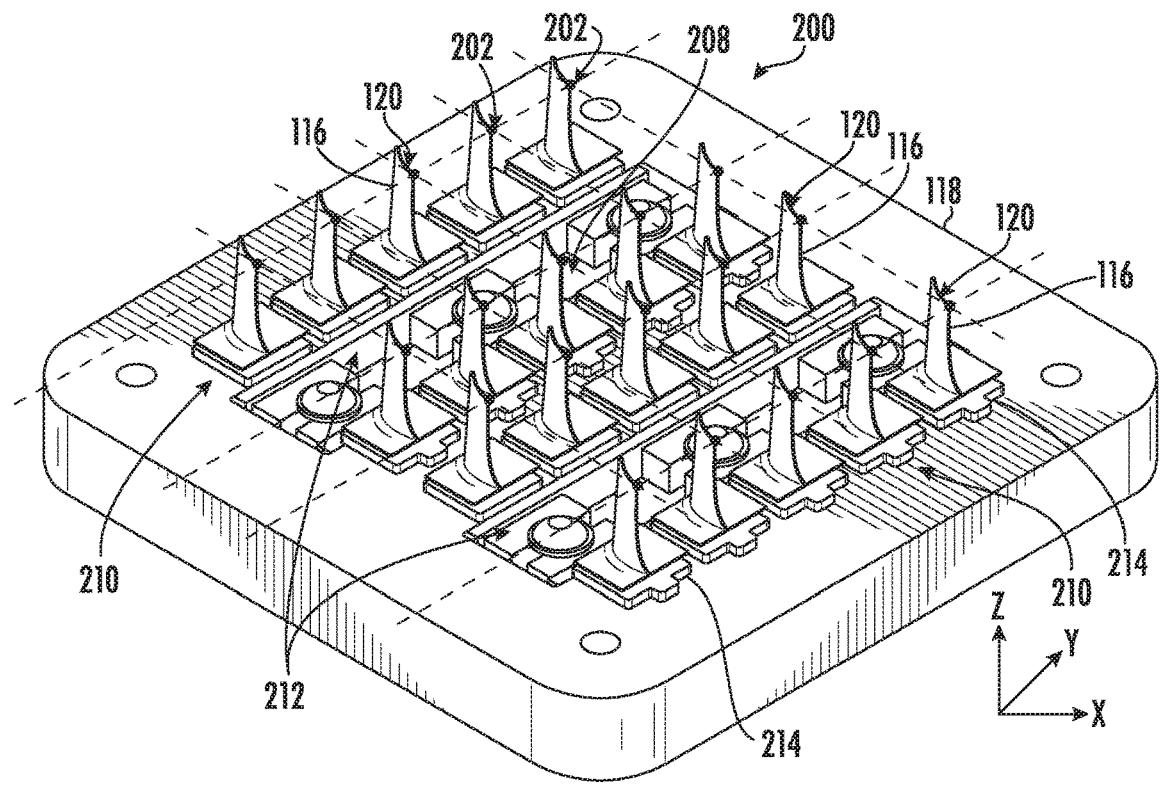
FIG. 2A schematically depicts an exemplary workpiece-assembly that includes a plurality of workpieces secured to a build plate.
Figure 2B:
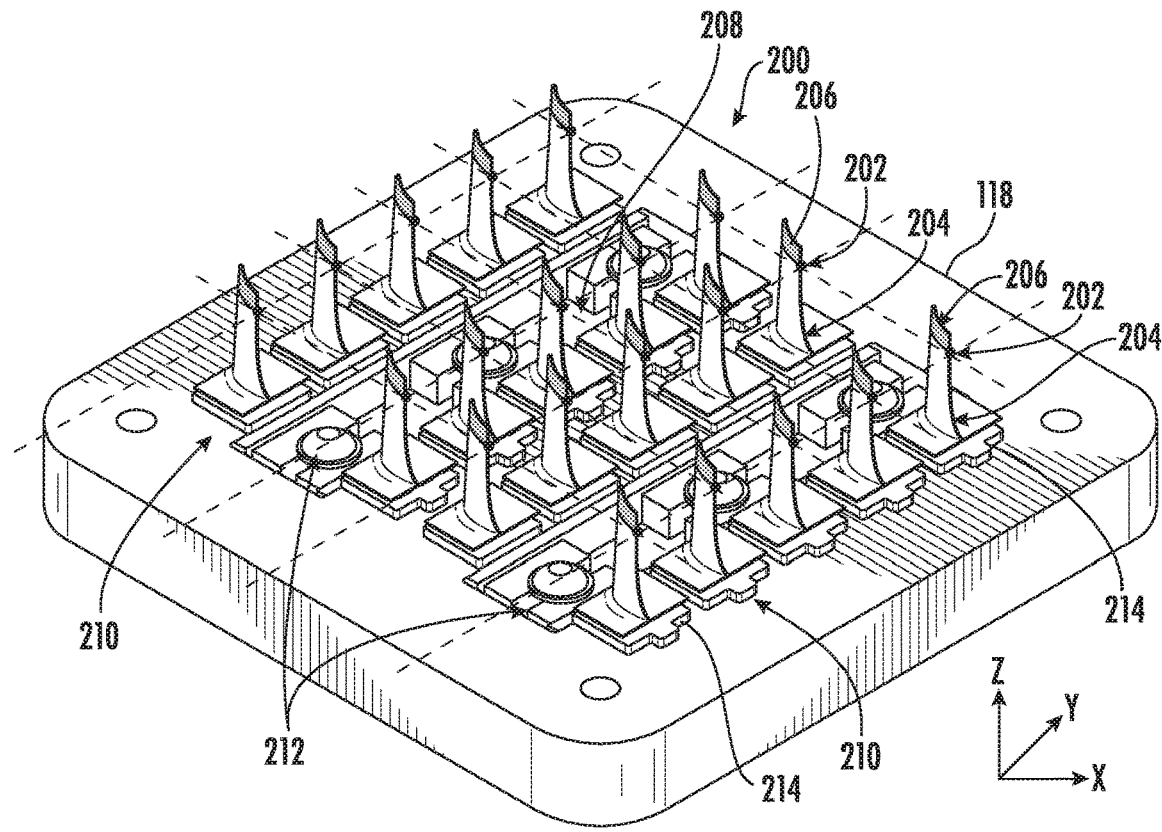
FIG. 2B schematically depicts the exemplary workpiece-assembly of FIG. 2A, with a plurality of components by additively printing extension segments the plurality of workpieces secured to the build plate.

Now referring to FIGS. 2A and 2B, an exemplary workpiece-assembly 200 that includes a plurality of workpieces 116 secured to a build plate 118 is shown. The build plate 118 may be configured to align the workpieces 116 to respective registration points 202. The registration points 202 may be mapped to a coordinate system. FIG. 2A shows a workpiece-assembly 200 that includes a plurality of workpieces 116 secured to a build plate 118. The arrangement depicted in FIG. 2A reflects a point in time prior to additively printing extension segments 206 onto the workpiece-interfaces 120. FIG. 2B shows the workpiece-assembly 200 of FIG. 2A but reflecting a point in time after an additive printing process. As shown in FIG. 2B, a plurality of components 204 are secured to the build plate 118, which were formed during the additive printing process by additively printing respective ones of a plurality of extension segments 206 onto respective ones of the plurality of workpieces 116.

The build plate 118 and/or workpiece-assembly 200 shown in FIGS. 2A and 2B may be used to facilitate additively printing an extension segment 206 on a workpiece 116, including additively printing respective ones of a plurality of extension segments 206 on respective ones of a plurality of workpieces 116 as part of a single build. In some embodiments, a build plate 118 may be configured to align the workpieces 116 to respective registration points 202 so as to facilitate image capture by the vision system 102, so as to facilitate alignment of CAD models with the workpieces 116 (e.g., so that extension segments 206 as defined by a CAD model may be properly additively printed on the workpieces 116), and/or so as to facilitate operability of the additive manufacturing machine 104.

The workpiece-assembly 200 shown in FIGS. 2A and 2B may hold any number of workpieces 116. As one example, the workpiece-assembly 200 shown may hold up to 20 workpieces 116. As another example, a workpiece-assembly 200 may be configured to hold from 2 to 100 workpieces 116, or more, such as from 2 to 20 workpieces 116, such as from 10 to 20 workpieces 116, such as from 20 to 60 workpieces 116, such as from 25 to 75 workpieces 116, such as from 40 to 50 workpieces 116, such as from 50 to 100 workpieces 116, such as from 5 to 75 workpieces 116, such as from 75 to 100 workpieces 116, such as at least 2 workpieces 116, such as at least 10 workpieces 116, such as at least 20 workpieces 116, such as at least 40 workpieces 116, such as at least 60 workpieces 116, or such as at least 80 workpieces 116.

In some embodiments, for example, when the workpieces 116 are airfoils such as compressor blades or turbine blades of a turbomachine, the workpiece-assembly 200 may be configured to hold a number of blades that corresponds to the number of blades in one or more stages of the compressor and/or turbine, as applicable. In this way, all of the blades of a given one or more stages of a turbine and/or compressor may be kept together and extension segments 206 may be additively printed thereon in one single build. It will be appreciated that the workpiece-assembly 200 and build plate 118 reflect one exemplary embodiment, which is provided by way of example and not to be limiting. Various other embodiments of a workpiece-assembly 200 and/or build plate 118 are contemplated which may also allow for the workpieces 116 to be secured with suitable positioning and alignment, all of which are within the spirit and scope of the present disclosure.

The exemplary workpiece-assembly 200 shown in FIGS. 2A and 2B includes a build plate 118 with one or more workpiece bays 208 disposed therein. Each of the one or more workpiece bays 208 may include one or more workpiece docks 210. The one or more workpiece bays 208 may additionally include one or more clamping mechanisms 212 which operate to secure one or more workpieces 116 to the build plate 118. The one or more workpiece docks 210 may be configured to receive one or more workpiece shoes 214, and the one or more workpiece shoes 214 may be respectively configured to receive a workpiece 116. The one or more clamping mechanisms 212 may be configured to clamp the workpiece shoes 214 in position within the corresponding workpiece docks 210.

A workpiece dock 210 and/or a workpiece shoe 214 may include one or more biasing members (not shown) configured to exert a biasing force (e.g., an upward or vertical biasing force) between the workpiece shoe 214 and the build plate 118 such as the bottom of the workpiece dock 210. The biasing members may include one or more springs, one or more magnet pairs (e.g. permanent magnets or electromagnets), one or more piezoelectric actuator, or the like operable to exert such a biasing force. The biasing force exerted by the biasing members biases the workpiece shoe 214 so as to allow the workpiece-interfaces 120 (e.g., the top surfaces of the workpieces 116) to be aligned with one another. By way of example, an alignment plate (not shown) may be placed on top of the workpieces 116 so as to partially compress the biasing members and bring the workpiece-interfaces 120 (e.g., the top surfaces of the workpieces 116) into alignment with one another. In some embodiments, elevating blocks (not shown) may be placed between the build plate 118 and the alignment plate (not shown) to assist in positioning the alignment plate on top of the workpieces 116 at a desired height. With the workpiece-interfaces 120 aligned with one another, the clamping mechanism 212 may be tightened so as to secure the workpieces 116 to the build plate 118.

Figure 3A:
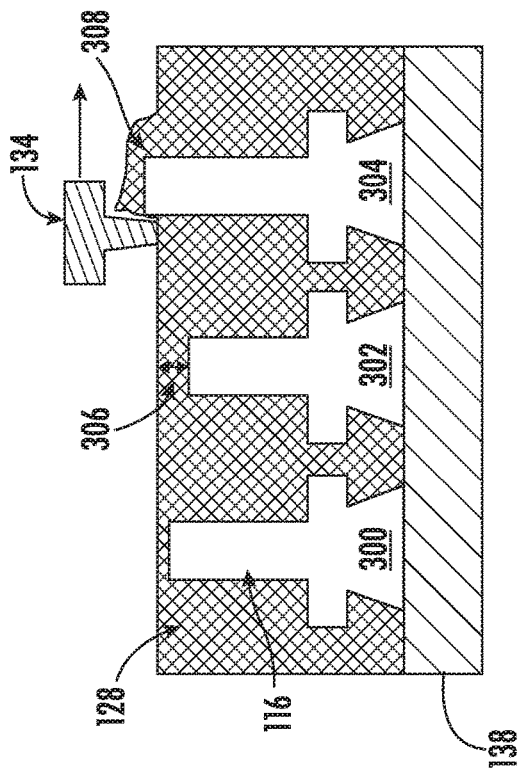
FIGS. 3A and 3B respectively depict a plurality of workpieces misaligned with a build plane, and a recoater consequently failing to successfully apply a uniform layer of powder across the build plane.
Figure 3B:
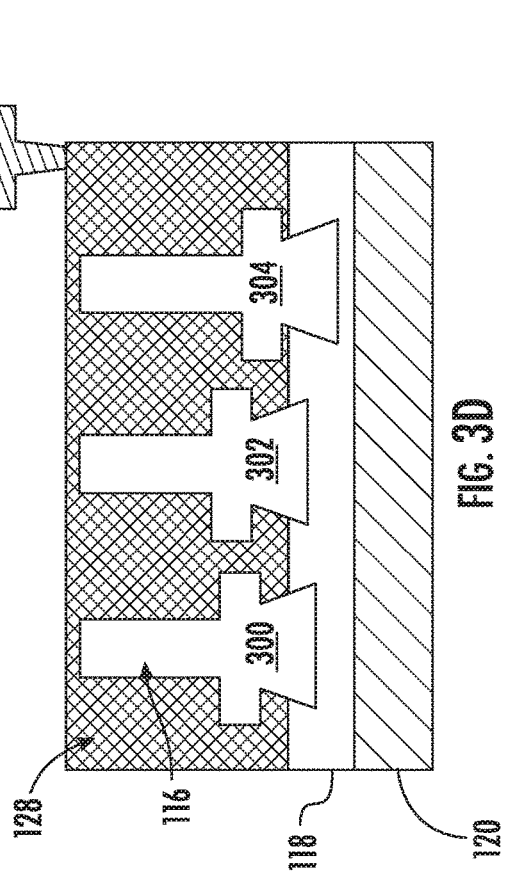

As shown in FIGS. 3A and 3B, a misalignment of workpieces 116 from the build plane 122 may introduce printing failures. FIG. 3A shows a plurality of workpieces 116, including a first workpiece 300 situated in alignment with the build plane 122, a second workpiece 302 situated below the build plane 122, and a third workpiece 304 situated above the build plane 122. When the recoater 134 distributes powder 126 across the build plane 122, the first workpiece 300 would generally be expected to receive an appropriately thick layer of powder 126 across the top portion thereof. By contrast, the second workpiece 302 and the third workpiece 304 illustrate misalignments from the build plane 122 which may likely cause printing failures. For example, the second workpiece 302 may exhibit printing failures attributable to an overly thick layer 306 of powder 126, such as insufficient bonding of the powder 126 layer to the second workpiece 302. Such insufficient bonding may be caused by incomplete melting of the powder 126 or the top layer (e.g., the workpiece-interface 120) of the second workpiece 302, as well as voids formed from gasses trapped within the layer that with adequate melting generally would be eliminated. As another example, the third workpiece 304 may exhibit printing failures attributable to the surface 308 of the third workpiece 304 protruding above the build plane 122, such that the recoater 134 may skip over the protruding surface 308 of the third workpiece 304 and/or such that the recoater 134 may become obstructed by the third workpiece, damaging the recoater 134 or preventing the recoater 134 from moving past the protruding surface 308.

In some embodiments, even if a mis-aligned workpiece 116 does not cause a total printing failure such as obstructing the recoater 134, the misalignment may cause variations in melting, dimensional inaccuracy, microhardness, tensile properties, and/or material density. These variations may propagate as sequential layers are added to the workpieces 116. Additionally, components 204 with such variations may fail during operation, potentially causing damage to other equipment including catastrophic failures. For example, if a compressor blade or turbine blade fails, the failure may damage other portions of the turbomachine potentially rendering the turbomachine immediately inoperable.

Figure 3C:
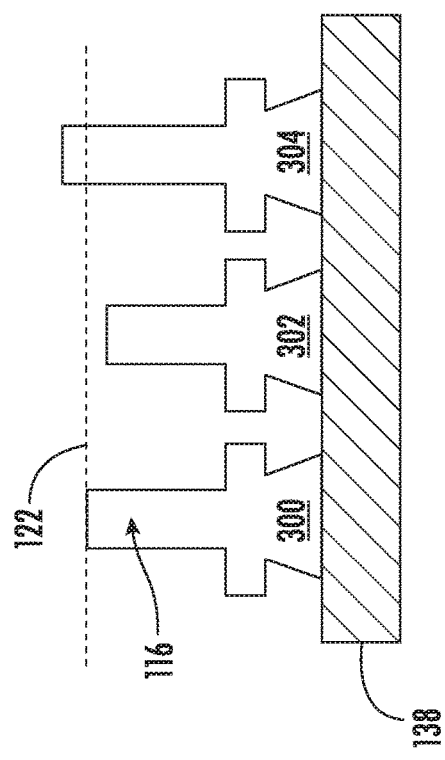
FIGS. 3C and 3D respectively depict a plurality of workpieces aligned with a build plane, and a recoater successfully applying a uniform layer of powder across the build plane.
Figure 3D:
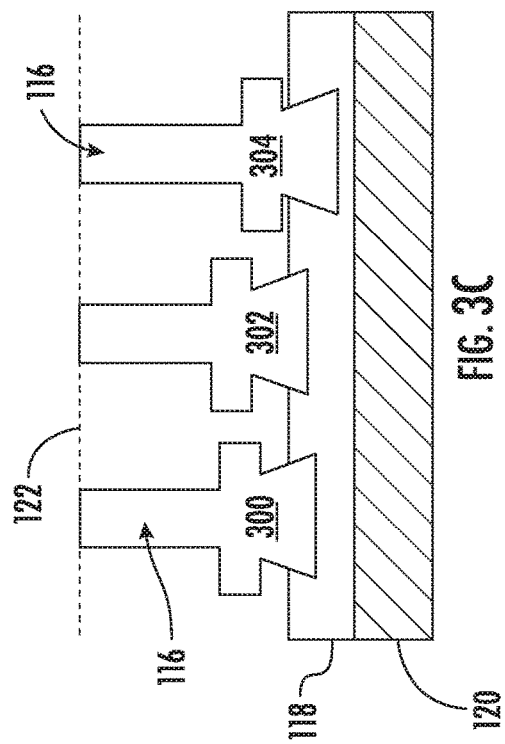

However, as shown in FIGS. 3C and 3D, the present disclosure provides a build plate 118 and/or workpiece-assembly 200 configured to at least partially align the top portions of a plurality of workpieces 116 with a build plane 122. A pretreatment may then be applied to the plurality of workpieces 116 to further align the workpiece-interfaces 120 to the build plane 122. In an exemplary embodiment, the top portion of a workpiece 116 provides a workpiece-interface 120, which workpiece-interface 120 may be prepared at least in part by performing a subtractive modification to the workpiece 116. Such workpiece-interfaces 120 may include a surface, a plane, a tip, or the like generally corresponding to the highest or tallest portion of the workpiece 116 when loaded into the build plate 118. With the top portions aligned by the workpiece-assembly 200, a plurality of extension segments 206 may be additively printed on a corresponding plurality of workpieces 116 together in a common build using a powder bed fusion process while assuring that the recoater 134 may apply uniform layers of powder 126 across each of the workpieces 116. In some embodiments, the build plate 118 may be capable of aligning a plurality of workpieces 116 to a build plane 122 within a tolerance of 100 microns or less, such as 80 µm or less, such as 60 µm or less, such as 40 µm or less, such as 20 µm or less, or such as 10 µm or less.

The alignment provided by the workpiece-assembly 200 may compensate for differences in the size of respective workpieces 116. Such differences in size may be attributable to workpieces 116 having variations in size arising from any source, including the workpieces 116 having a different original configuration, and/or the workpieces 116 having variations in size arising from a subtractive modification performed to prepare a workpiece-interface 120 on the workpieces 116. In some embodiments, for example, when the workpieces 116 are airfoils of a turbomachine, such as compressor blades and/or turbine blades, such airfoils from different stages of the turbomachine may be secured within a workpiece-assembly 200 with the respective workpiece-interfaces 120 (e.g., the top surfaces of the workpieces 116) aligned with one another even though the respective workpieces 116 may have different sizes relative to one another.

Now referring to FIG. 4, an exemplary method 400 of additively printing an extension segment 206 on a workpiece-interface 120 of a workpiece 116 will be described. The exemplary method may be performed by an additive manufacturing system 100 as described herein, such as using a control system 106 communicatively coupled to a vision system 102 and an additive manufacturing machine 104. An exemplary method 400 includes, at step 402, determining a workpiece-interface 120 from a digital representation of a field of view 114 having been captured by a vision system 102. Determining the workpiece 116 may include determining a workpiece-interface 120. For example, the exemplary method may include determining a workpiece-interface 120 of each of a plurality of workpieces 116 from one or more digital representations of one or more fields of view 114 having been captured by a vision system 102. Determining the workpiece-interface 120 may include determining one or more coordinates of the workpiece-interface 120, for example, of respective ones of the plurality of workpieces 116. The one or more fields of view 114 may include one or more workpieces situated in three-dimensional space, such as a two-dimensional field of view 114 or a three-dimensional field of view 114. For example, the one or more fields of view 114 may include a two-dimensional or three-dimensional top view of one or more workpieces 116 individually and/or of a plurality of workpieces 116 collectively, such as a two-dimensional or three-dimensional top view of the workpiece-interface 120 of one or more workpieces 116 individually and/or of a plurality of workpieces 116 collectively.

In some embodiments, an exemplary method 400 may include, at step 404, obtaining a digital representation of a field of view 114 using a vision system 102, where the field of view 114 includes a workpiece-interface 120. This may include obtaining one or more digital representations of the one or more fields 114 of view using the vision system 102. Alternatively, an exemplary method 400 may commence with one or more digital representations already having been obtained from the vision system 102.

An exemplary method 400 additionally includes, at step 406, transmitting to an additive manufacturing machine 104, a print command configured to additively print an extension segment 206 on a workpiece-interface 120, with the print command having been generated based at least in part on the digital representation of the field of view 114. The print command may be configured to additively print the extension segment 206 on a workpiece-interface 120. One or more print commands may be transmitted to the additive manufacturing machine 104, and the one or more print commands may be configured to additively print a plurality of extension segments 206 with each respective one of the plurality of extension segments 206 being located on the workpiece-interface 120 of a corresponding respective one of the plurality of workpieces 116.

The one or more print commands may be generated based at least in part on the one or more digital representations of the one or more fields of view 114. The exemplary method 400 may optionally include, at step 408, generating a print command based at least in part on a digital representation of a field of view 114 captured by the vision system 102. This may include generating one or more print commands based at least in part on one or more digital representations of the one or more fields of view 114 that include one or more workpieces 116 and/or one or more workpiece-interfaces 120 thereof. Alternatively, an exemplary method 400 may be performed with one or more print commands already having been generated or having been generated separately, such as by the control system 106 or otherwise.

An exemplary method 400 may additionally include, at step 410, additively printing an extension segment 206 on a workpiece-interface 120 based at least in part on the print command. This may include additively printing respective ones of a plurality of extension segments 206 on corresponding respective ones of a plurality of workpieces 120, such as on corresponding respective ones of a plurality of workpiece-interfaces 120 thereof. For example, the one or more print commands may be configured to position respective ones of the plurality of extension segments 206 on the workpiece-interface 120 of corresponding respective ones of the plurality of workpieces 116 based at least in part on one or more coordinates of the respective workpiece-interface 120.

In some embodiments, the exemplary method 400 may include exposing a workpiece-interface 120 to a pretreatment, such as using an energy beam 144 from the additive manufacturing machine 104. An exemplary method 400 may include, at step 412, transmitting to an additive manufacturing machine 104, a pretreatment command configured to expose the workpiece-interface 120 to the pretreatment. Step 412 may be performed, for example, after having determined a workpiece-interface 120 at step 402. The pretreatment command may be generated based at least in part on a digital representation of a field of view 114 having been captured by the vision system 102. In some embodiments, the exemplary method 400 may optionally include, at step 414, generating the pretreatment command based at least in part on the field of view 114.

An exemplary method 400 may additionally include, at step 416, exposing a workpiece-interface 120 to the pretreatment based at least in part on the pretreatment command. This may include exposing respective ones of a plurality of workpiece-interfaces 120 to respective ones of a plurality of corresponding pretreatments. For example, the one or more pretreatment commands may be configured to expose respective ones of the plurality of workpiece-interfaces 120 to a corresponding pretreatment based at least in part on one or more coordinates of the respective workpiece-interface 120.

After having exposed the workpiece-interface 120 to the pretreatment, the exemplary method 400 may proceed with additively printing an extension segment 206 on the workpiece-interface 120, at step 410. Alternatively, in some embodiments, after having exposed the workpiece-interface 120 to the pretreatment, the exemplary method 400 may return to step 404, to obtain a digital representation of a field of view 114 using the vision system 102, in which the field of view 114 includes a pretreated workpiece-interface 120. In some embodiments, a digital representation that includes a pretreated workpiece-interface 120 may more suitable for determining a workpiece-interface at step 402. For example, a pretreated workpiece-interface 120 may allow the vision system 102 to more accurately and/or precisely determine the workpiece-interface 120 at step 402. This, in turn, may allow for generating a more accurate and/or precise print command at step 408 and/or for more accurately and/or precisely additively printing an extension segment on the workpiece-interface 120 at step 410.

The exemplary method 400 may be performed so as to provide a component 204 by additively printing one or more extension segments 206 onto one or more workpieces 116. In some embodiments, a plurality of workpieces 116 may include a plurality of blades for a turbomachine, such as compressor blades and/or turbine blades, and the corresponding plurality of extension segments 206 may include a plurality blade tips. The components 204 may be additively printed in a layer-by-layer manner using an additive manufacturing machine 104. For example, the exemplary method 400 may include additively printing a first layer of a plurality of extension segments 206 on the workpiece-interface 120 of respective ones of the plurality of workpieces 116, followed by additively printing a second layer of the plurality of extension segments 206 on the first layer of the plurality of extension segments 206. The first layer may be an interface layer between the workpiece-interface 120 and the extension segment 206 to be additively printed thereon. The second layer may be a subsequent layer of the extension segment 206. In some embodiments, a component 204 may be additively printed by melting or fusing a single interface layer of powered material to the workpiece-interface 120.

Figure 5C:
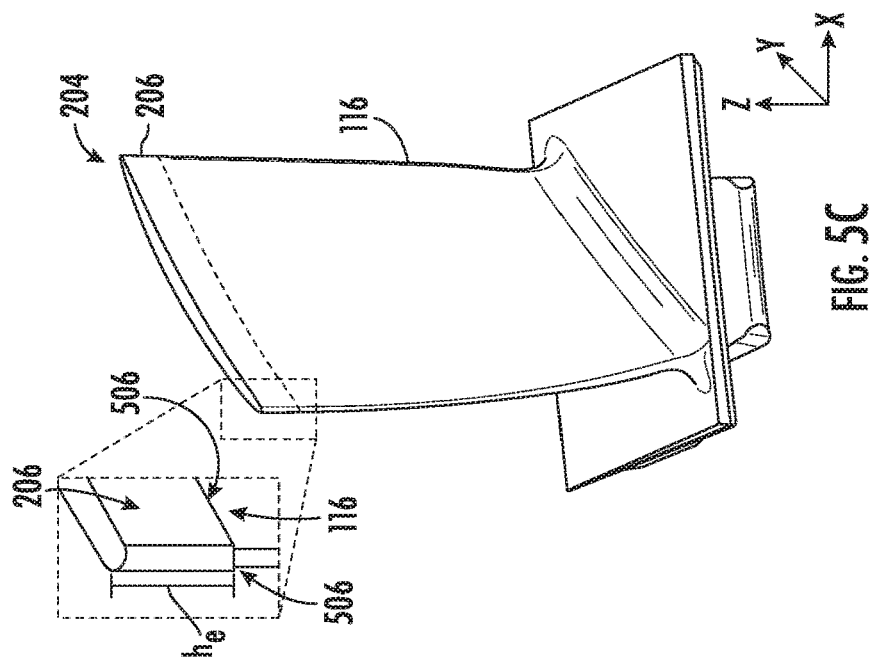
FIG. 5C schematically depicts an exemplary component formed by additively printing an extension segment on the workpiece depicted in FIG. 5B.
Figure 5B:
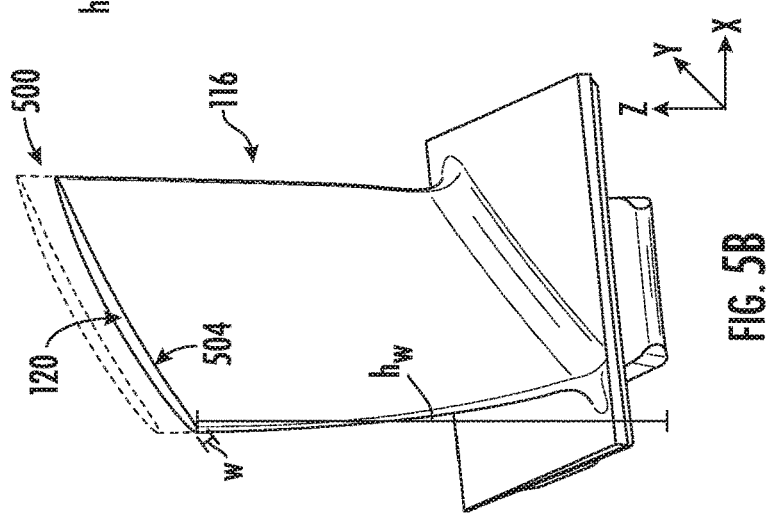
FIGS. 5A and 5B schematically depicts an exemplary workpiece before and after subjecting the workpiece to a subtractive modification, respectively.
Figure 5A:
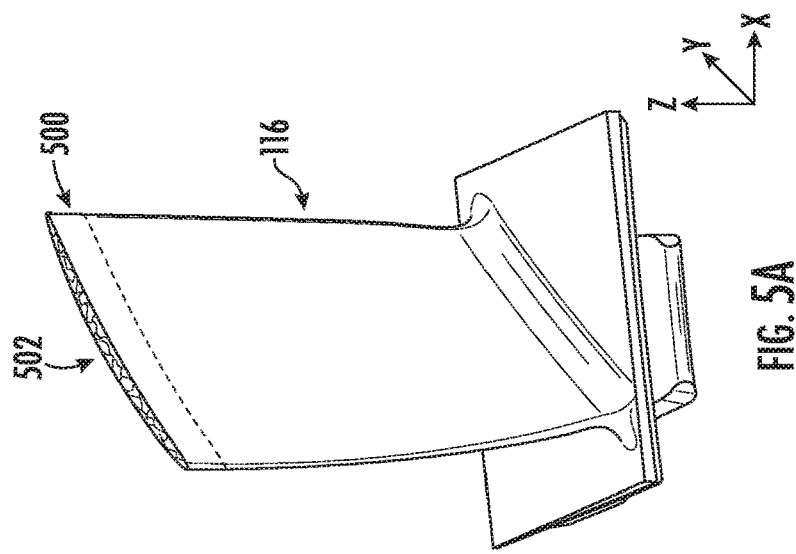

Now referring to FIGS. 5A-5C, an exemplary workpiece 116 (FIGS. 5A and 5B) and an exemplary component 204 (FIG. 5C) are shown. The exemplary workpiece 116 and component 204 may be an airfoil such as a compressor blade or a turbine blade, or any other workpiece 116 or component 204. As shown, the workpiece 116 and component 204 represent a high-pressure compressor blade (HPC-blade) of a turbomachine. The workpiece 116 may be an originally fabricated workpiece, as well as a workpiece 116 being repaired, rebuilt, and so forth.

An exemplary method 400 may include subjecting workpieces 116 to a subtractive modification so as to provide a workpiece-interface 120 thereon. This may include cutting, grinding, machining, electrical-discharge machining, brushing, etching, polishing, or otherwise substantively modifying a workpiece 116 so as to provide a workpiece-interface 120 thereon. The subtractive modification may include removing a subtraction portion 500 (FIG. 5A), so as to provide a workpiece-interface 120 (FIG. 5B). The subtractive modification may include removing at least a portion of a surface of the workpiece 116 that has been worn or damaged. For example, as shown in FIG. 5A, the workpiece 116 may include artifacts 502, such as microcracks, pits, abrasions, defects, foreign material, depositions, imperfections, and the like. Such artifacts 502 may commonly appear on the top surface of a compressor or turbine blade as a result of the extreme conditions to which such blades are subjected. The subtractive modification may additionally or alternatively be performed so as to improve bonding between the workpiece 116 and the extension segment 206.

When the workpieces 116 include airfoils for a turbomachine, such as compressor blades and/or turbine blades, as shown in FIGS. 5A and 5B, the subtractive modification may include removing a tip portion of the airfoils, for example, to remove a worn or damaged area. Alternatively, in some embodiments, a component 204 may initially appear as shown in FIG. 5B, without requiring a subtractive modification, or without requiring a substantial portion of the component 204 to be removed during the subtractive modification. For example, the workpiece 116 may be an intermediate workpiece 116 in an original fabrication process.

The amount of material removed during the subtractive modification may vary depending on the nature of the workpiece 116, such as how much material needs to be subtracted so as to provide a workpiece-interface 120 and/or to remove worn or damaged material. The amount of material removed may be limited to only a very thin surface layer when the subtractive modification is intended to prepare a workpiece-interface 120 without removing layers of more substantial thickness, or when wear or damage to a workpiece 116 is limited to a thin surface layer. Alternatively, the amount of material removed from a workpiece 116 may include a majority of the workpiece 116, such as when the workpiece 116 has larger cracks, breaks, or other damage penetrating deeper into the workpiece 116.

In some embodiments, the amount of material removed may be from about 1 micron to 1 centimeter, such as from about 1 μm to about 1,000 μm, such as from about 1 μm to about 500 μm, such as from about 1 μm to about 100 μm, such as from about 1 μm to about 25 μm, such as from about 100 μm to about 500 μm, such as from about 500 μm to about 1,000 μm, such as from about 100 μm to about 5 mm, such as from about 1 mm to about 5 mm, such as from about 5 mm to about 1 cm. In still further embodiments, the amount of material removed may be from about 1 centimeter to about 10 centimeters, such as from about 1 cm to about 5 cm, such as from about 2 cm to about 7 cm, such as from about 5 cm to about 10 cm.

Regardless of the nature of the workpiece 116, as shown in FIG. 5C, a near net shape component 204 may be formed by additively printing an extension segment 206 on the workpiece 116. The near net shape component 204 may include an extension segment 206 that is substantially congruent with the workpiece 116 (and/or the workpiece-interface perimeter 504), such that the extension segment 206 aligns with the workpiece 116 (and/or the workpiece-interface perimeter 504) with sufficient congruency that a near net shape component 204 may be provided without requiring a subsequent subtractive modification apart from surface finishing such as polishing, buffing, and the like. The extension segments 206 may be additively printed on the respective workpiece-interfaces 120 such that the extension segments 206 are substantially congruent with the workpieces 116 and/or the workpiece-interfaces 120. For example, the workpiece-interface 120 may have a workpiece-interface perimeter 504 (FIG. 5B), and the extension segments 206 may be additively printed on the respective workpiece-interfaces 120 such that the extension segment 206 is substantially congruent with the workpiece-interface perimeter 504. The extension segments 206 may include an interface layer that is substantially congruent with the workpiece-interface 120, including an interface layer perimeter that is substantially congruent with the workpiece-interface perimeter 504. In an exemplary embodiment, an extension segment 206 additively printed on a workpiece-interface 120 may be regarded as substantially congruent with the workpiece 116 (and/or the workpiece-interface perimeter 504) when the workpiece 116 is an airfoil (e.g., a compressor blade or a turbine blade) having a workpiece-interface 120 in the form of a crescent shape and the extension segment 206 also has a crescent shape determined at least in part based on a digital representation of the workpiece-interface 120 of the workpiece 116.

In some embodiments, as shown in FIG. 5C, the component 204 may include an overhang 506, such that the extension segment 206 overhangs the workpiece-interface 120 (e.g., the workpiece-interface perimeter 504). Notwithstanding the presence of the overhang 506, the component 204 may be regarded as a near net shape component 204, and/or the extension segment 206 may be regarded as being substantially congruent with the workpiece 116 (and/or the workpiece-interface perimeter 504), such as when the overhang 506 does not require a subsequent subtractive modification apart from surface finishing such as polishing, buffing, and the like. The purpose of the overhang 506 may be, for example, to leave a small portion of material available for such surface finishing, including polishing, buffing, and the like. The size of the overhang 506 may be selected based on the nature of the finishing processes. After such finishing processes, the overhang 506 may be substantially removed.

By way of example, in some embodiments, the overhang 506 may be from about 1 micron to 1,000 microns, such as from about 1 µm to 500 µm, such as from about 1 µm to 100 µm, such as from about 1 µm to 50 µm, such as from about 1 µm to 25 µm, such as from about 10 µm to 50 µm, such as from about 25 µm to 50 µm, such as from about 50 µm to 100 µm, such as from about 50 µm to 250 µm, such as from about 250 µm to 500 µm, such as from about 500 µm to 1,000 µm, such as about 1.000 µm or less, such as about 500 µm or less, such as about 250 µm or less, such as about 100 µm or less, such as about, such as about 50 µm or less, or such as about 25 µm or less. In an exemplary embodiment, the respective ones of a plurality of extension segments 206 may overhang the corresponding workpiece-interface 120 of respective ones of the plurality of workpieces 116 with the overhang 506 having a maximum overhang distance of about 1,500 microns or less, such as about 1,000 µm or less, such as about 500 µm or less, or such as about 100 µm or less or such as about 50 µm or less or such as about 25 µm or less. In some embodiments, an extension segment 206 may be regarded as being substantially congruent with the workpiece 116 and/or the workpiece-interface perimeter 504 when the extension segment 206 includes an overhang 506 having a maximum overhang distance of about 1,500 microns or less, such as about 1,000 µm or less, such as about 500 µm or less, or such as about 100 µm or less or such as about 50 µm or less or such as about 25 µm or less.

While a workpiece-interface 120 may be relatively small, the additive manufacturing machine 104 may nevertheless additively print an extension segment 206 thereon so as to provide a near net shape component 204. For example, as shown in FIG. 5B, a workpiece 116 may have a workpiece-interface 120 with a cross-sectional width, w, and a height, $h_w$, such that a ratio of the height of the workpiece 116 to the cross-sectional width may be from about 1:1 to 1,000:1, such as from about 1:1 to 500:1, such as from about 1:1 to 250:1, such as from about 1:1 to about 100:1, such as from about 1:1 to about 75:1, such as from about 1:1 to about 65:1, such as from about 1:1 to about 35:1, such as from about 2:1 to about 100:1, such as from about 5:1 to about 100:1, such as from about 25:1 to about 100:1, such as from about 50:1 to about 100:1, such as from 75:1 to about 100:1, such as at least 5:1, such as at least 10:1, such as at least 25:1, such as at least 50:1, such as at least 75:1 such as at least 100:1, such as at least 250:1, such as at least 500:1, such as at least 750:1.

As shown in FIG. 5C, an extension segment 206 may have a height, $h_e$, such that a ratio of the cross-sectional width, w, of the workpiece 116 to the height, $h_e$, of the extension segment 206 may be from about 1:1,000 to about 1,000:1, such as about 1:1,000 to about 1:500, such as about 1:500 to about 1:100, such as about 1:100 to about 1:1, such as about 1:10 to about 1:1, such as about 1:10 to about 10:1, such as about 1:1 to about 1:1,000, such as about 1:1 to about 1:10, such as about 1:1 to 100:1, such as about 1:1 to about 500:1, or such as about 500:1 to about 1,000:1.

A ratio of the height, $h_w$, of the workpiece 116 to the height, $h_e$, of an extension segment 206 to may be from about 2:1 to about 10,000:1, such as from about 10:1 to about 1,000:1, such as from about 100:1 to about 10,000:1, such as from about 100:1 to about 500:1, such as from about 500:1 to about 1,000:1, such as from about 1,000:1 to about 5,000:1, such as from about 5,000:1, such as from about 2,500:1 to about 7,500:1, such as at least 2:1, such as at least 100:1, such as at least 500:1, such as at least 1,000:1, such as at least 5,000:1, or such as at least 7,000:1.

In some embodiments, a workpiece 116 may have a cross-sectional width of from about 0.1 millimeters to about 10 centimeters, such as about 0.1 mm to about 5 cm, such as 0.2 mm to about 5 cm, such as about 0.5 mm to about 5 cm, such as about 0.5 mm to about 1 cm, such as about 0.1 mm to about 0.5 mm, such as about 0.1 mm to about 5 mm, such as about 0.5 mm to about 10 mm, such as about 0.5 mm to about 5 mm, such as about 0.5 mm to about 3 mm, such as about 1 mm to about 5 mm, such as about 3 mm to about 10 mm, such as about 1 cm to about 10 cm, such as about 10 cm or less, such as about 5 cm or less, such as about 3 cm or less, such as about 1 cm or less, such as about 5 mm or less, such as about 3 mm or less, such as about 1 mm or less, such as about 0.5 mm or less. In other embodiments, a workpiece 116 may have a relatively larger cross-sectional width, such as from about 1 cm to about 25 cm, such as from about 5 cm to about 15 cm, such as from about 5 cm to about 10 cm, such as at least about 1 cm, such as at least about 5 cm, such as at least about 10 cm, such as at least about 15 cm, or such as at least about 20 cm.

In some embodiments, a workpiece 116 may have a height, $h_w$, of from about 0.5 centimes to about 25 centimeters, such as about 0.5 cm to about 5 cm, such as about 0.5 cm to about 3 cm, such as about 1 cm to about 3 cm, such as about 1 cm to about 10 cm, such as about 10 cm to about 15 cm, such as about 15 cm to about 25, such as at least about 0.5 cm, such as at least 1 cm, such as at least 3 cm, such as at least 5 cm, such as at least 1 about 0 cm, such as at least about 20 cm, such as about 25 cm or less, such as about 20 cm or less, such as about 15 cm or less, such as about 10 cm or less, such as about 5 cm or less, such as about 3 cm or less, or such as about 1 cm or less.

In some embodiments, an extension segment 206 may have a height, $h_e$, of from about 10 microns to about 20 centimeters, such as about 10 μm to about 1,000 μm, such as about 20 μm to about 1,000 μm, such as about 50 μm to about 500 μm, such as about 100 μm to about 500 μm, such as about 100 μm to about 1,000 μm, such as about 100 μm to about 500 μm, such as about 250 μm to about 750 μm, such as about 500 μm to about 1,000 μm, such as about 1 mm to about 1 cm, such as about 1 mm to about 5 mm, such as about 1 cm to about 20 cm, such as about 1 cm to about 5 cm, such as about 5 cm to about 10 cm, such as about 10 cm to about 20 cm, such as about 20 cm or less, such as about 10 cm or less, such as about 5 cm or less, such as about 1 cm or less, such as about 5 mm or less, such as about 3 mm or less, such as about 1 mm or less, such as about 500 μm or less, such as about 250 μm or less.

In exemplary embodiment, a workpiece 116 may have a height, $h_w$, of from about 1 cm to 5 cm, and a cross-sectional width, w, of from about 0.1 mm to about 5 mm, and an extension segment 206 additively printed thereon may have a height, $h_e$, of from about 10 μm to about 5 mm, such as from about 100 μm to about 1 mm, or such as from about 1 mm to about 5 mm. An exemplary workpiece 116 may have a ratio of the height, $h_w$, of the workpiece 116 to the height, $h_e$, of an extension segment 206 of from about 2:1 to about 10,000:1, such as about 2:1 to about 10:1, such as about 10:1 to about 50:1, such as about 50:1 to about 100:1, such as about 100:1 to about 1,000:1, such as about 1,000:1 to 5,000:1, such as about 10:1 to about 10,000:1, such as about 2:1 to about 100:1, such as about 50:1 to about 5,000:1, such as about 100:1 to about 1,000:1, such as about 1,000:1 to about 5,000:1, such as about 1,000:1 to about 10,000:1, such as about 5,000:1 to 1 about 0,000:1, such as at least 2:1, such as at least 10:1, such as at least 50:1, such as at least 100:1, such as at least 500:1, such as at least 1,000:1, such as at least 5,000:1.

An exemplary workpiece 116 may have a ratio of the cross-sectional width, w, of the workpiece 116 to the height, $h_e$, of the extension segment 206 of from about 1:50 to about 1,000:1, such as about 1:10 to about 1:1, such as about 1:5 to about 1:1, such as about 1:1 to about 5:1, such as about 5:1 to about 10:1, such as about 10:1 to about 50:1, such as about 50:1 to about 100:1, such as about 100:1 to about 500:1, such as about 500:1 to about 1,000:1, such as about 2:1 to about 1,000:1, such as about 1:2 to about 1:1, such as about 1:1 to 1,000:1, such as about 2:1 to about 10:1, such as about 5:1 to about 500:1, such as about 10:1 to about 100:1, such as about 100:1 to 500:1, such as about 100:1 to 1.000:1, such as about 500:1 to 1,000:1, such as at least 2:1, such as at least 10:1, such as at least 50:1, such as at least 100:1, such as at least 500:1.

Referring again to FIGS. 1A and 1B, exemplary methods of obtaining a digital representation of a field of view 114 using a vision system 102 will be discussed. When the vision system 102 is integrated with the additive manufacturing machine 104, the vision system 102 may capture digital images of the workpieces 116 with the workpieces 116 secured to the build plate 118, and the build plate 118 secured to the build platform 138. The chuck system 140 may position and align the build plate 118 within the build chamber 128 and on the build platform 138 with a high level of precision and accuracy, which also thereby aligns and positions the workpieces 116 within the build chamber 128. The digital images may also be captured prior to the build plate 118 having been placed in the build chamber 128 and secured to the build platform 138; however, generally it will be preferable to take advantage of the positioning and alignment provided by the chuck system 140. When the vision system 102 is not integrated with the additive manufacturing machine 104, digital images may be captured before the build plate 118 has been placed in the build chamber 128 and secured to the build platform 138, such as in the case of a vision system 102 that is provided as a separate unit from the additive manufacturing machine 104.

The digital images of the workpieces 116 may be captured during or after powder 126 has been added to the build chamber 128. Good contrast between the workpiece-interface 120 and the surrounding portions of the area of interest 600 (and/or between the workpiece-interface perimeter 504 and the surrounding portions of the area of interest 600) (e.g., FIGS. 6A and 6B) may improve the performance of the edge detection algorithm. In some embodiments, the digital images may be captured before distributing powder 126 all the way up to the build plane 122 and/or across the workpiece-interfaces 120. In some embodiments, image capture may be improved by introducing a layer of powder 126 to the build chamber 128 that comes to just below the build plane 122 and/or just below the workpiece-interfaces 120, which is sometimes referred to as a "scratch coating." For example, the powder 126 may provide an improved background (e.g., better contrast, less reflection, more uniformity, etc.) that allows the one or more cameras 112 to better focus on the workpiece-interfaces 120. Additionally, or in the alternative, in some embodiments a layer of powder 126 may be applied across the workpiece-interfaces 120 so as to determine variations in elevation of the respective workpiece-interfaces 120. For example, a region of a workpiece-interface 120 having a higher elevation may protrude from the elevation of a powder 126 layer, while the powder layer may cover a region of the workpiece-interface 120 having a lower elevation. Such variations in elevation may be utilized when generating pretreatment commands. However, powder 126 covering a portion of a workpiece-interface 120 may obscure the perimeter of the workpiece-interface 120 and thereby may reduce the quality of the digital images and/or may affect the reliability of the control system 106 in determining the respective workpiece-interfaces 120.

In some embodiments, a layer of powder 126 may be added to the build chamber 128 that comes to just below the build plane 122 and/or just below the workpiece-interfaces 120 prior to the digital images of the workpieces 116 being captured. The digital images may be captured with such a layer of powder 126 in place. Any stray powder 126 may be brushed away from the workpiece-interfaces 120 prior to capturing the digital images. After having captured digital images with such a layer of powder 126 just below the build plane 122 and/or just below the workpiece-interfaces 120, additional powder may be added and additional digital images may be captured to determine variations in elevation of the respective workpiece-interfaces 120 and/or to generate pretreatment commands. In still further embodiments, a skirt (not shown) may be utilized that include slits for the workpiece-interfaces 120 to slip through. The skirt may be placed over the workpieces 116 when secured to the build plate 118, leaving the workpiece-interfaces 120 exposed for purposes of obtaining digital images, and then the skirt may be removed prior to additive printing.

Figure 6A:
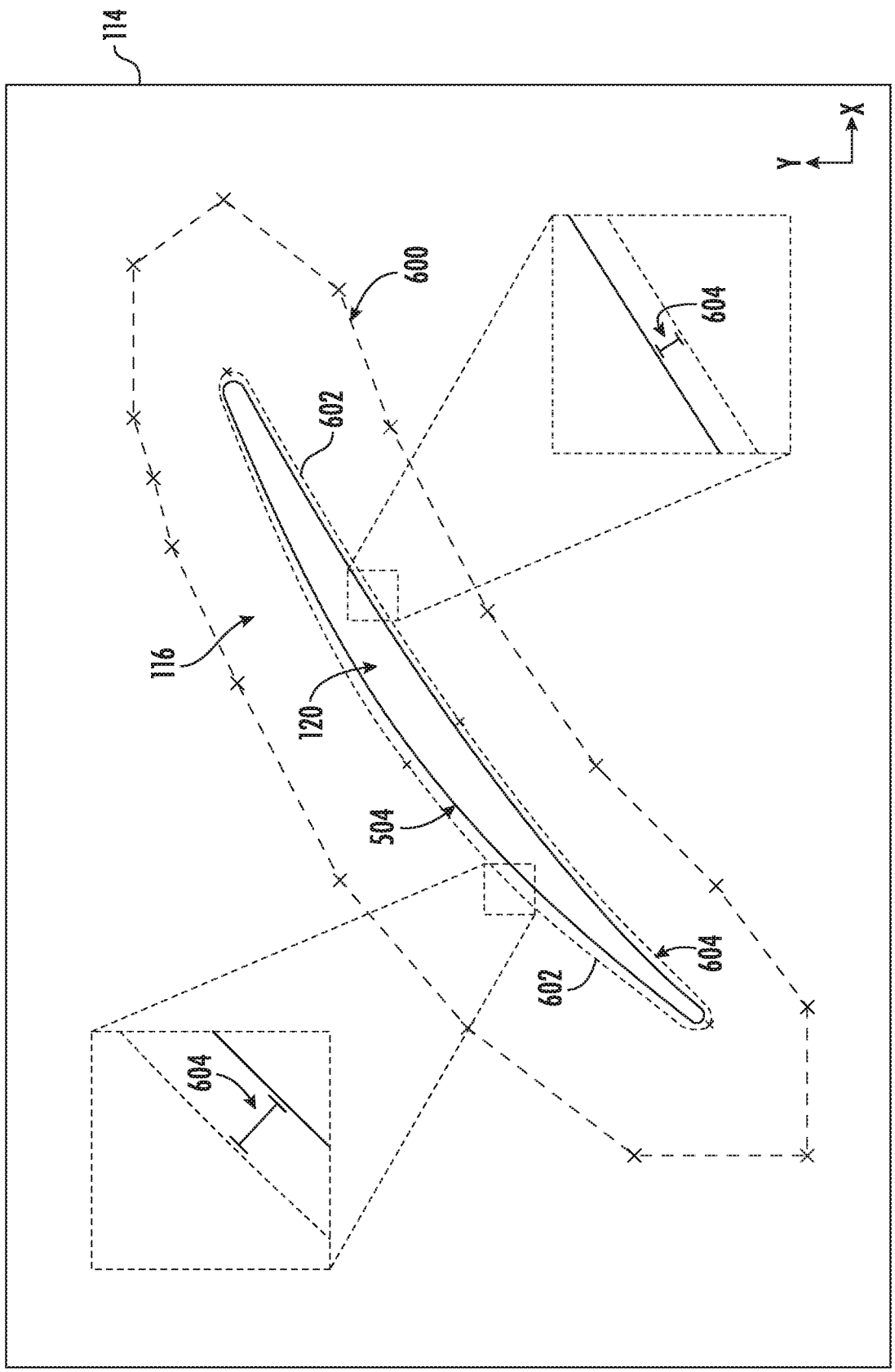
FIG. 6A schematically depicts an exemplary digital representation of a field of view that includes a workpiece, captured using a vision system.

Exemplary digital representations of one or more fields of view 114 captured using the vision system 102 are schematically depicted in FIGS. 6A and 6B. FIG. 6A depicts a digital representation of a field of view 114 that includes one workpiece 116, and FIG. 6B depicts a digital representation of one or more fields of view 114 that includes a plurality of workpieces 116. The digital representation depicted in FIG. 6B may be captured from a single field of view 114, or a plurality of fields of view 114 maybe stitched together to provide a digital representation of one or more fields of view 114 that includes a plurality of workpieces 116.

As shown in FIGS. 6A and 6B, a field of view 114 may include an area of interest 600 corresponding to a workpiece-interface 120 and/or a workpiece 116 (FIG. 6A) or a plurality of areas of interest 600 respectively corresponding to a plurality of workpiece-interfaces 120 and/or workpieces 116 (FIG. 6B). Regardless of whether the field of view 114 includes one or more areas of interest 600, an area of interest 600 may correspond to an expected location of a workpiece-interface 120 and/or a workpiece 116 within the field of view 114. The expected location may be determined, for example, based on registration points 202 (FIGS. 2A and 2B) mapped to a coordinate system. The control system 106 may be configured to process only one or more areas of interest 600 within a field of view 114 so as to reduce processing time. As shown, the area of interest 600 includes a digital representation of a workpiece 116 situated therein. The field of view 114 shown may reflect a top view of the workpiece 116, such that the digital representation of the workpiece 116 includes a digital representation of a workpiece-interface 120, which may include a digital representation of the workpiece-interface perimeter 504.

Figure 7A:
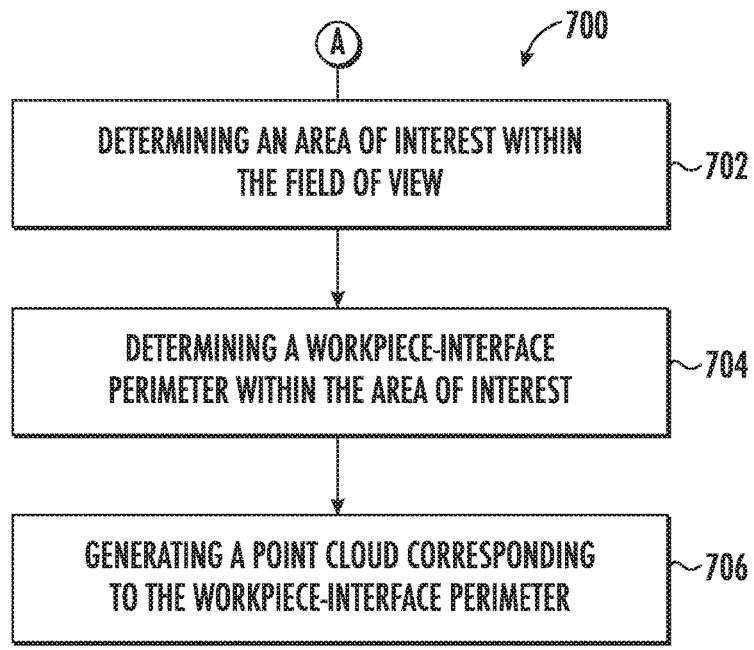
FIG. 7A shows a flowchart depicting an exemplary method of determining a workpiece, a workpiece-interface, and/or a workpiece-interface perimeter.

Now referring to FIG. 7A, exemplary methods of determining a workpiece 116, a workpiece-interface 120, and/or a workpiece-interface perimeter 504 of a workpiece 116 will be discussed. An exemplary method 700 includes, at step 702, determining an area of interest 600 within the field of view 114. The area of interest 600 may correspond to an expected location of the workpiece 116, the workpiece-interface 120, and/or the workpiece-interface perimeter 504 within the field of view 114. An area of interest may be determined based at least in part on a mapping of coordinates of the field of view 114 to a registration point 202 for a workpiece 116.

An exemplary method 700 may further include, at step 704, determining a workpiece-interface perimeter 504 within the area of interest 600. The workpiece-interface perimeter 504 may be determined using an edge detection algorithm. An exemplary edge detection algorithm may determine the workpiece-interface perimeter 504 by determining pixels within the digital representation of the field of view 114 that have discontinuities, such as changes in brightness or contrast. The workpiece-interface 120 and/or the workpiece 116 may be determined based on the workpiece-interface perimeter 504 determined using the edge detection algorithm. Any suitable edge detection algorithm may be utilized, including first or second order operations. Exemplary edge detection algorithms include a Canny algorithm, a Sobel algorithm, a Prewitt algorithm, a Roberts algorithm, a thresholding algorithm, a differential algorithm, a fuzzy logic algorithm, and so forth. The digital images may also be filtered using edge thinning, a Gaussian filter, or the like. Exemplary edge detection algorithms may determine a workpiece-interface perimeter 504 with sub-pixel accuracy.

An exemplary method 700 may include, at step 706, generating a point cloud 602 corresponding to a workpiece-interface perimeter 504, a workpiece-interface 120, and/or a workpiece 116. The point cloud may include any desired number of points corresponding to the workpiece-interface perimeter 504, the workpiece-interface 120, and/or the workpiece 116. The number of points may be selected based on the desired level of resolution of the point cloud 602. An exemplary point cloud 602 is shown in FIGS. 6A and 6B. In some embodiments, as shown in FIG. 6A, a point cloud 602 may be offset by an offset amount 604 corresponding to an intended overhang distance between the workpiece-interface perimeter 504 and an extension segment 206 to be additively printed thereon. When providing such an offset in the point cloud 602, the step 706 of generating the point cloud 602 may include determining an offset amount 604 and offsetting the series of points of the point cloud 602 by the offset amount 604. In some embodiments, the offset amount may vary as between a first point along the perimeter 504 and a second point along the perimeter 504. For example, the offset amount may be configured to vary according to curvature and/or scan path of the additive manufacturing tool.

As discussed with reference to FIG. 4, in an exemplary method 400 of additively printing an extension segment 206, after determining a workpiece-interface 120 from the digital representation of the field of view 114, the exemplary method 400 may include, at step 406, transmitting to an additive manufacturing machine 104, a print command configured to additively print the extension segment 206 on the workpiece-interface 120, and optionally, the exemplary method 400 may include, at step 408, generating the print command based at least in part on the field of view 114. In some embodiments, an exemplary method 400 may include, at step 412, transmitting to an additive manufacturing machine 104, a pretreatment command configured to expose the workpiece-interface 120 to the pretreatment, and optionally, the exemplary method 400 may include, at step 414, generating the pretreatment command based at least in part on the field of view 114. An exemplary method of generating a print command is described, for example, with reference to FIG. 7B through FIG. 12. Exemplary pretreatments, exemplary methods of generating a pretreatment command, and exemplary methods of pretreating a workpiece-interface 120, are described, for example, with reference to FIGS. 14-19.

In some embodiments, the print command and/or the pretreatment command may be based at least in part on a CAD model, such as an extension segment-CAD model that includes a model of one or more extension segments 206 configured to be additively printed on one or more workpieces 116, such as on the respective workpiece-interfaces 120. The exemplary method 400 may include determining an extension segment-CAD model and/or generating an extension segment-CAD model. Additionally, or in the alternative, the step 408 of generating a print command based at least in part on the field of view 114 captured by the vision system 102 may include determining an extension segment-CAD model and/or generating an extension segment-CAD model. Further additionally, or in the alternative, the step 414 of generating a pretreatment command based at least in part on the field of view 114 captured by the vision system 102 may include determining an extension segment-CAD model and/or generating an extension segment-CAD model.

Figure 7B:
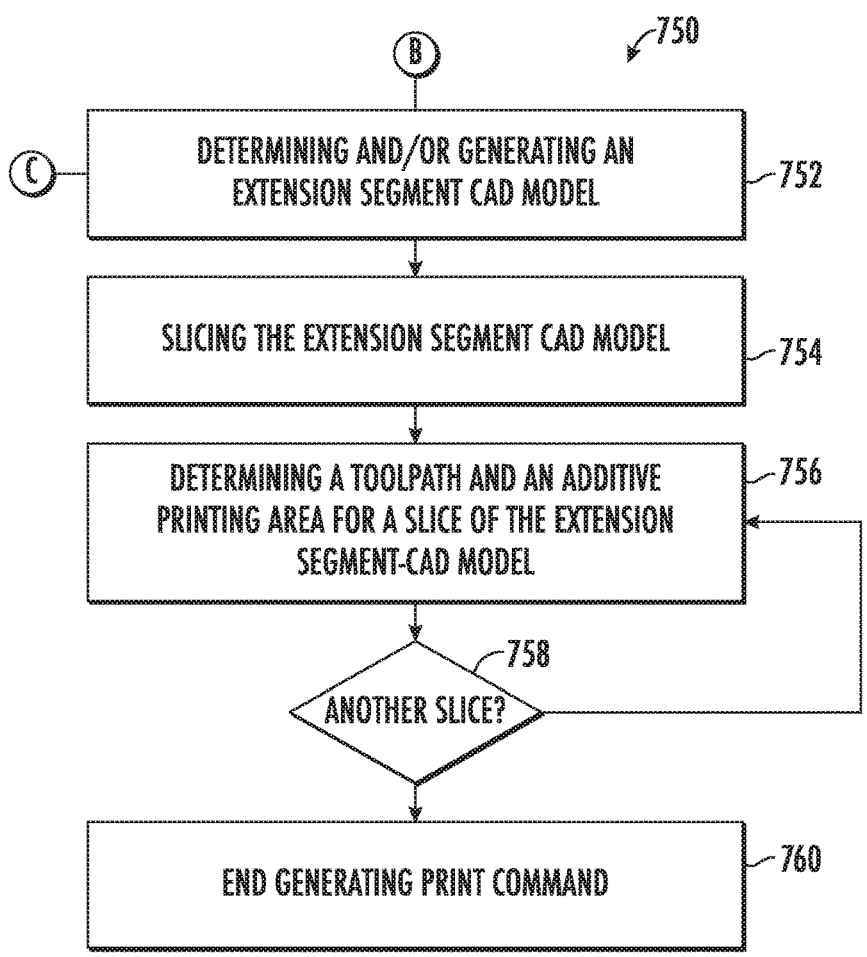
FIG. 7B shows a flowchart depicting an exemplary method of generating a print command.

Now referring to FIG. 7B, an exemplary method 750 of generating a print command will be described. The exemplary method 750 may be performed, for example, in connection with step 408 in the exemplary method 400 of additively printing an extension segment 206 shown in FIG. 4. An exemplary method 750 may include, at step 752, determining and/or generating an extension segment-CAD model; at step 754, slicing the extension segment-CAD model; and at step 756, determining a scan path and an additive printing area for each slice of the extension segment-CAD model. After determining a scan path and an additive printing area for a slice of the extension segment-CAD model, at step 756, the exemplary method 750 may proceed with determining, at step 758, whether there is another slice, and if so, the exemplary method 750 may proceed to step 756, providing for determining a scan path and an additive printing area for a next slice of the extension segment-CAD model 800 (e.g., FIG. 8A). The exemplary method 750 may end, at step 760, when there are no additional slices for which a scan path and additive printing area may be determined. The number of slices may depend on the size (e.g., height, thickness) of the extension segment(s) in the extension segment-CAD model, as well as the desired thickness of the layers of powder 126 or other material that may be used to additively print the extension segment(s).

Figure 8A:
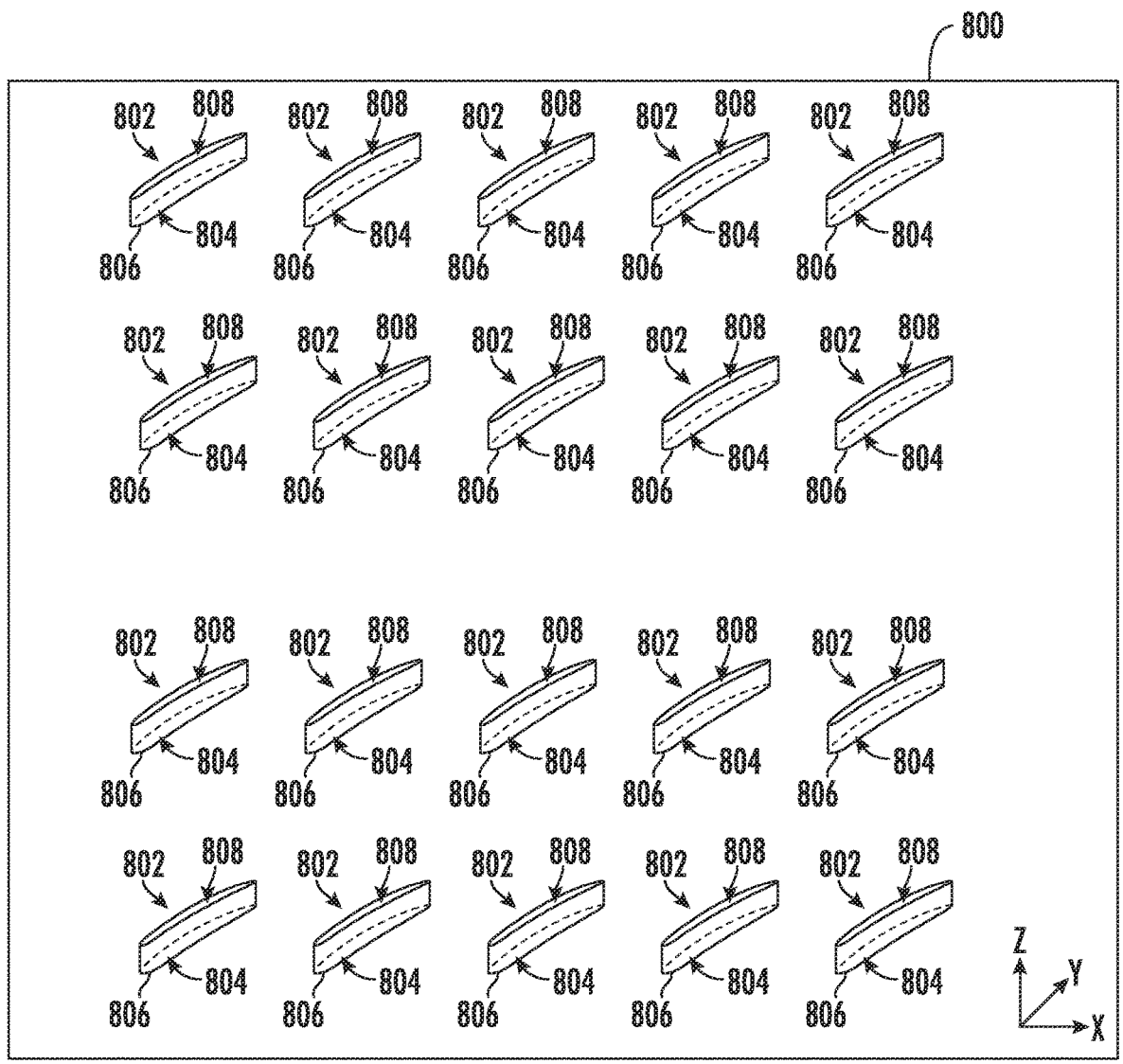
FIG. 8A schematically depicts an exemplary extension segment-CAD model that include a model of a plurality of extension segments.

FIG. 8A shows an exemplary extension segment-CAD model 800. The exemplary extension segment-CAD model 800 may include a model of one or more extension segments 206. As shown, the extension segment-CAD model 800 includes a plurality of models of extension segments 802. The models of the extension segments 802 respectively conform to the location and shape of a plurality of corresponding workpieces 116 upon which the plurality of extension segments 206 are to be respectively additively printed. For example, the respective models of an extension segment 802 may be aligned with coordinates that respectively correspond to the registration points 202 of a plurality of workpieces 116 secured to a build plate 118, and/or the models of the extension segments 802 may include a model-interface 804 that is substantially congruent with the workpiece-interface 120 of the corresponding workpiece 116. The model-interface 804 may be defined by a model-interface perimeter 806, and the model-interface perimeter 806 may be substantially congruent with the workpiece-interface perimeter 504 of the respective workpiece 116. A model of the extension segment 802 may include a height, $h_e$, extending from a model-interface 804 to a top surface 808.

In some embodiments, a plurality of workpieces 116 onto which extension segments 206 are to be printed may differ from one another, and yet the extension segment-CAD model 800 may nevertheless include a model of the plurality of extension segments 802 conforming to the location and shape of respective ones of the plurality of workpieces 116. The model may include one or more model-interfaces 804 that are substantially congruent with corresponding workpiece-interfaces 120 and/or one or more model-interface perimeter 806 that are substantially congruent with corresponding workpiece-interface perimeters 504. An extension segment-CAD model 800 may be determined and/or generated based at least in part on a CAD model, such as a library-CAD model selected from a database or CAD model library. The database or CAD model library may include a plurality of library-CAD models from which an extension segment-CAD model 800 may be determined and/or generated.

Figure 8B:
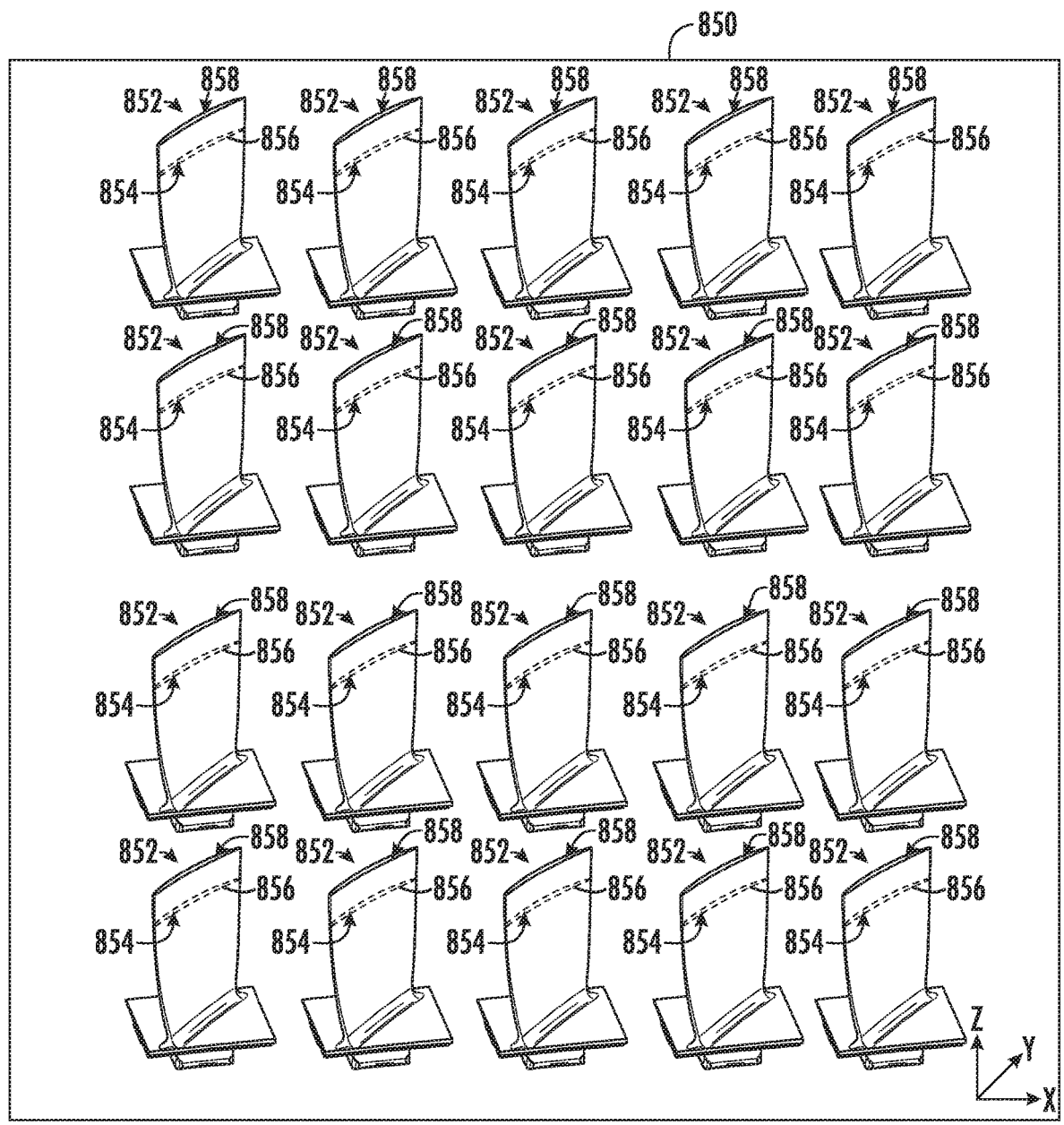
FIG. 8B schematically depicts an exemplary library-CAD model that includes a nominal model of a plurality of nominal workpieces.

An exemplary library-CAD model is shown in FIG. 8B. A library-CAD model 850 may include a nominal model of one or more nominal workpieces 116, components 204, or extension segments 206. For example, as shown in FIG. 8B, the library-CAD model 850 may include a nominal model 852 of one or more components 204 intended to be repaired, rebuilt, and/or upgraded. As shown, the library-CAD model 850 may include a nominal model 852 of a plurality of nominal components 204. The library-CAD model 850 may alternatively include a single nominal component 204. Additionally, or in the alternative, the library-CAD model 850 may include one or more nominal models 852 of a nominal extension segment 206, and/or one or more nominal models 852 of a nominal workpiece 116. In some embodiments, the CAD model library may include one or more extension segment-CAD models 800, which may include one or more previously determined and/or previously generated extension segment-CAD models 800 from which subsequent extension segment-CAD models 800 may be determined and/or generated.

As shown in FIG. 8B, a nominal model-interface 854 may be determined from a nominal model 852. A nominal model-interface 854 may correspond to an expected location of a workpiece-interface 120 of a nominal workpiece 116 associated with the library-CAD model 850. The nominal model-interface 854 may be defined by a nominal model-interface perimeter 856, and the nominal model-interface perimeter 856 may or may not be substantially congruent with the workpiece-interface perimeter 504 of the respective workpiece 116. The nominal model-interface 854 may be located at any z-directional position of the nominal model, including up to a nominal top surface 858 of the nominal model 852.

In some embodiments, a library-CAD model 850 or an extension segment-CAD model 800 may be an actual CAD model from which one or more components 204 were originally fabricated, or the library-CAD model may be a copy or a modified version of a CAD model from which one or more components 204 were originally fabricated. While a library-CAD model 850 may generally correspond to one or more workpieces 116 onto which an extension segment 206 is to be additively printed, the one or more workpieces 116 may differ from their original net shape in varying degrees from one workpiece 116 to the next. A difference from such original net shape may exits, for example, when a workpiece 116 has been deformed or damaged such as from exposure to extreme temperature operating conditions and/or from rubbing or impacts from foreign objects. A difference in original net shape may also exist because of variations in a subtractive modification performed to prepare a workpiece-interface 120 on the workpieces 116. However, the present disclosure provides for generating extension-segment CAD models 800 that include a plurality of models of extension segments 802 respectively conforming to the location and shape of a plurality of workpieces 116 upon which the plurality of extension segments 206 are to be respectively additively printed based on an extension-segment CAD model 800 and/or the models of the extension segments 802 therein.

Figure 9A:
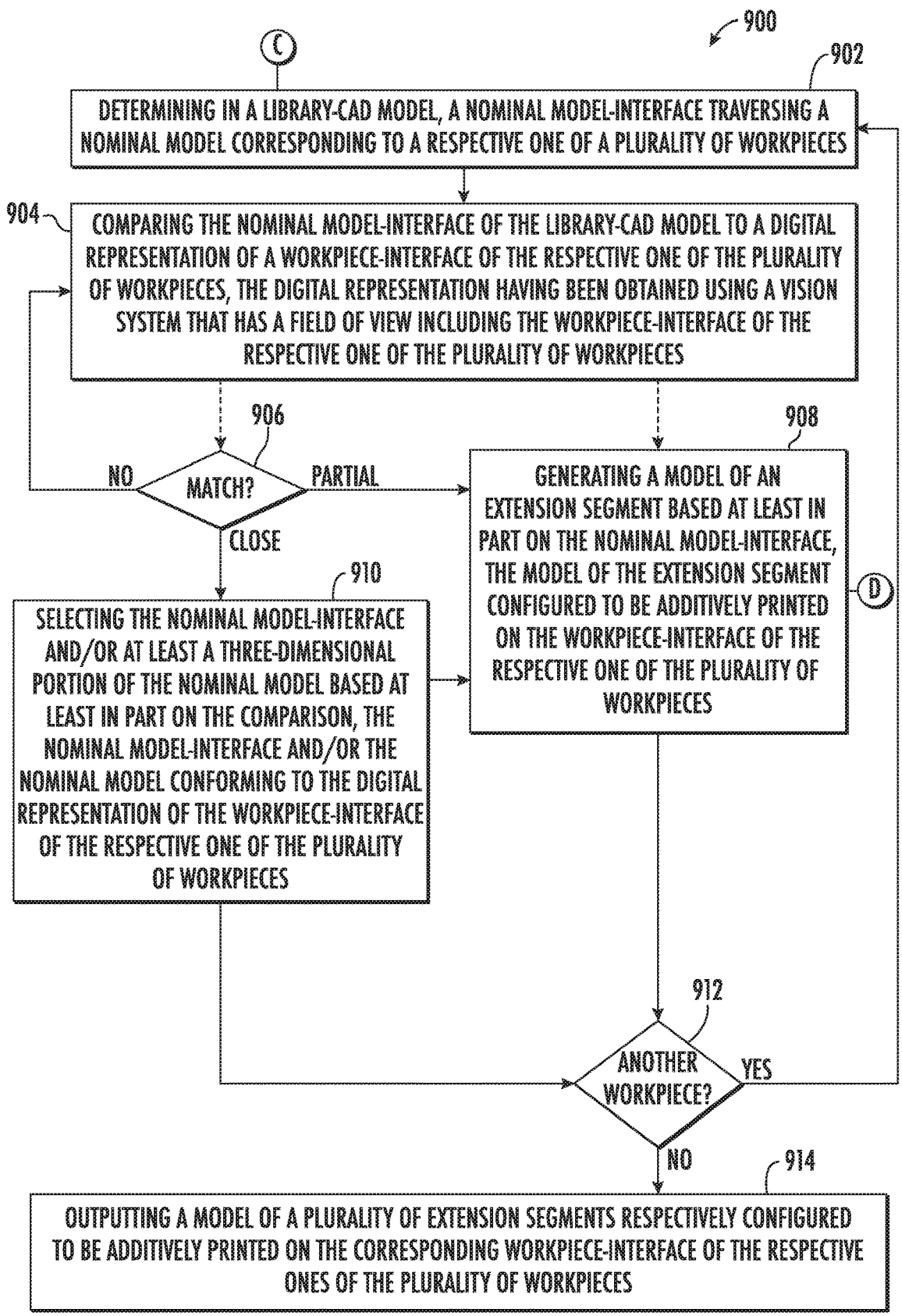
FIGS. 9A and 9B show a flowchart depicting an exemplary method of generating an extension segment-CAD model.
Figure 9B:
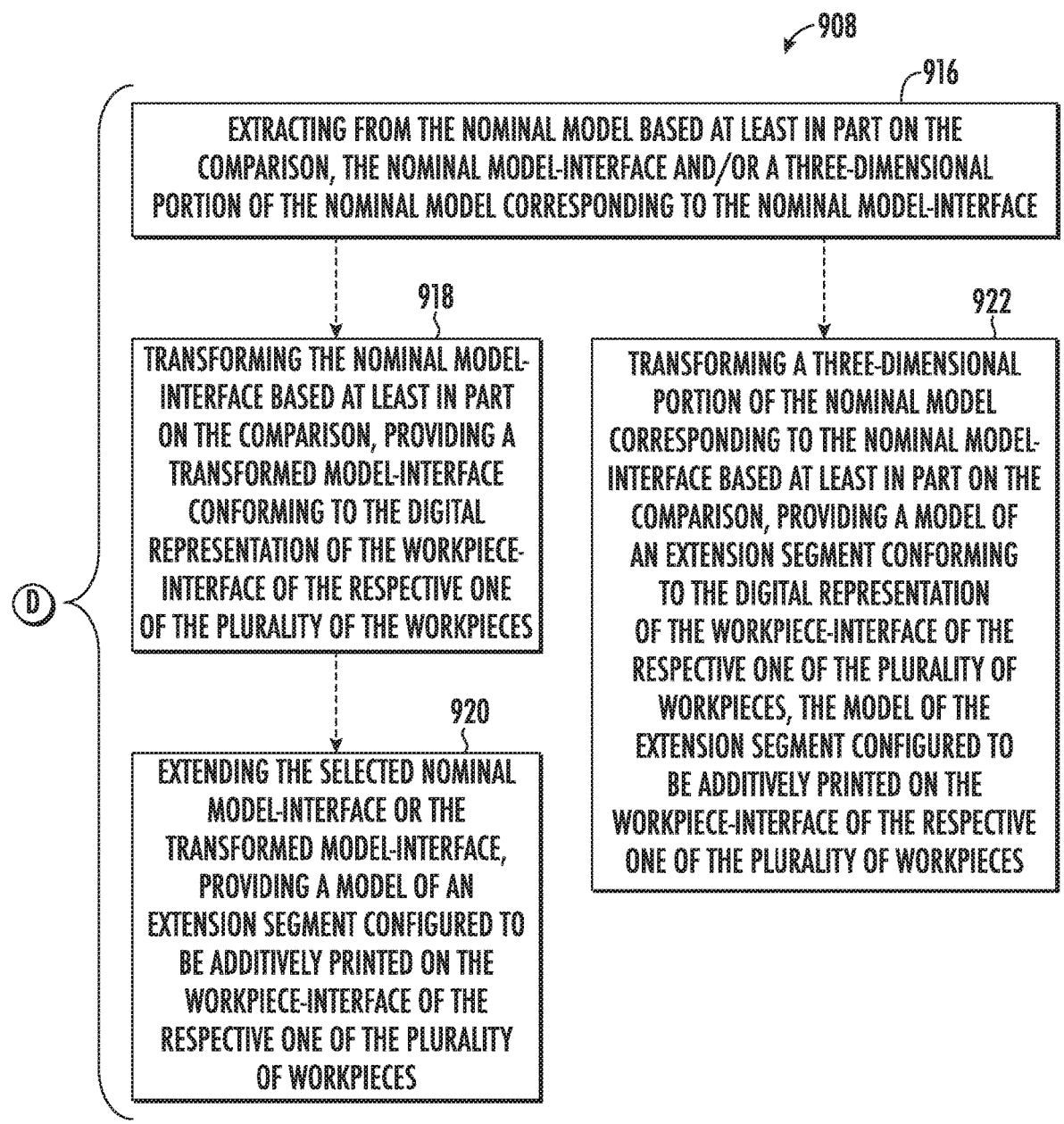

An exemplary method of generating an extension segment-CAD model 800 is shown in FIGS. 9A and 9B. As shown in FIG. 9A, an exemplary method 900 of generating an extension segment-CAD model 800 may be performed for each of a plurality of workpieces 116. An exemplary method 900 may include, at step 902, determining in a library-CAD model, a nominal model-interface 854 traversing a nominal model corresponding to a respective one of the plurality of workpieces 116. The nominal model may include a model of a nominal component 204, such as a model of a component 204 from which the workpieces 116 may have originated. The workpieces 116 may, however, differ from a component 204 having been additively manufactured according to the nominal model, for example, because of damage or wear incurred by the workpieces 116 as a result of the environment with which the component 204 was used, and/or from a subtractive modification performed to prepare the workpiece 116 for an extension segment 206 to be additively printed thereon. The nominal model may additionally or alternatively include a model of a nominal workpiece, such as a nominal model of a workpiece 116 produced by subjecting a nominal component 204 to a subtractive modification process to provide a workpiece-interface 120. The nominal model may additionally or alternatively include a model of a nominal extension segment 802, such as a nominal model of an extension segment 802 corresponding to a nominal workpiece 116.

Determining a nominal model-interface 854 may include determining a plane traversing the library-CAD model at a determined height. The determined height may correspond to a height of an expected location of a workpiece-interface 120 for a nominal workpiece 116. By way of example, a library-CAD model may include a model of a nominal component 204 corresponding to the workpiece, and the workpiece 116 may have been subjected to a subtractive modification, such as to provide a workpiece-interface 120. An expected location of a workpiece-interface 120 may be determined based at least in part on the nature of the subtractive modification, such as based on an expected amount of material removed or a resulting change in height of the workpiece 116 as a result of the subtractive modification.

Additionally, or in the alternative, the determined height may correspond to a height of a workpiece-interface 120 as determined from a digital representation of the workpiece 116. The height of a workpiece-interface 120 may be measured based at least in part on one or more dimensions of the workpiece 116 obtained from the digital representation of the workpiece, and a nominal model-interface 854 may be determined based at least in part on the measured height. Additionally, or in the alternative, the height of the workpiece-interface 120 may be measured based at least in part one or more dimensions of a workpiece alignment system 200 captured in a field of view 114. For example, a height of the workpiece-interface 120 may be determined based at least in part on the height of a workpiece shoe 214, or based at least in part on a difference between the height of the workpiece-interface 120 and the height of a workpiece shoe 214, or based at least in part on a difference between the height of the workpiece-interface 120 and the height of the build plate 118.

In some embodiments, a nominal model-interface 854 may be determined using a best-fit algorithm. Determining the nominal model-interface 854 traversing the library-CAD model 850 may include determining a plane traversing the library-CAD model that meets a metric associated with a best-fit algorithm applied with respect to the digital representation of the workpiece-interface 120. The best-fit algorithm may compare one or more planes traversing the library-CAD model to the digital representation of the workpiece-interface 120 until a compared plane satisfies the best-fit metric. The nominal model-interface 854 may be determined based at least in part on a plane that satisfies the best-fit metric. For example, a plane that satisfies the best-fit metric may be determined to be the nominal model-interface 854.

Still referring to FIG. 9A, an exemplary method 900 of determining and/or generating an extension segment-CAD model 800 may include, at step 904, comparing the nominal model-interface 854 of the library-CAD model to a digital representation of the workpiece-interface 120 of the respective ones of the plurality of workpieces 116. The digital representation may have been previously or concurrently obtained using a vision system 102 that has a field of view 114 including the workpiece-interface 120 of the respective one of the plurality of workpieces 116. The comparison may be performed using an image matching algorithm. In some embodiments, comparing the nominal model-interface 854 to the digital representation of the workpiece-interface 120 may include, at step 906, determining whether the nominal model-interface 854 and the digital representation of the workpiece-interface 120 sufficiently match one another. However, in some embodiments a matching step 906 need not be included.

When included, a matching step 906 may include comparing one or more coordinates of the nominal model-interface 854 with one or more coordinates of the digital representation of the workpiece-interface 120 and determining one or more differences therebetween. The comparing step 904 may additionally or alternatively include comparing one or more coordinates of the one or more registration points 202 with a corresponding one or more coordinates of the nominal model-interface 854 of the library-CAD model and determining one or more differences therebetween. The registration points 202 may correspond to locations of respective ones of a plurality of workpieces 116 onto which respective ones of a plurality of extension segments 206 are to be additively printed using the additive manufacturing machine 104. The comparing step 904 and the matching step 906 may be performed separately or together as part of the same step. In some embodiments, the matching step 906 may determine whether there is a partial match, a close match, or no match between the nominal model-interface 854 and the workpiece-interface 120. Alternatively, the matching step 906 may determine whether there is any match (e.g., at least a partial match), or no match between the nominal model-interface 854 and the workpiece-interface 120.

When the matching step 906 determines that there is at least a partial match between the nominal model-interface 854 and the workpiece-interface 120, the exemplary method 900 may proceed to step 908, providing for generating a model of an extension segment 802 based at least in part on the nominal model-interface 854. Step 908 provides a model of an extension segment 802 conforming to the digital representation of the workpiece-interface 120 of the respective one of the plurality of workpieces 116 such that the model of the extension segment 802 is configured to be additively printed on the workpiece-interface 120 of the respective one of the plurality of workpieces 116.

When the matching step 906 determines that there is not at least a partial match between the nominal model-interface 854 and the workpiece-interface 120, the exemplary method 900 may return to step 902 so as to determine a different nominal model-interface 854 and to compare the different nominal model-interface 854 to the digital representation of the workpiece-interface 120. The different nominal model-interface 854 may be selected form the same library-CAD model or a different library-CAD model.

In some embodiments, the matching step 906 may include determining whether there is more than a partial match, such as a close match between the nominal model-interface 854 and the workpiece-interface 120. When the matching step 906 determines that there is a close match between the nominal model-interface 854 and the workpiece-interface 120, the exemplary method 900 may include, at step 910, selecting the nominal model-interface 854 and/or at least a three-dimensional portion of the nominal model from the library-CAD model based at least in part on the comparison. For example, the comparison may determine that the selected nominal model-interface 854 and/or the nominal model from the library-CAD model conforms to the digital representation of the workpiece-interface 120 of the respective one of the plurality of workpieces 116, such that the selected nominal model-interface 854 may be aligned with coordinates that correspond to the digital representation of the workpiece-interface 120, and/or the selected nominal model-interface 854 may be substantially congruent with the digital representation of the workpiece-interface 120. In various exemplary embodiments, step 910 may include selecting the nominal model for a respective workpiece, selecting a three-dimensional portion of the nominal model for a respective workpiece 116 (which may include the nominal model-interface 854), and/or selecting only the nominal model-interface 854 for the respective workpiece 116.

When a nominal model or a three-dimensional portion thereof is selected at step 908, the exemplary method 900 may include determining an extension-segment-CAD model from the library-CAD model. For example, a library-CAD model that includes a nominal extension segment 206 may be determined to sufficiently match a workpiece-interface 120 such that an extension segment 206 may be additively printed on the workpiece-interface 120 without requiring transforming or extending the nominal model-interface 854 at steps 910, 912. On the other hand, when the library-CAD model includes a model of a nominal component 204 or a model of a nominal workpiece 116, rather than a model of a nominal extension segment 206, the exemplary method 900 may proceed with generating a model of an extension segment 802 at step 908, for example, so as to provide a model of an extension segment 802 rather than a model of a component 204 or workpiece 116. The model of the extension segment 802 generated at step 908 may be configured to be additively printed on the workpiece-interface 120 of the respective one of the plurality of workpieces 116, whereas a model of a component 204 or workpiece 116 would not be so configured even if the nominal model-interface 854 closely matched the workpiece-interface 120.

In exemplary methods 900 that do not include a matching step 906, an exemplary method may proceed to generating a model of an extension segment 802 based at least in part on the nominal model-interface 854 at step 908 after having compared the nominal model-interface 854 to the digital representation of the workpiece-interface 120 at step 904. In some embodiments, steps 904 and 908 may be combined into a single step, such that comparing the nominal model-interface 854 to the digital representation of the workpiece-interface 120 may be part of the process of generating a model of an extension segment 802 based at least in part on the nominal model-interface 854.

After having generated and/or selected a model of an extension segment 802 at steps 908, 910, an exemplary method 900 may ascertain, at step 912, whether the plurality of workpieces 116 includes another workpiece 116. When there is another workpiece, the exemplary method 900 may include repeating the determining step 902 and subsequent steps through to step 912. When step 912 indicates that there are no additional workpieces 116, the exemplary method 900 may proceed with step 914, which provides for outputting a model of a plurality of extension segments 802 respectively configured to be additively printed on the corresponding workpiece-interface 120 of the respective ones of the plurality of workpieces 116. The model may be an extension segment-CAD model 800, and the model may be based at least in part on the selecting and/or transforming of the nominal model-interface 854 and/or the nominal model from the library-CAD model.

The model of the plurality of extension segments 802 may be output at step 914 concurrently as, or subsequently after, each additional workpiece 116 is generated and/or selected at steps 908, 910. In some embodiments, outputting the model may include stitching together a plurality of models, such as models having been respectively selected and/or transformed and generated for respective ones of the plurality of workpieces 116. While an exemplary method 900 of determining and/or generating an extension segment-CAD model 800 has been described with respect to a plurality of extension segments 206, it will be appreciated that an extension segment-CAD model 800 may also be determined and/or generated for a single extension segment 206. For example, the exemplary method 900 may be performed for a single extension segment 206.

Referring now to FIG. 9B, one or more steps will be described that may be included in the step 908 of generating a model of an extension segment 802 (FIG. 9A). The steps shown in FIG. 9B may be included individually or together with one or more other steps. When generating a model of an extension segment 802, one or more steps shown in FIG. 9B may be performed, and the particular steps performed may depend at least in part on whether the nominal model-interface 854 provides a partial match or a close match at step 906 (FIG. 9A), and/or whether the nominal model-interface 854 or at least a three-dimensional portion of the nominal model are selected at step 910 (FIG. 9A).

As shown in FIG. 9B, generating a model of an extension segment 802 at step 908 may include an extracting step 916, such that an extension segment 206 may be generated based at least in part on a nominal model-interface 854 and/or a three-dimensional portion of a nominal model corresponding to the nominal model-interface 854. Alternatively, the extracting step 916 may be omitted, for example, such that a nominal model may itself be configured to be additively printed on a workpiece-interface 120. The step 908 of generating a model of an extension segment 802 may additionally or alternatively include a transforming step 918, such that a nominal model-interface 854 may be conformed to the digital representation of the workpiece-interface 120. Alternatively, the transforming step 918 may be omitted, for example, when a nominal model-interface 854 already conforms to the digital representation of the workpiece-interface 120. The step 908 of generating a model of an extension segment 802 may further additionally or alternatively include an extending step 920, such that a nominal model-interface 854 or a transformed model-interface 804 may be extended so as to provide a three-dimensional model of an extension segment 802. Alternatively, the extending step 920 may be omitted, for example, when generating a model of an extension segment 802 from a three-dimensional portion of the nominal model.

In some embodiments, at step 916, generating a model of an extension segment 802 may optionally include extracting from a nominal model based at least in part on the comparison at step 904, 906, a nominal model-interface 854 and/or a three-dimensional portion of the nominal model corresponding to the nominal model-interface 854. The extracting step may be performed following the comparing step 904, following the matching step 906, or following the selecting step 910.

In some embodiments, generating a model of an extension segment 802 may optionally include, at step 918, transforming a nominal model-interface 854 based at least in part on the comparison at step 904, 906, so as to provide a transformed model-interface 804 conforming to the digital representation of the workpiece-interface 120 of the respective one of the plurality of workpieces 116. The transforming step may include one more transforming operations, including aligning, altering, modifying, contorting, distorting, deforming, correcting, adjusting, revising, straightening, tilting, rotating, bending, twisting, or editing, as well as combinations of these. The particular transforming operation(s) may be selected based at least in part on the comparison such that the transforming operation(s) conforms the nominal model-interface 854 to the digital representation of the workpiece-interface 120.

The transforming step 918 may be performed following the comparing step 904 and/or following the matching step 906. Additionally, or in the alternative, the transforming step 918 may be performed following the extracting step 916. An exemplary method 900 may include extracting the nominal model-interface 854 from the nominal model and then proceeding to step 918, providing for transforming the nominal model-interface 854 based at least in part on the comparison at step 904, 906, so as to provide a transformed model-interface 804 conforming to the digital representation of the workpiece-interface 120 of the respective one of the plurality of workpieces 116.

In some embodiments, generating a model of an extension segment 802 may optionally include, at step 920, extending the transformed model-interface 804, such that the extension segment 206 is configured to be additively printed on the workpiece-interface 120 of the respective one of the plurality of workpieces 116. Step 920 may be performed after having transformed the nominal model-interface 854 at step 918. Alternatively, in some embodiments, the extending step 920 may be combined with the transforming step 918.

Further additionally, or in the alternative, step 918 may follow step 910 (FIG. 9A), providing for extending a nominal model-interface 854 that has been selected at step 910. For example, when a nominal model-interface 854 closely matches a digital representation of a workpiece-interface 120, such as may be determined at step 906, the transforming step 918 may be omitted from the step of generating a model of an extension segment 802 at step 908. Regardless of whether the nominal model-interface 854 is transformed at step 918 or selected at step 910 with the transforming step 918 being omitted, the extension segment 206 resulting from the extending step 912 may be configured to be additively printed on the workpiece-interface 120 of the respective one of the plurality of workpieces 116.

In an exemplary embodiment, generating a model of an extension segment 802 at step 908 may include, at step 916, extracting from the nominal model based at least in part on the comparison of the nominal model-interface 854 to a digital representation of workpiece-interface 120; at step 918, transforming the nominal model-interface 854 based at least in part on the comparison so as to provide a transformed model-interface 804 conforming to the digital representation of the workpiece-interface 120; and at step 920, extending the transformed model-interface 804 so as to provide an extension segment 206 configured to be additively printed on the workpiece-interface 120.

Referring still to FIG. 9B, in another embodiment, the step 908 of generating a model of a nominal extension segment 206 may include, at step 916, extracting from the nominal model a three-dimensional portion of the nominal model. The three-dimensional portion may correspond to the nominal model-interface 854. For example, the three-dimensional portion may include the portion of the nominal model above the nominal model-interface 854 and may include the nominal model-interface 854. The portion of the nominal model below the three-dimensional interface may be deleted from the nominal model and/or may remain unextracted. The three-dimensional portion may have a height corresponding to the height of an extension segment 206 being generated at step 908.

In some embodiments, generating a model of an extension segment 802 may optionally include, at step 922, transforming a three-dimensional portion of a nominal model corresponding to a nominal model-interface 854 based at least in part on the comparison at step 904, 906, so as to provide a model of an extension segment 802 conforming to the digital representation of the workpiece-interface 120 of the respective one of the plurality of workpieces 116. The model of the extension segment 802 so provided may be configured to be additively printed on the workpiece-interface 120 of the respective one of the plurality of workpieces 116. The three-dimensional portion of the nominal model transformed at step 922 may include a three-dimensional portion extracted at step 916 or at least a three-dimensional portion of a nominal model selected at step 910 (FIG. 9A). In some embodiments, the at least a three-dimensional portion of a nominal model selected at step 910 may include the nominal model as a whole, such as when the nominal model is a model of a nominal extension segment 206.

The step 922 of transforming a three-dimensional portion may include transforming the nominal model-interface 854 of the three-dimensional portion, and may include one more transforming operations, including aligning, altering, modifying, contorting, distorting, deforming, correcting, adjusting, revising, straightening, tilting, rotating, bending, twisting, or editing, as well as combinations of these. The particular transforming operation(s) at step 922 may be selected based at least in part on the comparison such that the transforming operation(s) conforms the nominal model-interface 854 to the digital representation of the workpiece-interface 120. Additionally, or in the alternative, the step 922 of transforming a three-dimensional portion may include extending the nominal model-interface 854 so as to provide an extension segment 206 conforming to the digital representation of the workpiece-interface of the respective one of the plurality of workpieces 116.

Now referring to FIGS. 10A-10D, exemplary transforming operations 1000 will be described, which may be performed at step 910 in the exemplary method 900 of generating an extension segment-CAD model 800. Any one or more transforming operations 1000 may be performed so as to conform a nominal model-interface 854 to a digital representation of a workpiece-interface 120. Such transforming operations 1000 may be performed when transforming the nominal model-interface 854, for example, as part of a transforming step 910 in an exemplary method 400 of additively printing an extension segment 206 and/or in an exemplary method 900 of determining and/or generating an extension segment-CAD model 800.

The nominal model-interface 854 may differ from a digital representation of a workpiece-interface 120, for example, because of a change to the shape of a workpiece 116 while in service, or any other difference between workpiece-interface 120 and the library-CAD model from which the nominal model-interface 854 was selected. Additionally, or in the alternative, a nominal model-interface 854 may be selected at a height that differs from the height of the workpiece-interface 120 even though the nominal model corresponds to the component 204. Such a difference in height may result in a corresponding difference between the nominal model-interface 854 and the workpiece-interface 120. The transforming operation 1000 may be performed so as to compensate for a difference between the nominal model-interface 854 and the workpiece-interface 120, regardless of the underlying source for such difference.

Figure 10A:
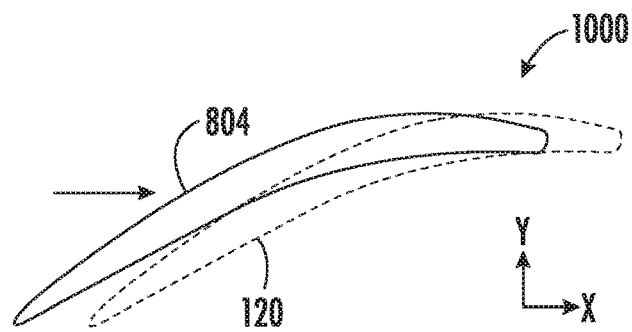
FIGS. 10A-10D schematically depict exemplary transforming operations which may be performed so as to conform a nominal model-interface to a digital representation of a workpiece-interface, such as in the exemplary method depicted in FIGS. 9A and 9B.

FIG. 10A shows an exemplary transforming operation 1000 that includes shifting at least a portion of a nominal model-interface 854 so as to conform the nominal model-interface 854 with a digital representation of a workpiece-interface 120. As shown in FIG. 10A, the nominal model-interface 854 is shifted to the right. However, it will be appreciated that a transforming operation 1000 may include shifting a nominal model-interface 854 in any direction, including any direction along a 360-degree axis.

Figure 10B:
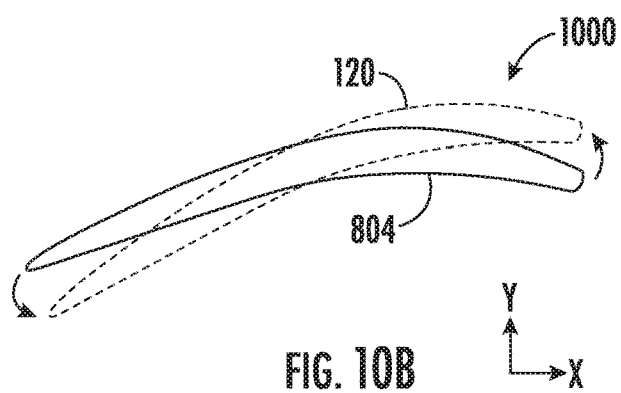

FIG. 10B shows an exemplary transforming operation 1000 that includes rotating at least a portion of a nominal model-interface 854 so as to conform the nominal model-interface 854 with a digital representation of a workpiece-interface 120. As shown in FIG. 10B, the nominal model-interface 854 is rotated counterclockwise. However, it will be appreciated that a transforming operation 1000 may include rotating a nominal model-interface 854 in any direction.

Figure 10C:
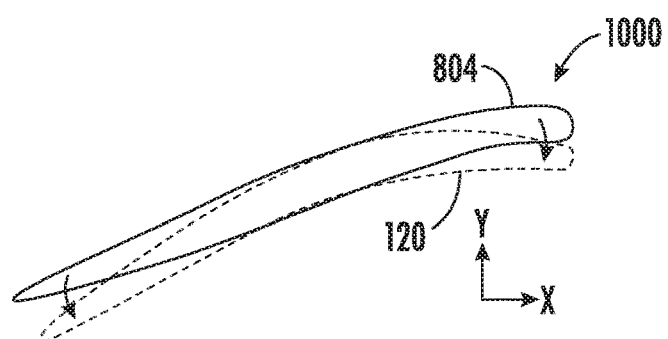

FIG. 10C shows an exemplary transforming operation 1000 that includes bending at least a portion of a nominal model-interface 854 so as to conform the nominal model-interface 854 to a digital representation of a workpiece-interface 120. As shown in FIG. 10C, by way of example nominal model-interface 854 generally aligns with the workpiece-interface 120 at a middle region, while outward regions are subjected to a bending transforming operation. However, it will be appreciated that a transforming operation 1000 may include bending a portion of a nominal model-interface 854 in any direction.

Figure 10D:
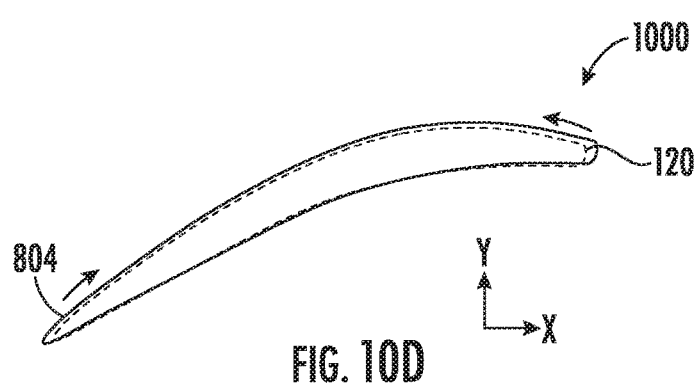

FIG. 10D shows an exemplary transforming operation 1000 that includes scaling at least a portion of a nominal model-interface 854 so as to conform the nominal model-interface 854 with a digital representation of a workpiece-interface 120. As shown in FIG. 10D, by way of example, the nominal model-interface 854 is scaled downward so as to conform to the workpiece-interface 120. However, it will be appreciated that a transforming operation 1000 may additionally or alternatively include scaling a nominal model-interface 854 upward.

Any one or more transforming operations may be carried out alone or in combination with one another, and as to all or a portion of a nominal model-interface 854. In some embodiments, transforming a nominal model-interface 854, such as at step 910 of the exemplary method 900, may include aligning at least a portion of the nominal model-interface 854 with a digital representation of a workpiece-interface 120. Such aligning may include aligning one or more coordinates of the nominal model-interface 854 with one or more coordinates of the digital representation of the workpiece-interface 120. By way of example, such aligning may be performed, at least in part, using a shifting, rotating, bending, and/or scaling transforming operation as described with reference to FIGS. 10A-11D. Additionally, or in the alternative, transforming the nominal model-interface 854 may include a first transforming operation selected to align at least a first portion of the nominal model-interface 854 with a digital representation of a workpiece-interface 120, such as using a shifting and/or rotating transforming operation as described with reference to FIGS. 10A and 10B, followed by a second transforming operation selected to align at least a second portion of the nominal model-interface 854 with the digital representation of the workpiece-interface 120 such as using a bending and/or scaling transforming operation as described with reference to FIGS. 10C and 10D.

The first transforming operation may be selected to align a first one or more coordinates of the nominal model-interface 854 with a first one or more coordinates of the digital representation of the workpiece-interface 120, and the second transforming operation may be selected to align a second one or more coordinates of the nominal model-interface 854 with a second one or more coordinates of the digital representation of the workpiece-interface 120.

The first one or more coordinates of the nominal model-interface 854 may include coordinates for a center point of the nominal model-interface 854 and/or one or more coordinates along the nominal model-interface perimeter 856 of the nominal model-interface 854, such as a maximum or minimum X coordinate or a maximum or minimum Y coordinate along the nominal model-interface perimeter 856. The first one or more coordinates of the workpiece-interface 120 may include coordinates for a center point of the workpiece-interface 120 and/or one or more coordinates along the workpiece-interface perimeter 504 of the workpiece-interface 120, such as a maximum or minimum X coordinate or a maximum or minimum Y coordinate of the workpiece-interface perimeter 504. The first transforming operation may be configured to align the center point of the nominal model-interface 854 with the center point of the workpiece-interface 120, and/or to align a maximum or minimum X coordinate or a maximum or minimum Y coordinate along the nominal model-interface perimeter 856 with a corresponding maximum or minimum X or Y coordinate along the workpiece-interface perimeter 504.

The second one or more coordinates of the nominal model-interface 854 may include one or more coordinates along the nominal model-interface perimeter 856 of the nominal model-interface 854, and the second one or more coordinates of the workpiece-interface 120 may include one or more coordinates along the workpiece-interface perimeter 504. The second one or more coordinates of the nominal model-interface 854 and/or the second one or more coordinates of the workpiece-interface 120 may be selected based on a comparison of the workpiece-interface 120. Such comparison may be performed, for example, after the first transforming operation.

Coordinates may be selected for the second transforming operation based on a difference between coordinates for a point along the nominal model-interface perimeter 856 as compared to coordinates of a corresponding point along the workpiece-interface perimeter 504. For example, coordinates for such a point may be selected when the coordinates differ by a threshold amount. The threshold amount may be selected based at least in part on a degree of conformance sufficient to provide a near net shape component 204 when additively printing an extension segment 206 conformed to the workpiece-interface 120 based at least in part on the one or more transforming operations. In this way, once the nominal model-interface 854 has been aligned with the workpiece-interface 120 according to the first transforming operation, one or more second transforming operations may be performed as determined by such comparison relative to such threshold amount.

The one or more second transforming operations may be performed to the extent needed to sufficiently conform the nominal model-interface 854 to the workpiece-interface 120 so as to obtain a near net shape component 204. In some embodiments, a difference may exist between coordinates of one or more points along the nominal model-interface perimeter 856 relative to coordinates of corresponding points along the workpiece-interface perimeter 504, while still sufficiently conforming the nominal model-interface 854 to the workpiece-interface 120 so as to provide a near net shape component 204. For example, such difference may be an amount that is at least less than an overhang distance for an overhang 506.

In some embodiments, a transforming operation may provide for an overhang 506 between the workpiece-interface 120 and the model-interface 804, such that the model-interface 804 overhangs the workpiece-interface 120 by an overhang distance. For example, a transforming operation may include determining an offset amount 604 and transforming at least a portion of a nominal model-interface 854 by the offset amount 604. The offset amount 604 may correspond to an overhang distance for at least a portion of the extension segment 206.

Figure 11B:
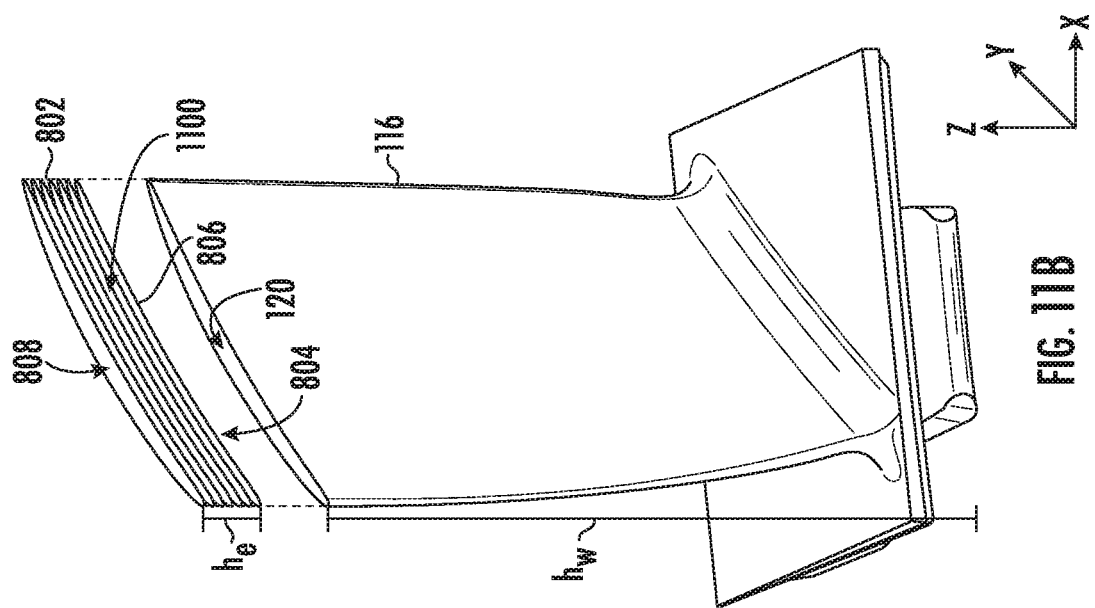
FIG. 11B schematically depicts an exemplary model of an extension segment, such as in an extension segment-CAD model.
Figure 11A:
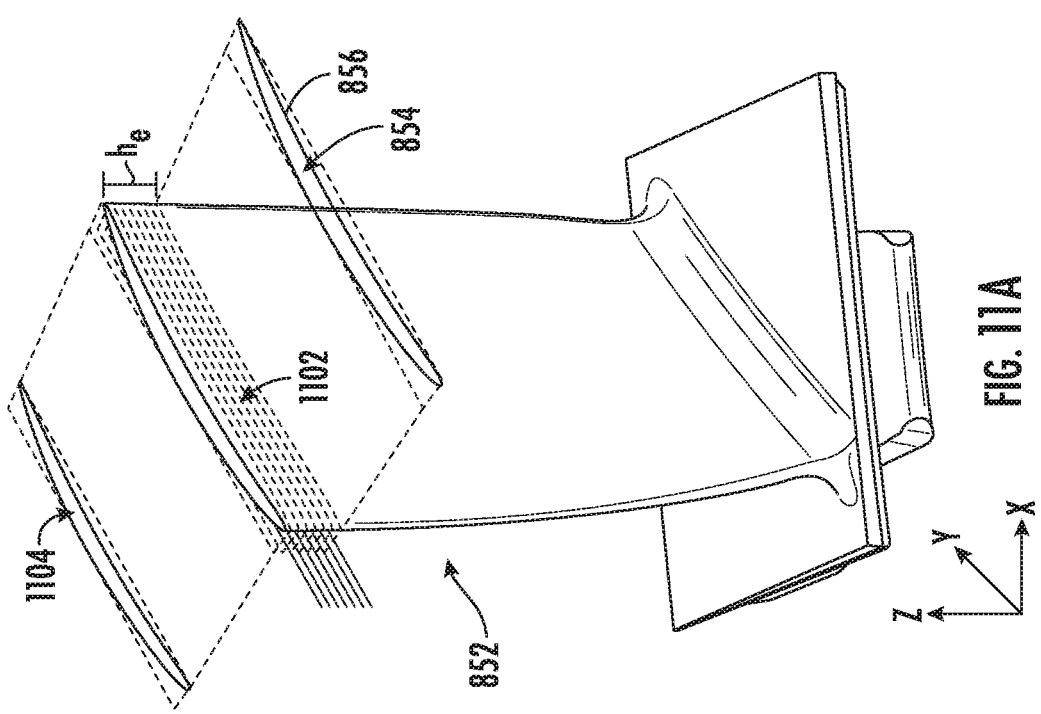
FIG. 11A schematically depicts an exemplary nominal model, such as from a library-CAD model.

Now referring to FIGS. 11A and 11B, and FIGS. 12A-12D, exemplary methods of extending a model-interface 804 will be described. FIG. 11A shows a nominal model, such as from a library-CAD model 850. FIG. 11B shows a model of an extension segment 802, such as in an extension segment-CAD model 800, generated based at least in part on the nominal model-interface 854, such as in steps including extending the nominal model-interface 854. FIG. 12 shows a flow chart depicting exemplary methods of extending a model-interface 804 so as to provide a model of the extension segment 802 configured to be additively printed on a workpiece-interface 120 of a respective workpiece 116.

Exemplary methods of extending a model-interface 804 may be performed starting from a nominal or transformed model-interface 804 and/or a three-dimensional portion of a nominal model. As described with reference to FIGS. 9A and 9B, exemplary methods 900 of generating an extension segment-CAD model 800 may include, at step 920, extending a selected nominal model-interface 854 or a transformed model-interface 804. Additionally, the step 922 of transforming a three-dimensional portion may include extending the nominal model-interface 854. Such a nominal model-interface 854 may have been extracted from the nominal model or may remain part of the nominal model when extending the nominal model-interface 854. When a nominal model-interface 854 and/or a three-dimensional portion of a nominal model remains part of the nominal model when extending, the resulting extension segment 206 may be extracted from the nominal model, for example, by extracting a three-dimensional portion of a nominal model corresponding to the nominal model-interface 854 as described with reference to step 916.

As shown in FIG. 11B, a model of an extension segment 802 may include a height, $h_e$, extending from a model-interface 804 to a top surface 808. The height, $h_e$, for an extension segment 802 may be determined from a nominal model 852. For example, the height of an extension segment 206, $h_e$, may correspond to the z-directional distance from a nominal model-interface 854 to a nominal top surface 858 of the nominal model 852. Alternatively, the height of an extension segment 206, $h_e$, may be specified independently from the nominal model 852. An exemplary model of an extension segment 802 may be extended from the model-interface 804 to the nominal top surface 858 of the nominal model 852.

In some embodiments, a model of an extension segment 802 may include a region extending from the model-interface 804 to the top surface 808 of the model. Additionally, or in the alternative, as shown in FIG. 11B, a model of an extension segment 802 may include a plurality of extension segment slices 1100 between the model-interface 804 to the top surface 808 of the model. The extension segment slices 1100 may correspond to nominal model slices 1102 in the nominal model 852. The nominal model slices 1102 and/or the extension segment slices 1100 may have any desired z-directional spacing. The nominal model slices 1102 may include a nominal model-interface 854 and/or one or more nominal extended-planes 1104. The nominal model slices 1102 may correspond to the z-directional resolution of the nominal model, and the extension segment slices 1100 may correspond to the z-directional resolution of the model of the extension segment 802. In some embodiments, the z-directional resolution of the model of the extension segment 802 may differ from the z-directional resolution of the nominal model 852. For example, the z-directional resolution of the model of the extension segment 802 may be increased or decreased relative to the z-directional resolution of the nominal model 852.

Figure 12A:
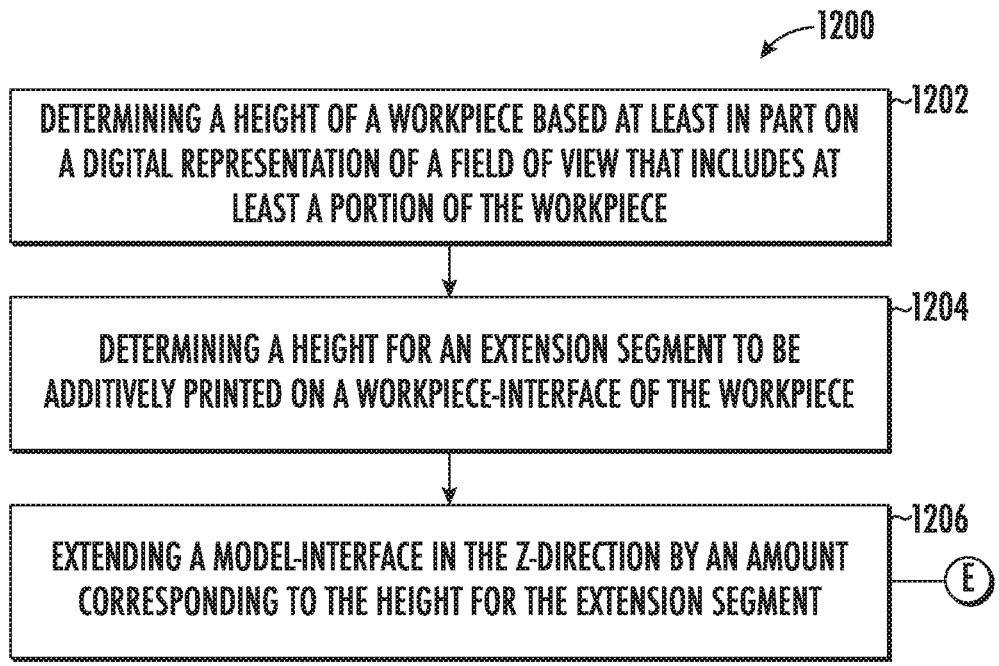
FIGS. 12A-12D show flowcharts depicting exemplary methods of extending a model-interface which may be performed so as to define a model of an extension segment extending in the z-direction from a model-interface to a nominal extended-plane, such as in the exemplary method depicted in FIGS. 9A and 9B.

As shown in FIG. 12A, an exemplary method 1200 of extending a model-interface 804 may include, at step 1202, determining a height of a workpiece 116 based at least in part on a digital representation of a field of view 114 that includes at least a portion of the workpiece, at step 1204, determining a height for an extension segment 206 to be additively printed on a workpiece-interface 120 of the workpiece 116, and at step 1206, extending the model-interface 804 in the z-direction by an amount corresponding to the height for the extension segment 206. The model-interface 804 may be extended in the z-direction within a nominal model and then a resulting model of an extension segment 802 may be extracted therefrom. Alternatively, the model-interface 804 may be extracted from the nominal model, and then the model-interface 804 may be extended in the z-direction by an amount corresponding to the height for the extension segment 206 within a model of the extension segment 802 being generated.

Figure 12B:
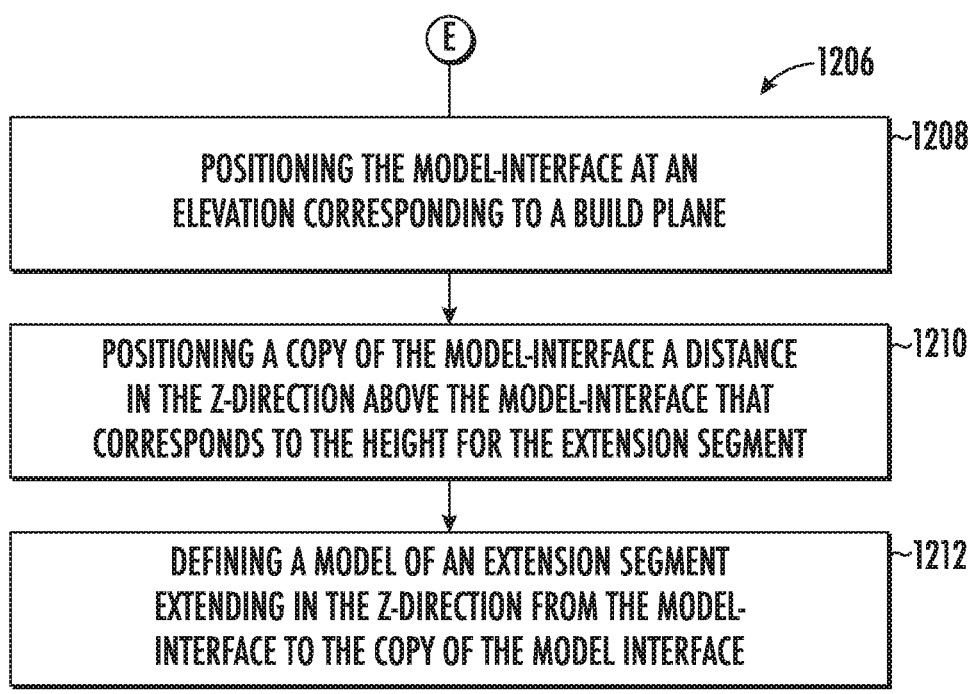
Figure 12C:
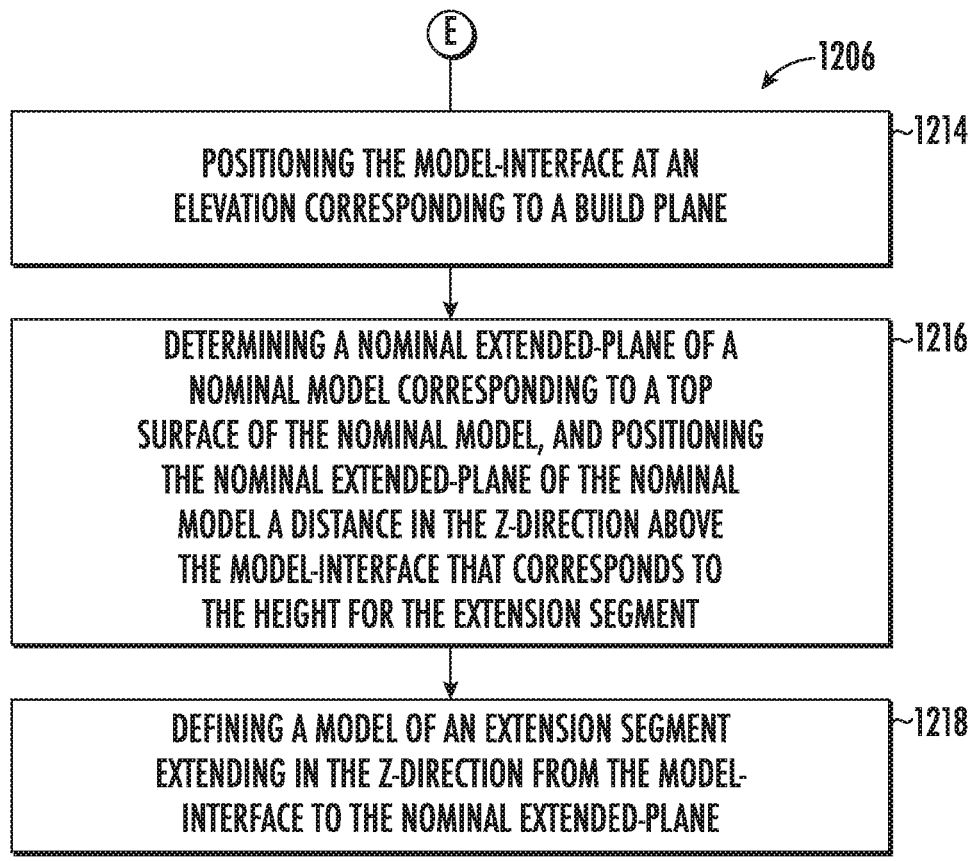
Figure 12D:
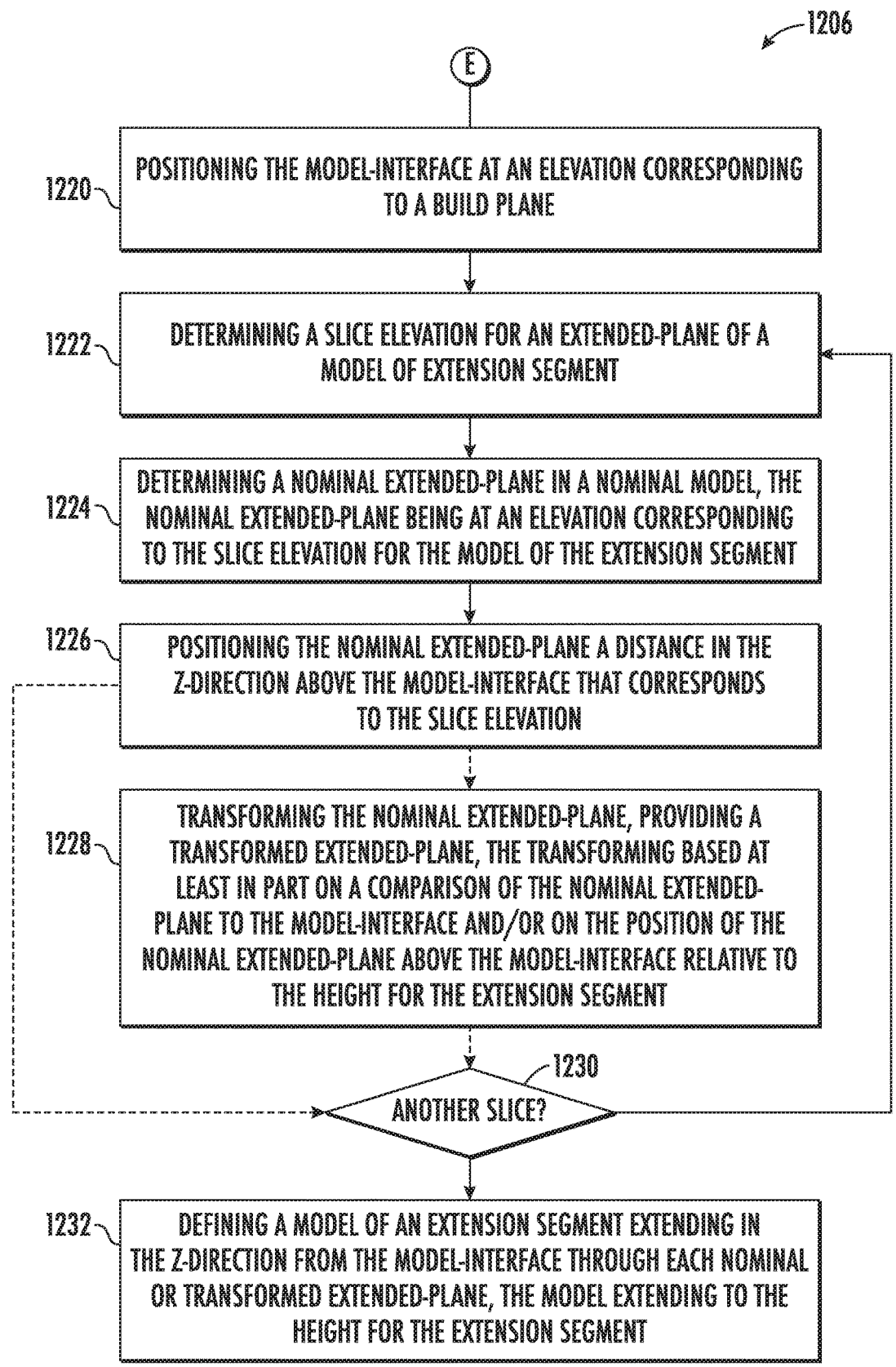

Exemplary methods of extending a model-interface 804 at step 1206 are shown in FIGS. 12B-12D. As shown in FIG. 12B, extending a model-interface 804 in the z-direction may include, at step 1208, positioning the model-interface 804 at an elevation corresponding to a build plane 122 of an additive manufacturing machine 104; at step 1210, positioning a copy of the model-interface a distance in the z-direction above the model-interface 804 that corresponds to the height for the extension segment 206; and at step 1212, defining a model of an extension segment 802 extending in the z-direction from the model-interface 804 to the copy of the model-interface 804.

As shown in FIG. 12C, extending a model-interface 804 in the z-direction may include, at step 1214, positioning the model-interface 804 at an elevation corresponding to a build plane 122 of an additive manufacturing machine 104; at step 1216, determining a nominal extended-plane 1104 of a nominal model corresponding to a top surface of the nominal model, and positioning the nominal extended-plane 1104 of the nominal model a distance in the z-direction above the model-interface 804 that corresponds to the height for the extension segment 206; and at step 1218, defining a model of an extension segment 802 extending in the z-direction from the model-interface 804 to the nominal extended-plane 1104.

As shown in FIG. 12D, extending a model-interface 804 in the z-direction may include, at step 1220, positioning the model-interface 804 at an elevation corresponding to a build plane 122; at step 1222, determining a slice elevation for an extended-plane 1104 of a model of an extension segment 802; at step 1224, determining a nominal extended-plane 1104 in a nominal model, the nominal extended-plane 1104 being at an elevation corresponding to the slice elevation for the model of the extension segment 802; and at step 1226, positioning the nominal extended-plane 1104 a distance in the z-direction above the model-interface 804 that corresponds to the slice elevation.

In some embodiments, extending a model-interface 804 in the z-direction may include, at step 1228, transforming a nominal extended-plane 1104, providing a transformed extended-plane 1104. The transforming of the nominal extended-plane 1104 may be based at least in part on a comparison of the nominal extended-plane 1104 to the model-interface 804. Additionally, or in the alternative, the transforming of the nominal extended-plane 1104 may be based at least in part on the position of the nominal extended-plane 1104 above the model-interface 804 relative to the height for the extension segment 206. The transforming at step 1228 may include one more transforming operations, including those shown in FIGS. 10A-10D, or any other transforming operation, such as aligning, altering, modifying, contorting, distorting, deforming, correcting, adjusting, revising, straightening, tilting, rotating, bending, twisting, or editing, as well as combinations of these.

The particular transforming operation(s) at step 1228 may be selected based at least in part on the comparison of the nominal extended-plane 1104 and/or the position of the nominal extended-plane 1104. In some embodiments, a transforming operation may include a smoothing factor, which may be configured to provide a graduated transition from a model-interface 804 to a transformed extended-plane 1104. For example, an extended-plane 1104 may have a perimeter that differs from a model-interface perimeter 806, and the smoothing factor may be configured to provide a gradual transition therebetween. The smoothing factor may temper the transformation by a prorated amount depending on the z-directional location of the extended-plane 1104.

An extended-plane 1104 at a z-direction position that corresponds to the height of the extension segment 206 may not be transformed, such that the model of the extension segment 802 may gradually transition along the z-direction from a model-interface 804 conforming to a workpiece-interface 120 to an extended-plane 1104 conforming to the top surface 858 of the nominal model 852. Additionally, or in the alternative, an extended-plane 1104 at a z-direction position between the model-interface 804 and the top surface of the extension segment 808 may be transformed with a smoothing factor applied to the transformation, so as to provide a transformed extended-plane 1104 conforming to a perimeter partly between that of the model-interface 804 and that of the top surface of the nominal model 852. Also, in some embodiments, an extended-plane 1104 at a z-direction position that corresponds to the height of the extension segment 206 may be transformed, for example, to provide top surface 808 of an extension segment 206 that differs from a top surface of the nominal model.

Still referring to FIG. 12D, the step of extending a model-interface 804 in the z-direction may be performed for any number of slices. As shown in FIG. 12D, an exemplary method 1200 may include, at step 1230, determining whether the model of the extension segment 802 may include another slice. The number of slices may be predetermined, such as based on the intended height of the model of the extension segment 802 and a z-directional slice interval. A z-directional slice interval may depend on the desired z-directional resolution of the model of the extension segment 802. When there is another slice, the exemplary method 1200 may include repeating steps 1222 through 1230. When step 1230 indicates that there are no additional slices, the exemplary method 1200 may proceed with step 1232, which provides for defining a model of an extension segment 802 extending in the z-direction from the model-interface 804 through each nominal or transformed extended-plane 1104, with the model extending to the height for the extension segment 206. The model of the extension segment 802 may be defined at step 1232 concurrently as, or subsequently after, each extension-plane is determined, positioned, and/or transformed at steps 1224, 1226, and 1228.

Referring again to FIG. 9A, a model of a plurality of extension segments 802 may be output at step 914, such as to an extension segment-CAD model 800 as shown in FIG. 8A. Each of the models of the extension segments 802 may include a model-interface 804 aligned in the z-direction to an interface plane in the extension segment-CAD model 800. The interface plane in the extension segment-CAD model 800 may correspond to a build plane 122 of an additive printing machine 104. In this way, a plurality of extension segments 206 may be additively printed on workpiece-interfaces 120 of respective workpieces 116 as part of the same build with each extension segment 206 properly aligning in the z-direction with the build plane 122. Referring again to FIG. 4, an exemplary method 400 of additively printing an extension segment 206 includes, at step 408 generating a print command based at least in part on a digital representation of a field of view 114 captured by the vision system. FIG. 7B, shows an exemplary method 750 of generating a print command for a plurality of slices of one or more extension segments 206.

Figure 13:
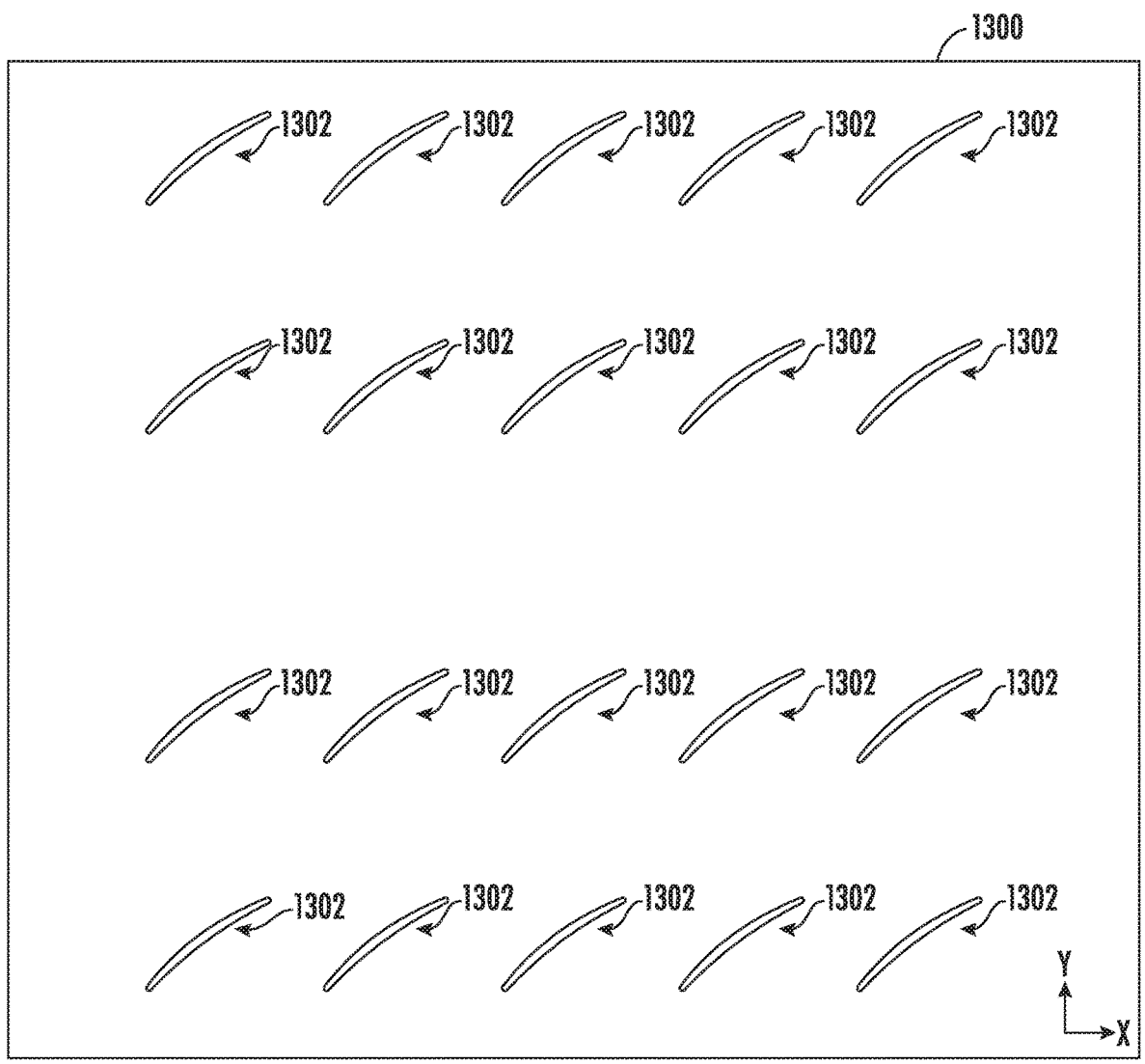
FIG. 13 schematically depicts an exemplary print command for additively printing a slice of a plurality of extension segments.

Now referring to FIG. 13, an exemplary print command 1300 for a slice of a plurality of extension segments 206 is graphically depicted. As shown in FIG. 13, an exemplary print command 1300 for additively printing a slice of an extension segment 206 may include a plurality of scan paths 1302 respectively corresponding to the slice. In an exemplary embodiment, the print command 1300 may be for a slice that includes a scan path corresponding to the model-interface 804 of the plurality of extension segments 206. Additional print commands 130 may be generated for each respective slice as described with reference to FIG. 7B. The number of slices may depend on the size (e.g., height, thickness) of the extension segment(s) 206 in the extension segment-CAD model 800, as well as the desired thickness of the layers of powder 126 or other material that may be used to additively print the extension segment(s) 206.

In exemplary embodiments, the extension segment-CAD model 800 may include a model of a plurality of extension segments 802, in which at least a first model of a first extension segment 802 differs from at least a second model of a second extension segment 802. The first model of the first extension segment 802 may conform to and may be substantially congruent with a first workpiece-interface 120 of a first workpiece 116, and the second model of the second extension segment 802 may conform to and be substantially congruent with a second workpiece-interface 120 of a second workpiece 116. The print command 1300 may include a first scan path corresponding to a first slice of the first extension segment 206 and a second scan path corresponding to a second slice of the second extension segment 206, and the first scan path may differ from the second scan path. For example, the first scan path may define a first extension segment perimeter and the second scan path may define a second extension segment perimeter, in which the first extension segment perimeter differs from the second extension segment perimeter, such as in respect of curvature, surface area, and/or geometry.

Now referring to FIGS. 14-19, exemplary pretreatments, methods of determining and/or generating a pretreatment command, and methods of pretreating a workpiece-interface 120 will be further described.

Figure 4:
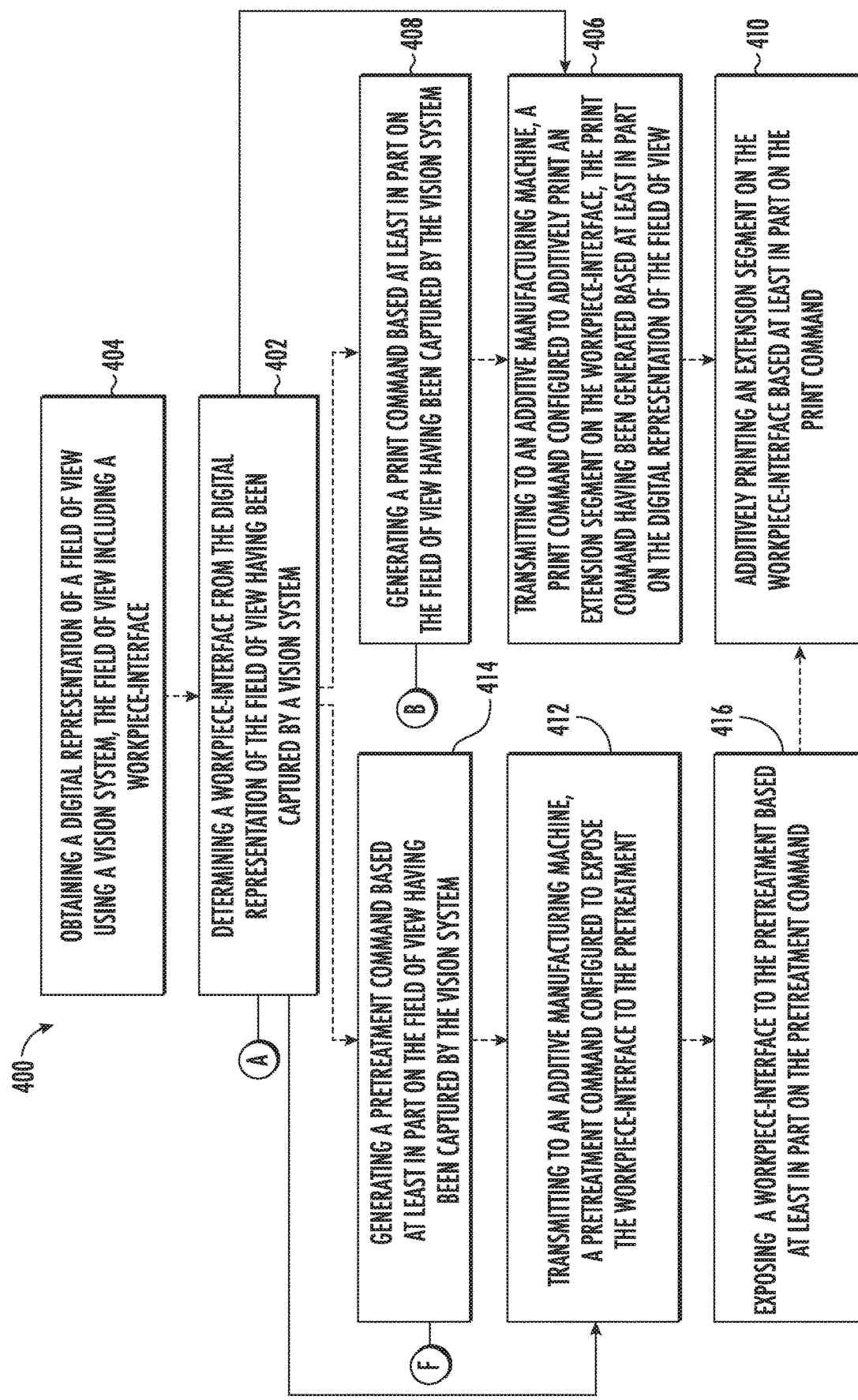
FIG. 4 shows a flowchart depicting an exemplary method of additively printing an extension segment on a workpiece-interface of a workpiece.
Figure 14:
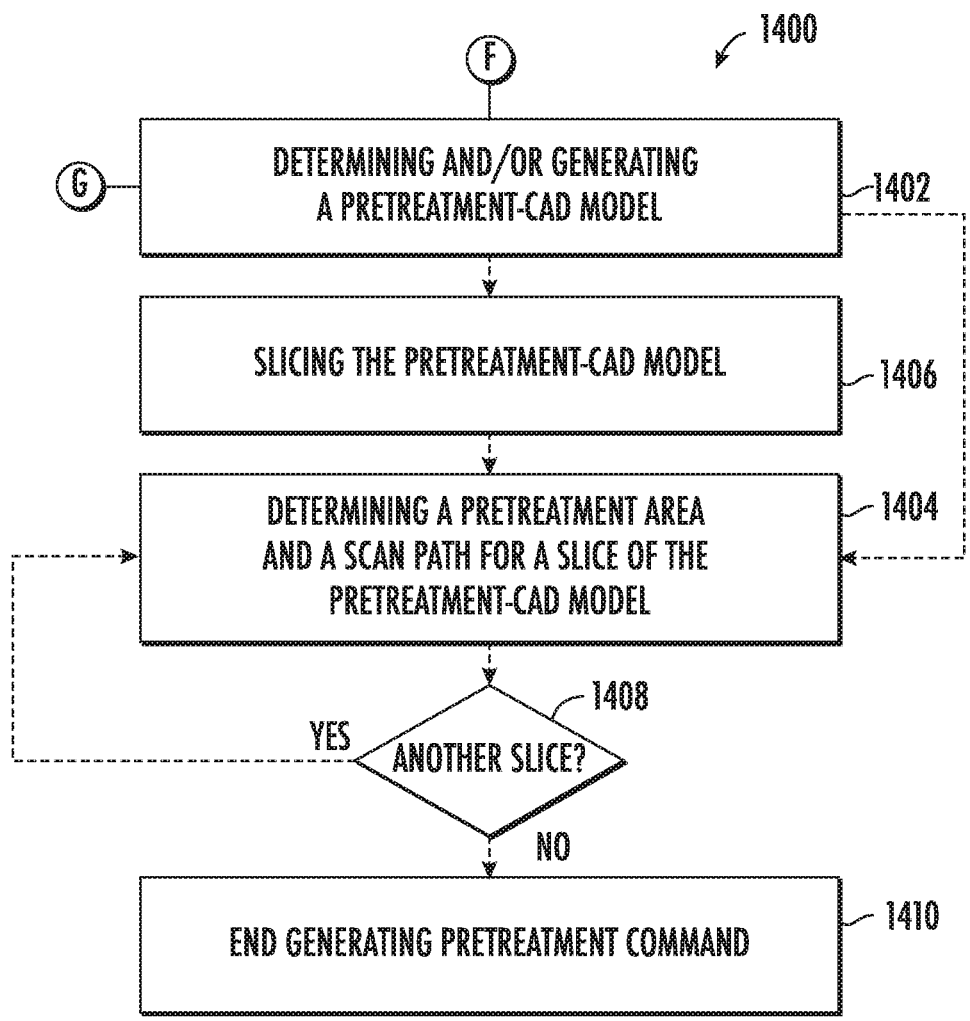
FIG. 14 shows a flowchart depicting an exemplary method of generating a pretreatment command.

FIG. 14 shows an exemplary method 140 of generating a pretreatment command, which may be performed, for example, as at step 414 in the exemplary method 400 of additively printing an extension segment 206 shown in FIG. 4. An exemplary method 1400 may include, at step 1402, determining and/or generating a pretreatment-CAD model. The pretreatment-CAD model may provide a two-dimensional or a three-dimensional model of the pretreatment region. When the pretreatment-CAD model provides a two-dimensional model of the pretreatment region, the exemplary method 1400 may proceed to step 1404, providing for determining a pretreatment region and a scan path and for the extension segment-CAD model. When the pretreatment-CAD model provides a three-dimensional model of the pretreatment region, the exemplary method 1400 may proceed with step 1406, providing for slicing the pretreatment-CAD model, and then step 1404, providing for determining a pretreatment region and a scan path for each slice of the extension segment-CAD model. After determining a pretreatment region and a scan path for a slice of the extension segment-CAD model at step 1404, the exemplary method 1400 may proceed with determining, at step 1408, whether there is another slice, and if so, the exemplary method 1400 may proceed back to step 1404, providing for determining a pretreatment region and a scan path for a next slice of the pretreatment-CAD model. The exemplary method 1400 may end, at step 1410, when there are no additional slices for which a pretreatment region and a scan path may be determined.

The number of slices in a pretreatment-CAD model may depend on the nature of the pretreatment to be provided. For example, in some embodiments a pretreatment-CAD model for a pretreatment that includes additive-leveling may include more slices than a pretreatment-CAD model for melt-leveling or heat-conditioning. As another example, when a pretreatment includes heat-conditioning or melt-leveling a workpiece-interface without additive-leveling, the pretreatment-CAD model may include only one slice, although such as pretreatment-CAD model may include a plurality of slices. Further, while a pretreatment that includes additive-leveling may utilize a pretreatment-CAD model that includes a plurality of slices, additive-leveling may also be provided using a pretreatment-CAD model that includes only one slice. By way of example, a pretreatment-CAD model may include from 1 to 20 slices, such as from 1 to 10 slices, such as from 1 to 5 slices, such as from 5 to 10 slices, or such as from 10 to 20 slices, depending on the nature of the pretreatment to be provided. In an exemplary embodiment, a pretreatment-CAD model may include from 1 to 5 slices, such as from 1 to 3 slices, or such as from 1 to 2 slices.

Figure 15A:
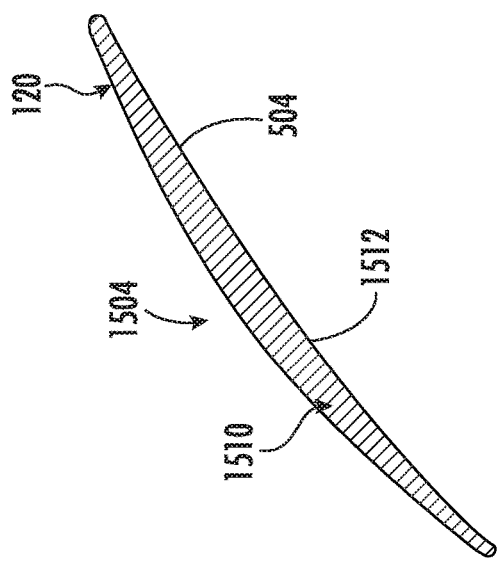
FIGS. 15A-15R schematically depict exemplary aberrant workpiece-interfaces, exemplary pretreatment-CAD models, and exemplary pretreated workpiece-interfaces respectively corresponding to one another.
Figure 15C:
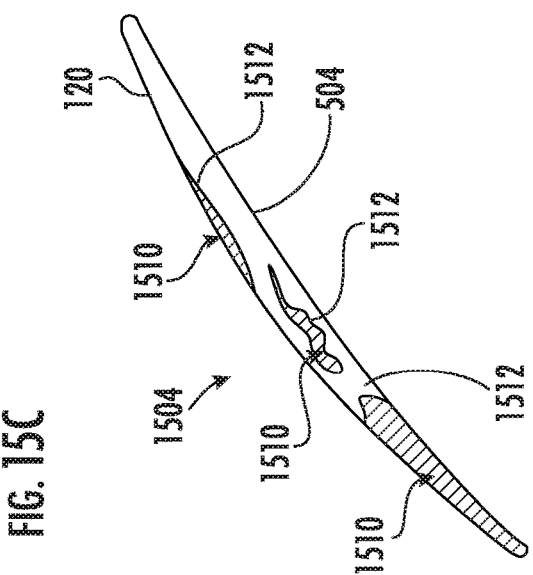

Now turning to FIGS. 15A-15R, exemplary pretreatment-CAD models 1500 will be described. FIGS. 15A, 15D, 15G, 15J, 15M, and 15P and show exemplary digital representations of an aberrant workpiece-interface 1502 obtained from a field of view 114 of a vision system 102. FIGS. 15B, 15E, 15H, 15K, 15N, and 15Q show exemplary pretreatment-CAD models 1500 respectively corresponding to the digital representations of the aberrant workpiece-interfaces 1502 shown in FIGS. 15A, 15D, 15G, 15J, 15M, and 15P. The pretreatment-CAD models 1500 may include an additive-leveling pretreatment, a melt-leveling pretreatment, and/or a heat-conditioning pretreatment. FIGS. 15C, 15F, 15, 15L, 15O, and 15R show exemplary pretreated workpiece-interfaces 1504 resulting from pretreating the respective aberrant workpiece-interfaces 120 shown in FIGS. 15A, 15D, 15G, 15J, 15M, and 15P according to the corresponding pretreatment-CAD models 1500 shown in FIGS. 15B, 15E, 15H, 15K, 15N, and 15Q.

As shown in FIGS. 15A, 15D, 15G, and 15J, a workpiece-interface 120 may include one or more congruent region 1506 and one or more aberrant regions 1508. The one or more congruent regions 1506 may exhibit an absence of aberrant features. Alternatively, as shown in FIGS. 15M and 15P, an aberrant region 1508 may encompass all or substantially all of a workpiece-interface 120. When aberrant features are isolated to one or more aberrant regions 1508, a pretreatment may be performed only on the aberrant regions 1508 of the workpiece-interface 120. Alternatively, a pretreatment may be performed across all or substantially all of the workpiece-interface 120. For example, when the aberrant regions 1508 are widespread, it may be desirable to perform a pretreatment across all or substantially all of the workpiece-interface 120 rather than isolating the pretreatment to particular aberrant regions 1508. Additionally, or in the alternative, it may be desirable to perform a pretreatment across all or substantially all of the workpiece-interface 120, regardless of whether the aberrant regions 1508 are isolate or widespread, for example, when the pretreatment may enhance the workpiece-interface 120 as a whole such as when the pretreatment may provide a more congruent workpiece-interface 120, may enhance the workpiece-interface 120 generally, and/or when aberrant features may exist but that are not detectable with the vision system 120 or that have not been detected with the vision system.

The absence of aberrant features in the one or more congruent regions 1506 may be directly determined from a digital representation of the workpiece-interface 120 obtained from a vision system 102, or the absence of aberrant features may be inferentially determined, for example, when aberrant features have not been directly determined in a region or regions of the digital representation of the workpiece-interface 120. The one or more aberrant regions 1508 may exhibit one or more aberrant features. The presence of aberrant features in the one or more aberrant regions 1508 may be directly determined from the digital representation of the workpiece-interface 120, or the presence of aberrant features may be inferentially determined, for example, when an absence of aberrant features has not been directly determined from the digital representation of the workpiece-interface 120.

Figure 15B:
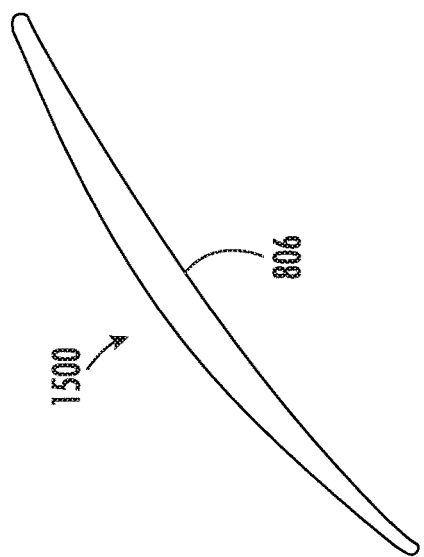

FIG. 15B shows an exemplary pretreatment-CAD model 1500 determined and/or generated for the aberrant workpiece-interface 1502 shown in FIG. 15A. As shown, the pretreatment-CAD model 1500 may include a model-interface perimeter 806 having substantial congruency with the workpiece-interface perimeter 504 of the aberrant workpiece-interface 1502, such that the pretreatment-CAD model 1500 may be configured to apply a pretreatment to all or substantially all of the workpiece-interface 120. The pretreatment-CAD model 1500 shown in FIG. 15B may be selected, for example, even though the aberrant workpiece-interface 1502 shown in FIG. 15A may be determined to exhibit aberrant features (e.g., directly determined or inferentially determined) only in one or more aberrant regions 1508.

FIG. 15C shows a pretreated workpiece-interface 1504 resulting from pretreating the aberrant workpiece-interface 1502 shown in FIG. 15A according to the pretreatment-CAD model 1500 shown in FIG. 15B. As shown, the pretreated workpiece-interface 1504 may include a pretreated surface having substantial congruency with the workpiece-interface perimeter 504, such that the pretreatment may be applied across all or substantially all of the workpiece-interface 120. The pretreatment may include remediating aberrant features and/or enhancing one or more features of the workpiece 116 and/or of the workpiece-interface 120 in preparation for additively printing an extension segment on the workpiece-interface 120.

Figure 15E:
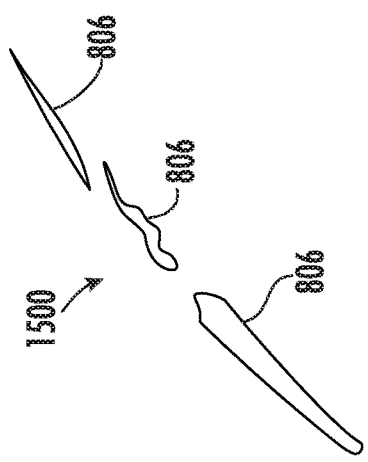

FIG. 15E shows another exemplary pretreatment-CAD model 1500. The pretreatment-CAD model 1500 shown in 15E may be determined and/or generated for the aberrant workpiece-interface 1502 shown in FIG. 15D. As shown in FIG. 15E, the pretreatment-CAD model 1500 may include a model-interface perimeter 806 having substantial congruency with a pretreatment region 1510 of the aberrant workpiece-interface 120. The pretreatment region 1510 may be defined by a pretreatment-region perimeter 1512. In some embodiments, the pretreatment-CAD model 1500 may be configured to isolate the pretreatment to the aberrant regions 1508 of the workpiece-interface 120. The pretreatment-CAD model 1500 shown in FIG. 15E may be selected, for example, when the aberrant workpiece-interface 1502 shown in FIG. 15D may be determined to exhibit aberrant features (e.g., directly determined or inferentially determined) only in one or more aberrant regions 1508.

Figure 15D:
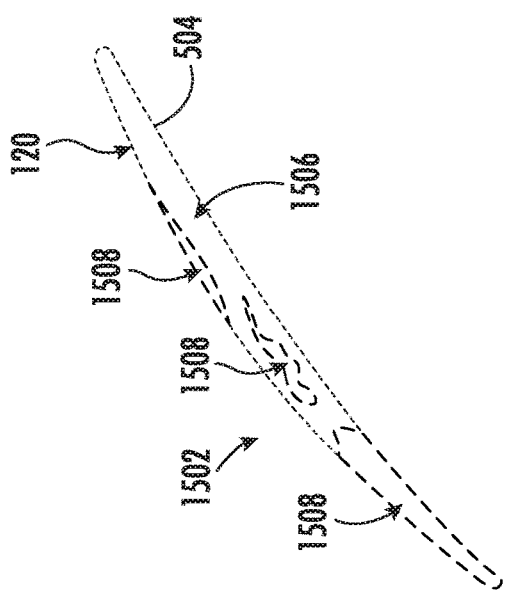
Figure 15F:
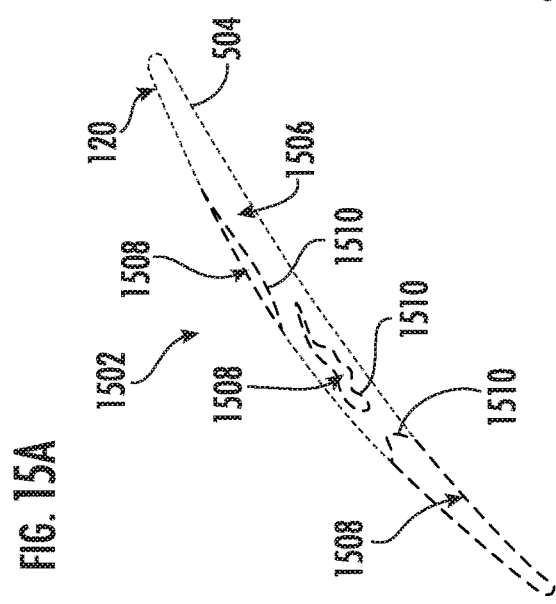

FIG. 15F shows a pretreated workpiece-interface 1504 resulting from pretreating the aberrant workpiece-interface 1502 shown in FIG. 15D according to the pretreatment-CAD model 1500 shown in FIG. 15E. As shown, the pretreated workpiece-interface 1504 may include a pretreated surface having substantial congruency with a pretreatment region 1510 defined by a pretreatment-region perimeter 1512, such that the pretreatment may be isolated to the aberrant regions 1508 of the workpiece-interface 120. The pretreatment may include remediating aberrant features and/or enhancing one or more features of the workpiece 116 and/or of the workpiece-interface 120 in preparation for additively printing an extension segment on the workpiece-interface 120.

In some embodiments, the pretreatments shown in FIGS. 15C and 15F may include additive leveling. For example, the aberrant regions 1508 shown in FIGS. 15C and 15F may exhibit skewness and/or a lower elevation relative to the build plane 122 and/or relative to the congruent regions 1506. In other embodiments, the pretreatment may include melt-leveling. For example, FIGS. 15G and 15J show exemplary aberrant workpiece-interfaces 1502 with aberrant regions 1508 that exhibit skewness and/or a higher elevation relative to the build plane 122 and/or relative to the congruent regions 1506. The aberrant workpiece-interfaces 1502 shown in FIGS. 15G and 15J may receive a pretreatment that includes melt-leveling according to pretreatment-CAD models 1500 respectively shown in FIGS. 15H and 15K. However, it will be appreciated that the pretreatments shown in FIGS. 15C and 15F may also include melt-leveling in addition or as an alternative to additive-leveling. Likewise, the pretreatments shown in FIGS. 15G and 15J may also include additive-leveling in addition or as an alternative to melt-leveling.

Figure 15H:
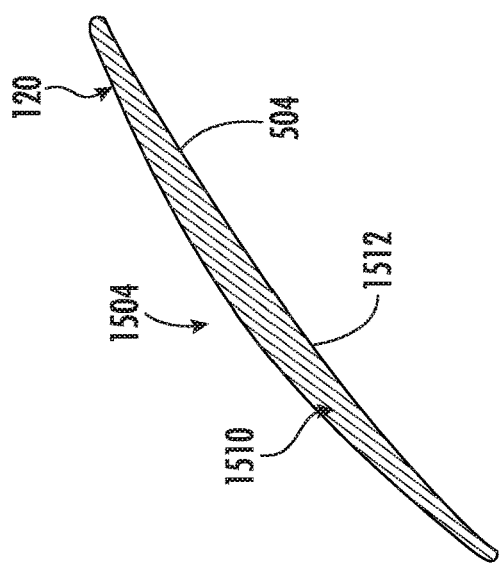
Figure 15I:
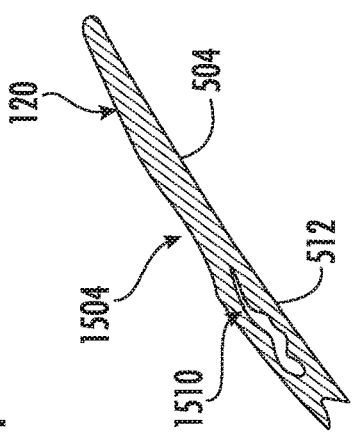
Figure 15K:
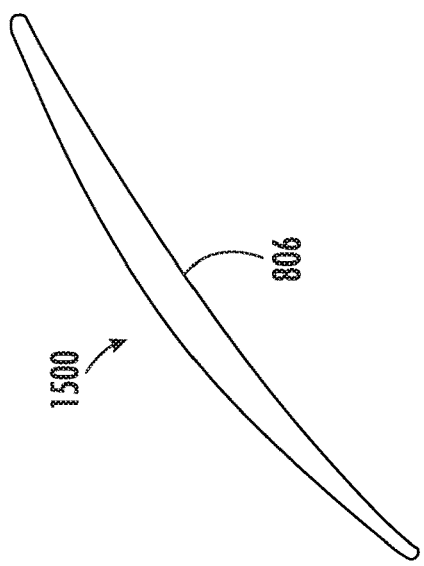
Figure 15L:
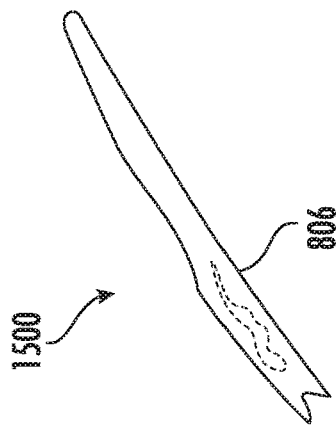
Figure 15G:
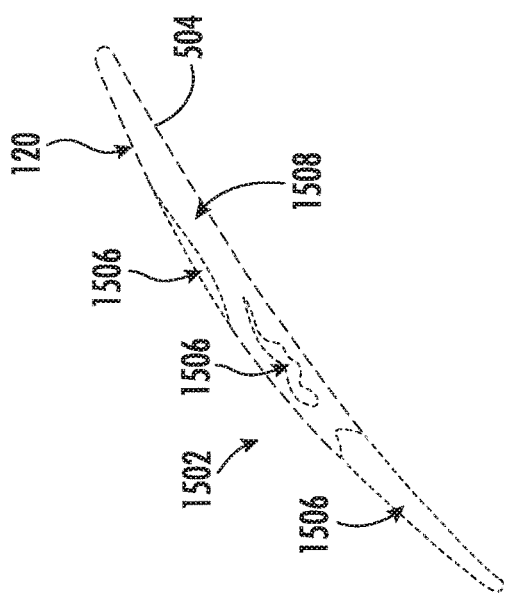
Figure 15J:
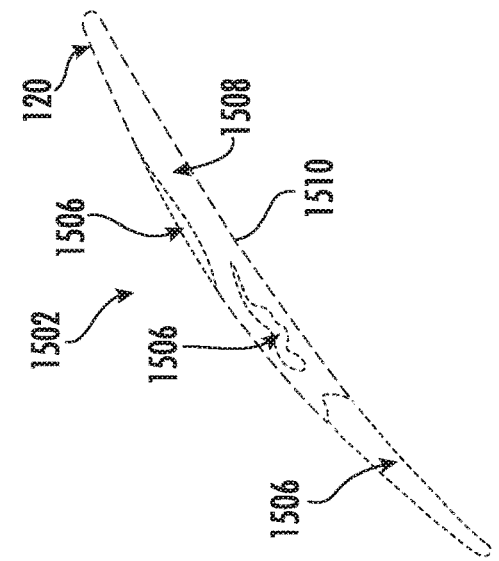
Figure 15M:
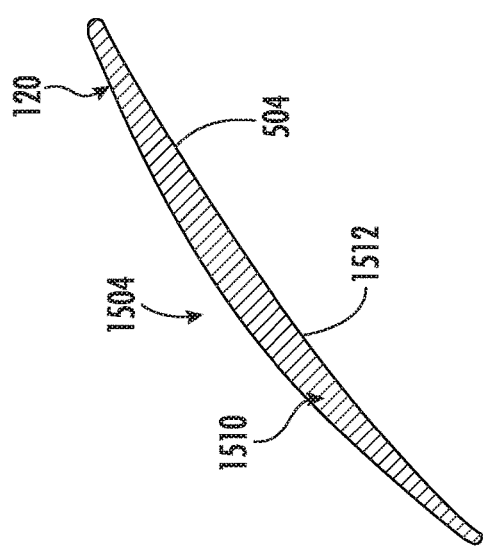

The exemplary pretreatment-CAD model 1500 shown in FIG. 15H determined and/or generated for the aberrant workpiece-interface 1502 shown in FIG. 15G, for example, so as to provide a model-interface perimeter 806 having substantial congruency with the workpiece-interface perimeter 504 of the aberrant workpiece-interface 120. The pretreatment-CAD model 1500 shown in FIG. 15K may be determined and/or generated for the aberrant workpiece-interface 1502 shown in FIG. 15J, for example, to provide a model-interface perimeter 806 having substantial congruency with a pretreatment region 1510 of the aberrant workpiece-interface 120 and thereby isolate the pretreatment to the aberrant regions 1508 of the workpiece-interface 120. The pretreatment-CAD model 1500 shown in FIG. 15H may be selected, for example, even though the aberrant workpiece-interface 1502 shown in FIG. 15G may be determined to exhibit aberrant features (e.g., directly determined or inferentially determined) only in one or more aberrant regions 1508. The pretreatment-CAD model 1500 shown in FIG. 15K may be selected, for example, when the aberrant workpiece-interface 1502 shown in FIG. 15DJ may be determined to exhibit aberrant features (e.g., directly determined or inferentially determined) only in one or more aberrant regions 1508.

FIG. 15I shows a pretreated workpiece-interface 1504 resulting from a pretreatment applied to the aberrant workpiece-interface 1502 shown in FIG. 15G according to the pretreatment-CAD model 1500 shown in FIG. 15H. The pretreatment may provide a pretreated workpiece-interface 1504 that includes a pretreated surface having substantial congruency with the workpiece-interface perimeter 504. FIG. 15L shows a pretreated workpiece-interface 1504 resulting from pretreating the aberrant workpiece-interface 1502 shown in FIG. 15J according to the pretreatment-CAD model 1500 shown in FIG. 15E, providing a pretreated surface having substantial congruency with a pretreatment region 1510 defined by a pretreatment-region perimeter 1512 so as to isolate the pretreatment to the aberrant regions 1508 of the workpiece-interface 120. The pretreatments shown in FIGS. 15I and/or 15L may include remediating aberrant features and/or enhancing one or more features of the workpiece 116 and/or of the workpiece-interface 120 in preparation for additively printing an extension segment on the workpiece-interface 120.

Figure 15N:
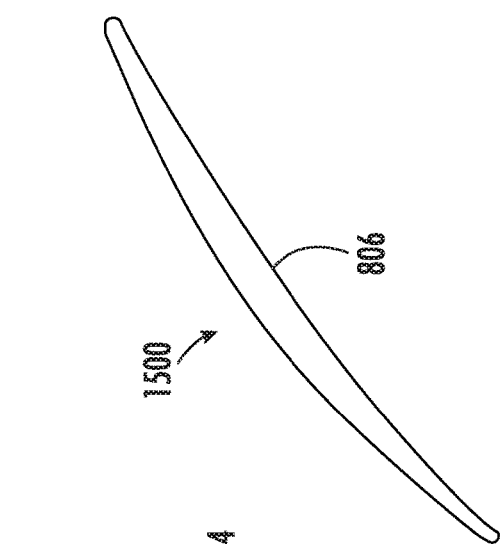
Figure 15O:
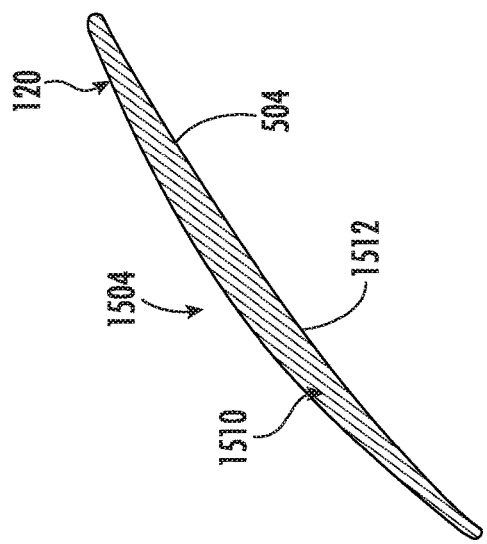
Figure 15P:
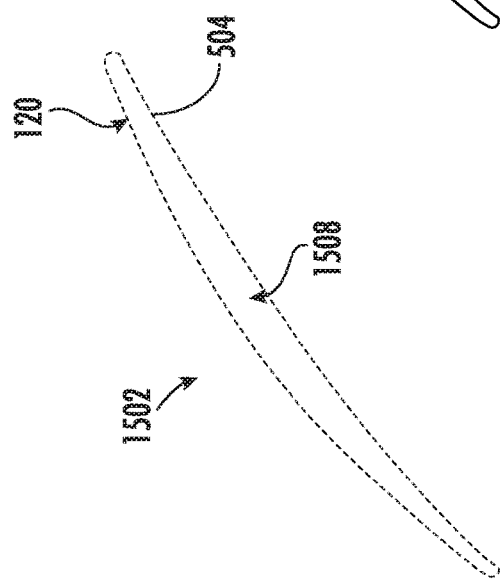
Figure 15Q:
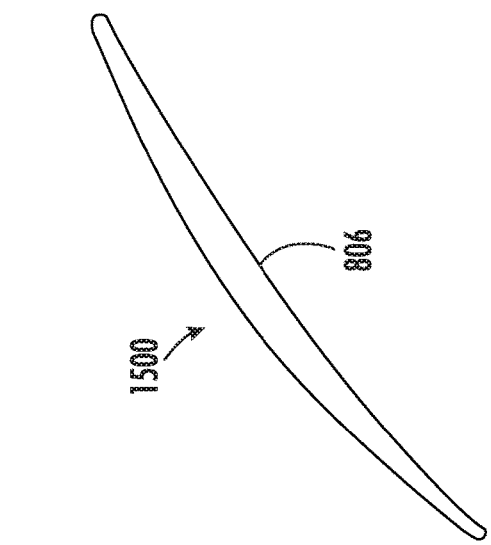
Figure 15R:
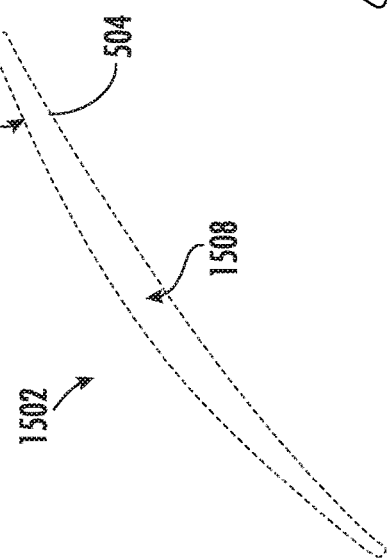

While the aberrant workpiece-interfaces 1502 in the embodiments shown in FIGS. 15A, 15D, 15G, and 15J include one or more aberrant regions 1508, in other embodiments, an aberrant workpiece-interface 1502 may include widespread aberrant regions 1508 and/or the aberrant region 1508 may be directly or inferentially determined to encompass all or substantially all of the workpiece-interface perimeter 504. For example, FIGS. 15M and 15P show exemplary embodiments of an aberrant workpiece-interfaces 1502 with the region defined by the workpiece-interface perimeter 504 being the aberrant region 1508. As shown in FIGS. 15N and 15Q, a pretreatment-CAD model 1500 may include a model-interface perimeter 806 having substantial congruency with the workpiece-interface perimeter 504 of the respective aberrant workpiece-interface 120, such that the pretreatment-CAD model 1500 may be configured to apply a pretreatment to all or substantially all of the workpiece-interface 120. FIG. 15N shows a pretreatment-CAD model 1500 configured to provide a pretreatment that includes additive-leveling, and FIG. 15O shows a pretreated workpiece-interface 1504 resulting from pretreating the aberrant workpiece-interface 1502 shown in FIG. 15M according to the pretreatment-CAD model 1500 shown in FIG. 15N. FIG. 15Q shows a pretreatment-CAD model 1500 configured to provide a pretreatment that includes melt-leveling, and FIG. 15R shows a pretreated workpiece-interface 1504 resulting from pretreating the aberrant workpiece-interface 1502 shown in FIG. 15P according to the pretreatment-CAD model 1500 shown in FIG. 15Q. It will be appreciated that the pretreatment shown in FIG. 15O may also include a melt-leveling pretreatment and/or a heat-conditioning pretreatment, and that the pretreatment shown in FIG. 15R may also include an additive-leveling pretreatment and/or a heat-conditioning pretreatment.

Figure 16A:
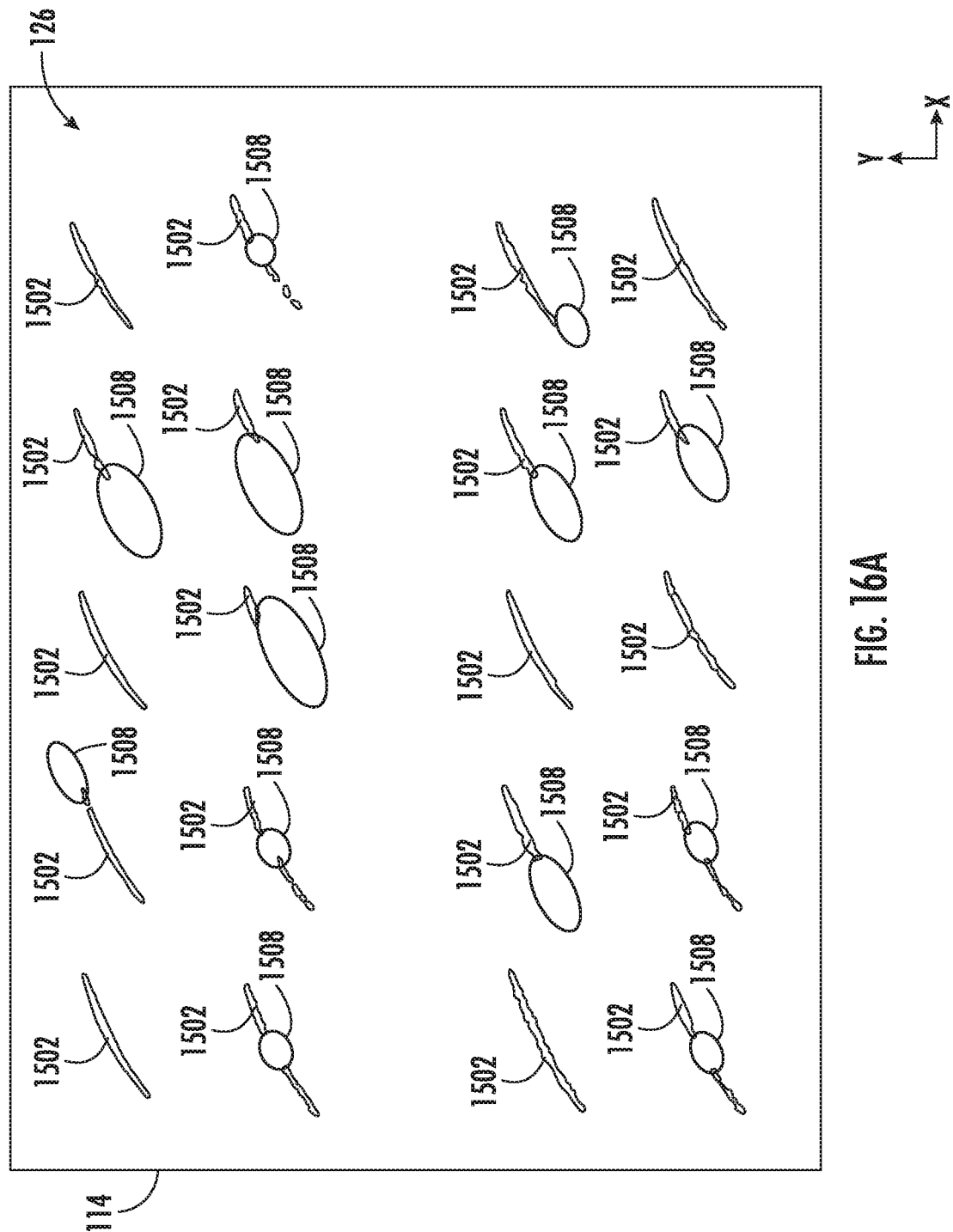
FIG. 16A schematically depicts a digital representation of a plurality of workpieces having an aberrant workpiece-interface, with the workpieces situated in a workpiece alignment system and a scratch-coating of powder applied thereto.

Now referring to FIGS. 16A and 16B, exemplary workpieces 116 having an aberrant workpiece-interface 1502 and corresponding workpieces having a pretreated workpiece-interface 1504 will be discussed. FIG. 16A shows an exemplary digital representation of a plurality of workpieces 116 having an aberrant workpiece-interface 1502. The digital representation may be obtained using the vision system 102, for example, as described with reference to FIGS. 6A and 6B. As shown, a scratch coating of powder 126 has been applied to the plurality of workpieces, partially covering some of the aberrant workpiece-interfaces 1502. In some embodiments, the powder 126 may cover aberrant regions 1508 of the aberrant workpiece-interfaces 1502 that have an elevation below that of the scratch coating. The portions of the aberrant workpiece-interfaces 1502 exposed above the powder may be congruent regions 1506 and/or aberrant regions 1508. While all of the workpiece-interfaces 120 shown in FIG. 16A are identified as aberrant workpiece-interfaces 1502, sometimes there may be workpiece-interfaces that do not include an aberrant region 1508.

All or a subset of the workpiece-interfaces 120 in a digital representation of a field of view 114 may be pretreated according to a pretreatment-CAD model. The pretreatment-CAD model may include a plurality of models corresponding to respective ones of the plurality of workpiece-interfaces 120. The respective models within the pretreatment-CAD model may differ as between respective workpiece-interfaces 120, for example, so as to apply a customized pretreatment to respective ones of the workpiece-interfaces 120. Alternatively, a pretreatment-CAD model may include a plurality of models differing only in respect of their coordinates, so as to apply a common pretreatment as between respective ones of the plurality of workpiece-interfaces 120. However, even when the models in a pretreatment-CAD differ only in respect of their coordinates, a pretreatment resulting from such a pretreatment-CAD model may differ as between respective ones of the workpiece-interfaces 120. For example, with a scratch coating of powder 126 applied as shown in FIG. 16A, a pretreatment-CAD model may apply an additive-leveling pretreatment to portions of the aberrant workpiece-interface 1502 (e.g., congruent regions 1606 or aberrant regions 1508) covered by the scratch coating of powder 126, while portions of the aberrant workpiece-interface 1502 protruding above the scratch coating of powder 126 (e.g., congruent regions 1506 or aberrant regions 1508) may receive a melt-leveling pretreatment.

In some embodiments, the pretreatment-CAD model need not distinguish between the portions of the aberrant workpiece-interface 1502 that are to receive an additive-leveling pretreatment and the portions of the workpiece-interface 1502 that are to receive a melt-leveling pretreatment. Instead, those portions of the aberrant workpiece-interface 1502 covered by the scratch coating of powder 126 may receive an additive-leveling pretreatment while those portions of the aberrant workpiece-interface 1502 protruding from the scratch coating of powder 126 may receive a melt-leveling pretreatment, regardless of where transitions may exist between portions covered by the scratch coating and portions protruding from the scratch coating. Alternatively, in some embodiments an additive-leveling pretreatment may be applied specifically to the aberrant regions 1508 covered by the scratch coating and/or a melt-leveling pretreatment may be applied specifically to the aberrant regions 1508 protruding from the scratch coating.

Figure 16B:
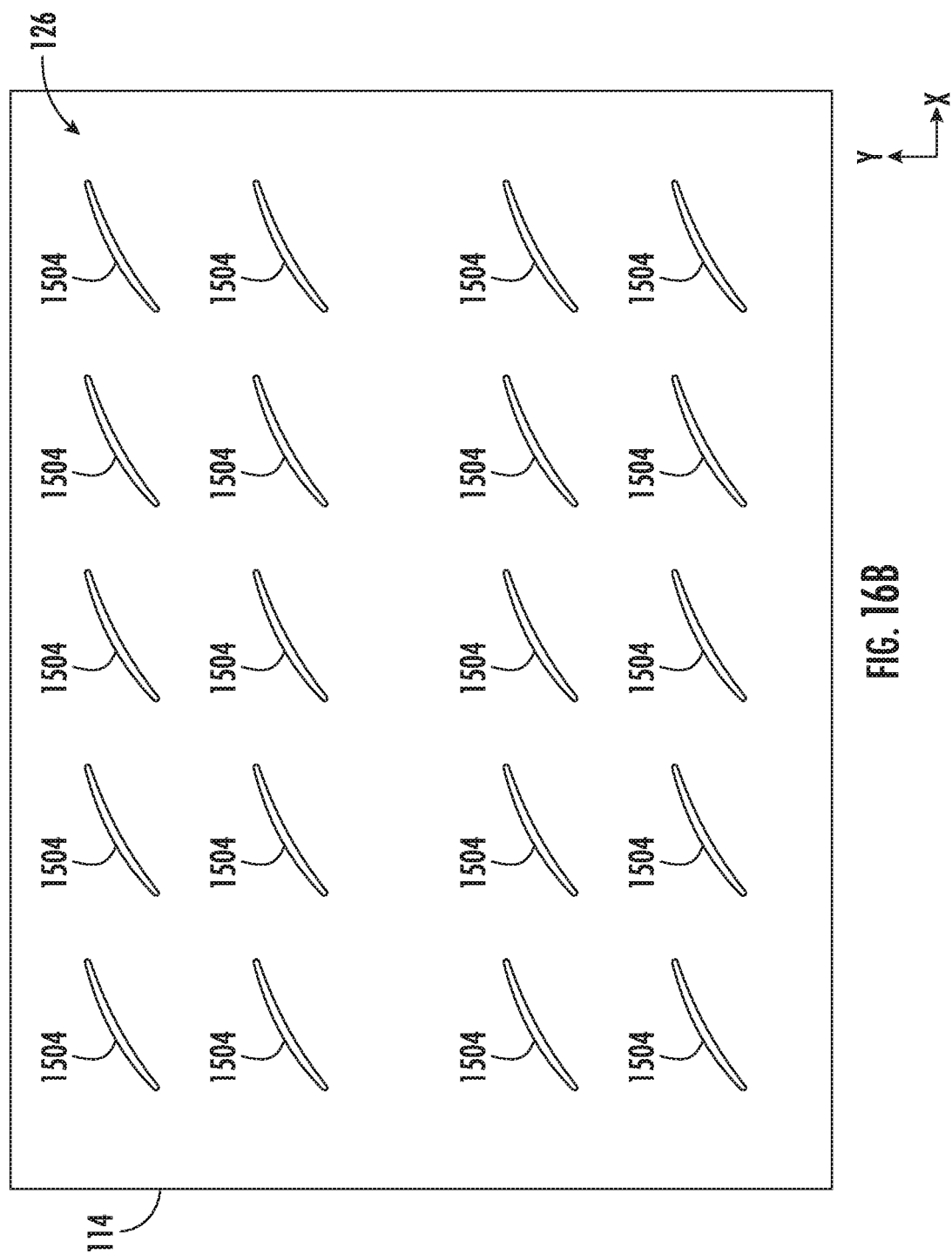
FIG. 16B; schematically depicts a digital representation of a plurality of workpieces situated in a workpiece alignment system after having a pretreatment applied to the aberrant workpiece-interfaces thereof.

FIG. 16B shows an exemplary digital representation of a plurality of workpieces 116 after having a pretreatment applied thereto such that the workpieces have a pretreated workpiece-interface 1504. The pretreated workpiece-interfaces 1504 shown in FIG. 16B may reflect a pretreatment applied to the aberrant workpiece-interfaces 1502 shown in FIG. 16A. As shown, the pretreated workpiece-interfaces 1504 may have a congruent region 1506 substantially congruent with the workpiece-interface perimeter 504. For example, the pretreated workpiece-interfaces 1504 may be substantially level with a scratch coating of powder 126 as a result of an additive-leveling and/or melt-leveling pretreatment.

Figure 17:
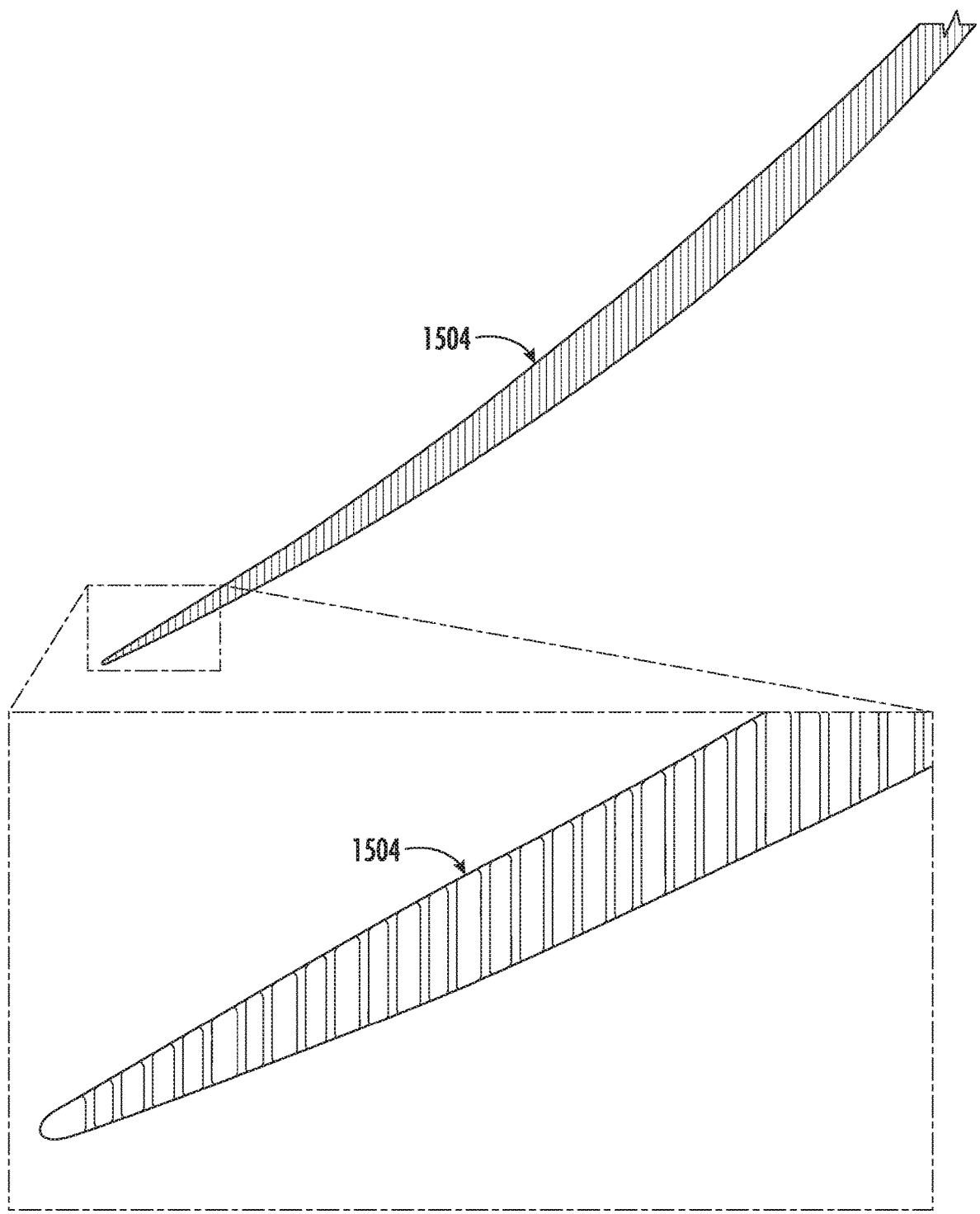
FIG. 17 schematically depicts an enlarged view of an exemplary pretreated workpiece-interface.

Now turning to FIG. 17, an enlarged view of an exemplary pretreated workpiece-interface 1504 is shown. The pretreated workpiece-interface may include contour lines 1700 resulting from the scan path of the energy source 142. The contour lines 1700 may reflect additive-leveling, melt-leveling, and/or heat-conditioning, reflecting one or more aberrant features having been remediated and/or one or more features of the workpiece-interface 120 having been enhanced. For example, the contour lines 1700 may enhance bonding between the workpiece 116 and an extension segment 206 additively printed on the workpiece-interface 120 following pretreatment.

Figure 18A:
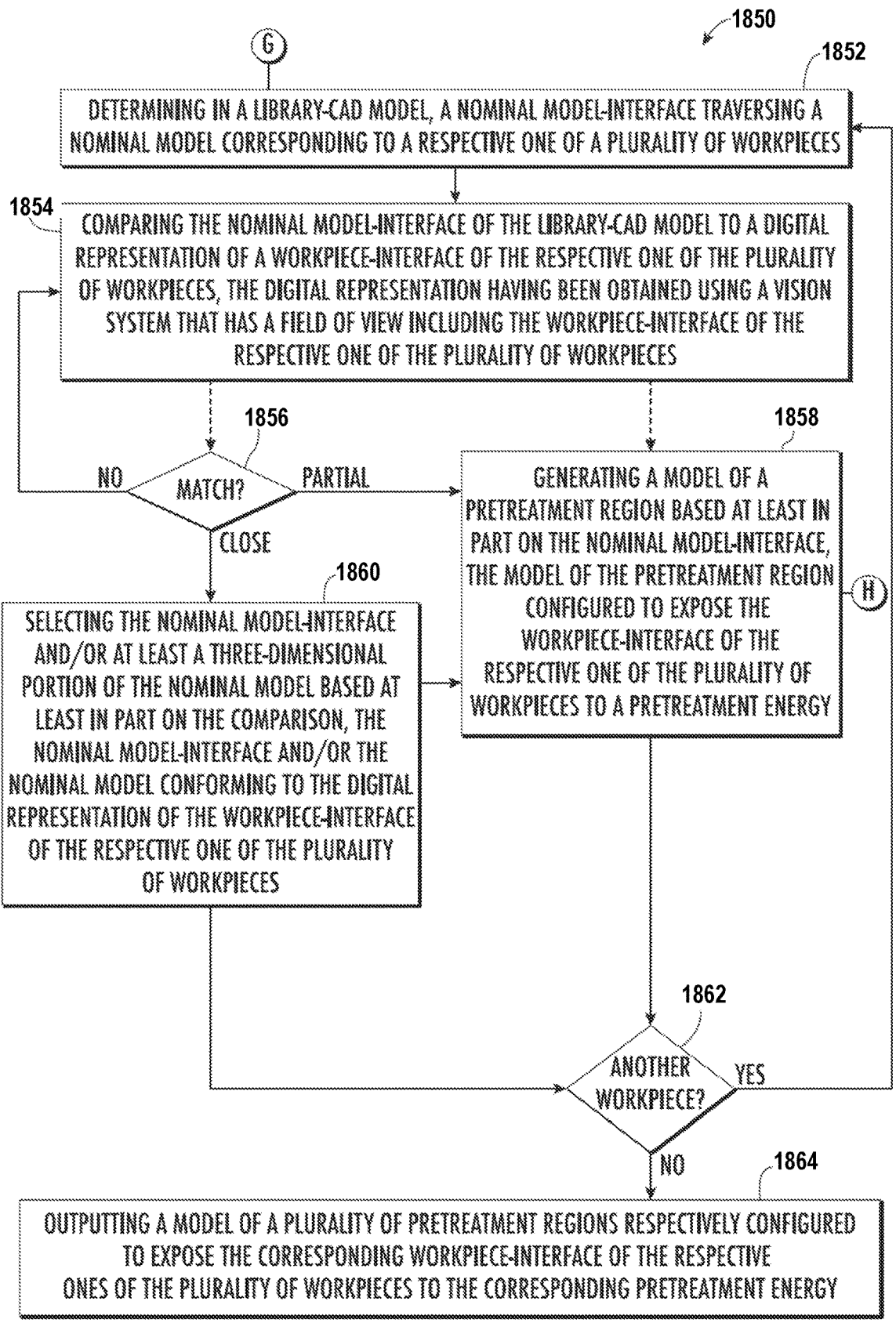
FIGS. 18A and 18B show a flowchart depicting an exemplary method of generating a pretreatment-CAD model.

Now turning to FIGS. 18A and 18B, exemplary methods of determining and/or generating a pretreatment-CAD model will be described. As shown in FIG. 18A, an exemplary method 1850 of generating a pretreatment-CAD model may be performed for each of a plurality of workpieces 116. An exemplary method 1850 may include, at step 1852, determining in a library-CAD model, a nominal model-interface 854 traversing a nominal model corresponding to a respective one of the plurality of workpieces 116. The nominal model may include a model of a nominal component 204, such as a model of a component 204 from which the workpieces 116 may have originated. The workpieces 116 may, however, differ from a component 204 having been additively manufactured according to the nominal model, for example, because of damage or wear incurred by the workpieces 116 as a result of the environment with which the component 204 was used, and/or from a subtractive modification performed to prepare the workpiece 116 for an extension segment 206 to be additively printed thereon. The nominal model may additionally or alternatively include a model of a nominal workpiece, such as a nominal model of a workpiece 116 produced by subjecting a nominal component 204 to a subtractive modification process to provide a workpiece-interface 120. The nominal model may additionally or alternatively include a model of a nominal pretreatment region 1510, such as a nominal model of a pretreatment region 1510 corresponding to a nominal workpiece 116.

Determining a nominal model-interface 854 may include determining a plane traversing the library-CAD model at a determined height. The determined height may correspond to a height of an expected location of a workpiece-interface 120 for a nominal workpiece 116. By way of example, a library-CAD model may include a model of a nominal component 204 corresponding to the workpiece 116, and the workpiece 116 may have been subjected to a subtractive modification, such as to provide a workpiece-interface 120. An expected location of a workpiece-interface 120 may be determined based at least in part on the nature of the subtractive modification, such as based on an expected amount of material removed or a resulting change in height of the workpiece 116 as a result of the subtractive modification.

Additionally, or in the alternative, the determined height may correspond to a height of a workpiece-interface 120 as determined from a digital representation of the workpiece 116. The height of a workpiece-interface 120 may be measured based at least in part on one or more dimensions of the workpiece 116 obtained from the digital representation of the workpiece, and a nominal model-interface 854 may be determined based at least in part on the measured height. Additionally, or in the alternative, the height of the workpiece-interface 120 may be measured based at least in part one or more dimensions of a workpiece alignment system 200 captured in a field of view 114. For example, a height of the workpiece-interface 120 may be determined based at least in part on the height of a workpiece shoe 214, or based at least in part on a difference between the height of the workpiece-interface 120 and the height of a workpiece shoe 214, or based at least in part on a difference between the height of the workpiece-interface 120 and the height of the build plate 118.

In some embodiments, a nominal model-interface 854 may be determined using a best-fit algorithm. Determining the nominal model-interface 854 traversing the library-CAD model 850 may include determining a plane traversing the library-CAD model that meets a metric associated with a best-fit algorithm applied with respect to the digital representation of the workpiece-interface 120. The best-fit algorithm may compare one or more planes traversing the library-CAD model to the digital representation of the workpiece-interface 120 until a compared plane satisfies the best-fit metric. The nominal model-interface 854 may be determined based at least in part on a plane that satisfies the best-fit metric. For example, a plane that satisfies the best-fit metric may be determined to be the nominal model-interface 854.

Still referring to FIG. 18A, an exemplary method 1850 of determining and/or generating a pretreatment-CAD model may include, at step 1854, comparing the nominal model-interface 854 of the library-CAD model to a digital representation of the workpiece-interface 120 of the respective ones of the plurality of workpieces 116. The digital representation may have been previously or concurrently obtained using a vision system 102 that has a field of view 114 including the workpiece-interface 120 of the respective one of the plurality of workpieces 116. The comparison may be performed using an image matching algorithm. In some embodiments, comparing the nominal model-interface 854 to the digital representation of the workpiece-interface 120 may include, at step 1856, determining whether the nominal model-interface 854 and the digital representation of the workpiece-interface 120 sufficiently match one another. However, in some embodiments a matching step 1856 need not be included.

When included, a matching step 1856 may include comparing one or more coordinates of the nominal model-interface 854 with one or more coordinates of the digital representation of the workpiece-interface 120 and determining one or more differences therebetween. The comparing step 1854 may additionally or alternatively include comparing one or more coordinates of the one or more registration points 202 with a corresponding one or more coordinates of the nominal model-interface 854 of the library-CAD model and determining one or more differences therebetween. The registration points 202 may correspond to locations of respective ones of a plurality of workpieces 116 onto which respective ones of a plurality of extension segments 206 are to be additively printed using the additive manufacturing machine 104. The comparing step 1854 and the matching step 1856 may be performed separately or together as part of the same step. In some embodiments, the matching step 1856 may determine whether there is a partial match, a close match, or no match between the nominal model-interface 854 and the workpiece-interface 120. Alternatively, the matching step 1856 may determine whether there is any match (e.g., at least a partial match), or no match between the nominal model-interface 854 and the workpiece-interface 120.

When the matching step 1856 determines that there is at least a partial match between the nominal model-interface 854 and the workpiece-interface 120, the exemplary method 1850 may proceed to step 1858, providing for generating a model of a pretreatment region 1510 based at least in part on the nominal model-interface 854, with the model of the pretreatment region 1510 configured to expose the workpiece-interface 120 of the respective one of the plurality of workpieces 116 to a pretreatment.

When the matching step 1856 determines that there is not at least a partial match between the nominal model-interface 854 and the workpiece-interface 120, the exemplary method 1850 may return to step 1852 so as to determine a different nominal model-interface 854 and to compare the different nominal model-interface 854 to the digital representation of the workpiece-interface 120. The different nominal model-interface 854 may be selected form the same library-CAD model or a different library-CAD model.

In some embodiments, the matching step 1856 may include determining whether there is more than a partial match, such as a close match between the nominal model-interface 854 and the workpiece-interface 120. When the matching step 1856 determines that there is a close match between the nominal model-interface 854 and the workpiece-interface 120, the exemplary method 1850 may include, at step 1860, selecting the nominal model-interface 854 and/or at least a three-dimensional portion of the nominal model from the library-CAD model based at least in part on the comparison. For example, the comparison may determine that the selected nominal model-interface 854 and/or the nominal model from the library-CAD model conforms to the digital representation of the workpiece-interface 120 of the respective one of the plurality of workpieces 116, such that the selected nominal model-interface 854 may be aligned with coordinates that correspond to the digital representation of the workpiece-interface 120, and/or the selected nominal model-interface 854 may be substantially congruent with the digital representation of the workpiece-interface 120. In various exemplary embodiments, step 1860 may include selecting the nominal model as a whole for a respective workpiece, selecting a three-dimensional portion of the nominal model for a respective workpiece 116 (which may include the nominal model-interface 854), and/or selecting only the nominal model-interface 854 for the respective workpiece 116.

When a nominal model or a three-dimensional portion thereof is selected at step 1858, the exemplary method 1850 may include determining a pretreatment-CAD model from the library-CAD model. For example, a library-CAD model that includes a nominal pretreatment region 1510 may be determined to sufficiently match a workpiece-interface 120 such that a workpiece 116 may be subjected to a pretreatment that conforms to the workpiece-interface 120 without requiring transforming or extending the nominal model-interface 854 at steps 1860, 1862. In other embodiments, the exemplary method 1850 may proceed with generating a model of a pretreatment region 1510 at step 1858, for example, based at least in part on a library-CAD model that includes a model of a nominal component 204, a model of a nominal workpiece 116, or a model of a nominal extension segment 206. The model of the pretreatment region 1510 generated at step 1858 may be configured to expose a workpiece-interface 120 of a respective one of the plurality of workpieces 116 to a pretreatment.

In exemplary methods 1850 that do not include a matching step 1856, an exemplary method may proceed to generating a model of a pretreatment region 1510 based at least in part on the nominal model-interface 854 at step 1858 after having compared the nominal model-interface 854 to the digital representation of the workpiece-interface 120 at step 1854. In some embodiments, steps 1854 and 1858 may be combined into a single step, such that comparing the nominal model-interface 854 to the digital representation of the workpiece-interface 120 may be part of the process of generating a model of a pretreatment region 1510 based at least in part on the nominal model-interface 854.

After having generated and/or selected a model of a pretreatment region 1510 at steps 1858, 1860, an exemplary method 1850 may ascertain, at step 1862, whether the plurality of workpieces 116 includes another workpiece 116. When there is another workpiece, the exemplary method 1850 may include repeating the determining step 1852 and subsequent steps through to step 1862. When step 1862 indicates that there are no additional workpieces 116, the exemplary method 1850 may proceed with step 1864, which provides for outputting a model of a plurality of pretreatment regions 1510 respectively correspond to the workpiece-interfaces 120 of the respective ones of the plurality of workpieces 116. The model may be a pretreatment-CAD model, and the model may be based at least in part on the selecting and/or transforming of the nominal model-interface 854 and/or the nominal model from the library-CAD model.

The model of the plurality of pretreatment regions 1510 may be output at step 1864 concurrently as, or subsequently after, each additional pretreatment region 1510 is generated and/or selected at steps 1858, 1860. In some embodiments, outputting the model may include stitching together a plurality of models, such as models having been respectively selected and/or transformed and generated for respective ones of the plurality of workpieces 116. While an exemplary method 1850 of determining and/or generating a pretreatment-CAD model has been described with respect to a plurality of pretreatment regions 1510, it will be appreciated that a pretreatment-CAD model may also be determined and/or generated for a single pretreatment region 1510. For example, the exemplary method 1850 may be performed for a single workpiece 116.

Figure 18B:
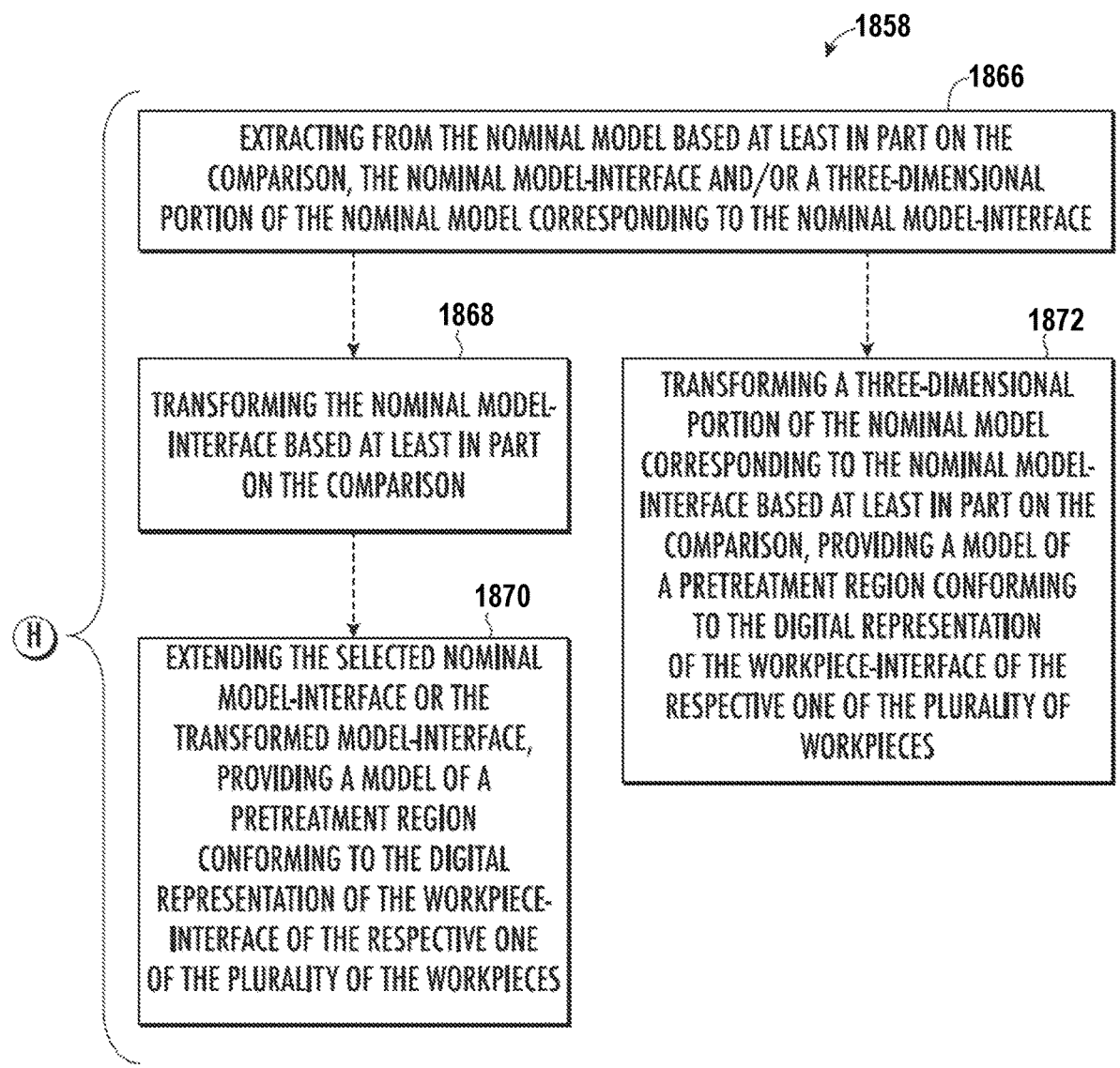

Referring now to FIG. 18B, exemplary embodiments of generating a model of a pretreatment region 1510 at step 1858 (FIG. 18A) will be further described. When generating a model of a pretreatment region 1510, one or more steps shown in FIG. 18B may be performed, and the particular steps performed may depend at least in part on whether the nominal model-interface 854 provides a partial match or a close match at step 1856 (FIG. 18A), and/or whether the nominal model-interface 854 or at least a three-dimensional portion of the nominal model are selected at step 1860 (FIG. 18A).

As shown in FIG. 18B, generating a model of a pretreatment region 1510 at step 1858 may include an extracting step 1866, such that a pretreatment region 1510 may be generated based at least in part on a nominal model-interface 854 and/or a three-dimensional portion of a nominal model corresponding to the nominal model-interface 854. Alternatively, the extracting step 1866 may be omitted, for example, such that a nominal model may itself be configured to subject a workpiece-interface 120 to a pretreatment. The step 1858 of generating a model of a pretreatment region 1510 may additionally or alternatively include a transforming step 1868, such that a nominal model-interface 854 may be conformed to the digital representation of the workpiece-interface 120. Alternatively, the transforming step 1868 may be omitted, for example, when a nominal model-interface 854 already conforms to the digital representation of the workpiece-interface 120. The step 1858 of generating a model of a pretreatment region 1510 may further additionally or alternatively include an extending step 1870, such that a nominal model-interface 854 or a transformed model-interface 804 may be extended so as to provide a three-dimensional pretreatment region 1510. Alternatively, the extending step 1870 may be omitted, for example, when generating a three-dimensional model of a pretreatment region 1510 from a three-dimensional portion of the nominal model.

In some embodiments, at step 1866, generating a model of a pretreatment region 1510 may optionally include extracting from a nominal model based at least in part on the comparison at step 1854, 1856, a nominal model-interface 854 and/or a three-dimensional portion of the nominal model corresponding to the nominal model-interface 854. The extracting step may be performed following the comparing step 1854, following the matching step 1856, or following the selecting step 1860.

In some embodiments, generating a model of a pretreatment region 1510 may optionally include, at step 1868, transforming a nominal model-interface 854 based at least in part on the comparison at step 1854, 1856, so as to provide a transformed model-interface 804 conforming to the digital representation of the workpiece-interface 120 of the respective one of the plurality of workpieces 116. The transforming step may include one more transforming operations, including aligning, altering, modifying, contorting, distorting, deforming, correcting, adjusting, revising, straightening, tilting, rotating, bending, twisting, or editing, as well as combinations of these. The particular transforming operation(s) may be selected based at least in part on the comparison such that the transforming operation(s) conforms the nominal model-interface 854 to the digital representation of the workpiece-interface 120.

The transforming step 1868 may be performed following the comparing step 1854 and/or following the matching step 1856. Additionally, or in the alternative, the transforming step 1868 may be performed following the extracting step 1866. An exemplary method 1850 may include extracting the nominal model-interface 854 from the nominal model and then proceeding to step 1868, providing for transforming the nominal model-interface 854 based at least in part on the comparison at step 1854, 1856, so as to provide a transformed model-interface 804 conforming to the digital representation of the workpiece-interface 120 of the respective one of the plurality of workpieces 116.

In some embodiments, generating a model of a pretreatment region 1510 may optionally include, at step 1870, extending the transformed model-interface 804, so as to provide a three-dimensional pretreatment region 1510. Step 1870 may be performed after having transformed the nominal model-interface 854 at step 1868. Alternatively, in some embodiments, the extending step 1870 may be combined with the transforming step 1868.

Further additionally, or in the alternative, step 1868 may follow step 1860 (FIG. 18A), providing for extending a nominal model-interface 854 that has been selected at step 1860. For example, when a nominal model-interface 854 closely matches a digital representation of a workpiece-interface 120, such as may be determined at step 1856, the transforming step 1868 may be omitted from the step of generating a model of a pretreatment region 1510 at step 1858. Regardless of whether the nominal model-interface 854 is transformed at step 1868 or selected at step 1860 with the transforming step 1868 being omitted, the extension segment 206 resulting from the extending step 1862 may be configured to be additively printed on the workpiece-interface 120 of the respective one of the plurality of workpieces 116.

In an exemplary embodiment, generating a model of a pretreatment region 1510 at step 1858 may include, at step 1866, extracting from the nominal model based at least in part on the comparison of the nominal model-interface 854 to a digital representation of workpiece-interface 120; at step 1868, transforming the nominal model-interface 854 based at least in part on the comparison so as to provide a transformed model-interface 804 conforming to the digital representation of the workpiece-interface 120; and at step 1870, extending the transformed model-interface 804 so as to provide a model of a pretreatment region 1510 that conforms to the workpiece-interface 120 of a workpiece 116.

Referring still to FIG. 18B, in another embodiment, the step 1858 of generating a model of a pretreatment region 1510 may include, at step 1866, extracting from the nominal model a three-dimensional portion of the nominal model. The three-dimensional portion may correspond to the nominal model-interface 854. For example, the three-dimensional portion may include a portion of the nominal model above and/or below the nominal model-interface 854 and may include the nominal model-interface 854. The three-dimensional portion of the nominal model below the nominal-model interface 854 may correspond to at least a portion of the workpiece-interface 120 to be subjected to additive leveling. The three-dimensional portion of the nominal model above the nominal-model interface 854 may correspond to a pretreatment layer of powder 126 applied to the workpiece-interface in connection with the pretreatment.

In some embodiments, generating a model of a pretreatment region 1510 may optionally include, at step 1872, transforming a three-dimensional portion of a nominal model corresponding to a nominal model-interface 854 based at least in part on the comparison at step 1854, 1856, so as to provide a model of a pretreatment region 1510 conforming to the digital representation of the workpiece-interface 120 of the respective one of the plurality of workpieces 116. The model of the pretreatment region 1510 may be configured to expose the workpiece-interface 120 of the respective one of the plurality of workpieces 116 to a pretreatment. The three-dimensional portion of the nominal model transformed at step 1872 may include a three-dimensional portion extracted at step 1866 or at least a three-dimensional portion of a nominal model selected at step 1860 (FIG. 18A). In some embodiments, the at least a three-dimensional portion of a nominal model selected at step 1860 may include the nominal model as a whole, such as when the nominal model is a model of a nominal pretreatment region 1510.

The step 1872 of transforming a three-dimensional portion may include transforming the nominal model-interface 854 of the three-dimensional portion, and may include one more transforming operations, including aligning, altering, modifying, contorting, distorting, deforming, correcting, adjusting, revising, straightening, tilting, rotating, bending, twisting, or editing, as well as combinations of these. The particular transforming operation(s) at step 1872 may be selected based at least in part on the comparison such that the transforming operation(s) conforms the nominal model-interface 854 to the digital representation of the workpiece-interface 120. Additionally, or in the alternative, the step 1872 of transforming a three-dimensional portion may include extending the nominal model-interface 854 so as to provide a pretreatment region 1510 conforming to the digital representation of the workpiece-interface 120 of the respective one of the plurality of workpieces 116.

Figure 19:
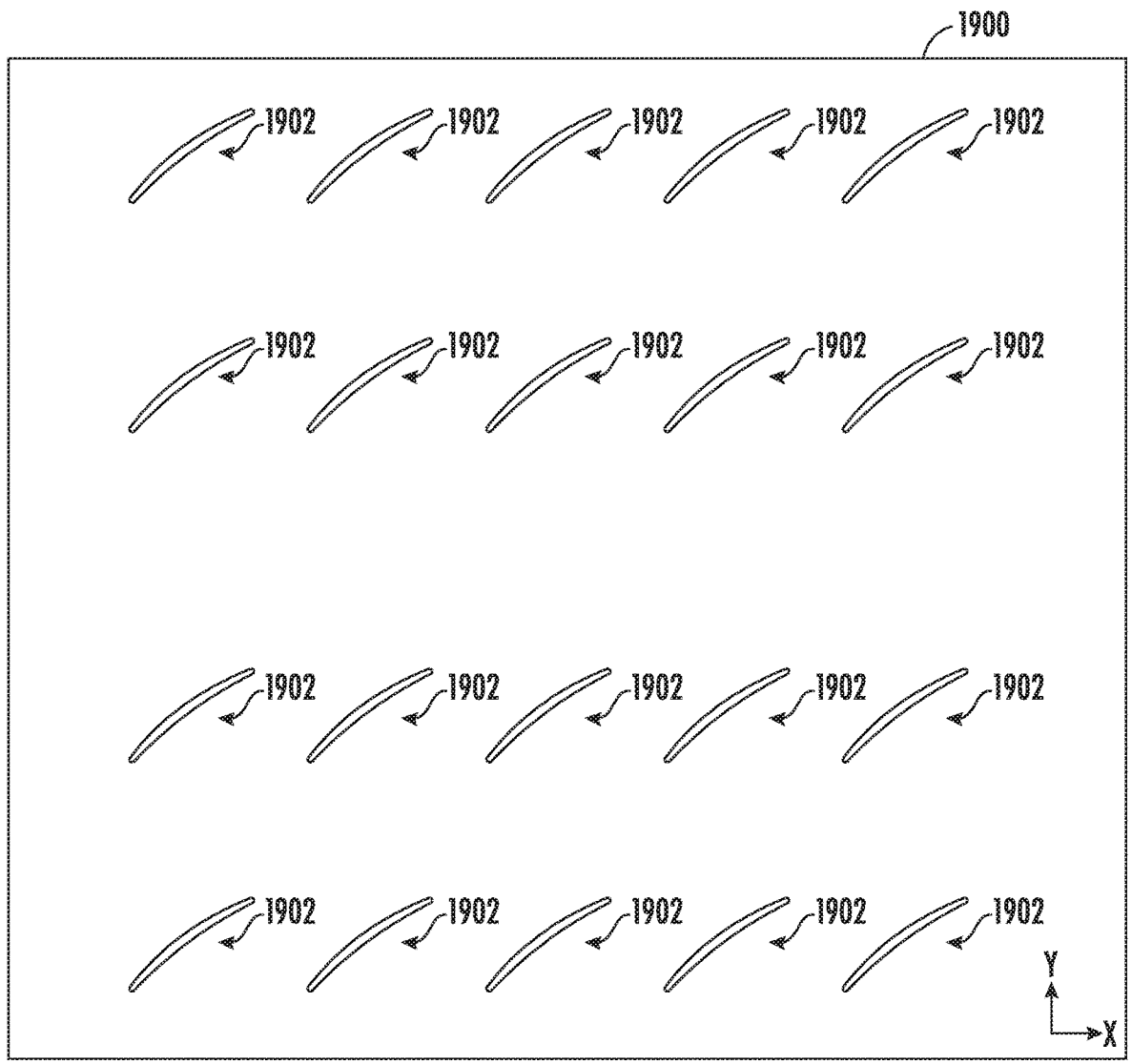
FIG. 19 schematically depicts an exemplary pretreatment command for pretreating a plurality of aberrant workpiece-interfaces.

Now referring to FIG. 19, an exemplary pretreatment command 1900 for pretreating a plurality of aberrant workpiece-interfaces 1502 is graphically depicted. As shown in FIG. 19, a pretreatment command 1900 for pretreating a plurality of aberrant workpiece-interfaces 1502 may include a plurality of scan paths 1902 respectively corresponding to the plurality of aberrant workpiece-interfaces 1502. In an exemplary embodiment, the pretreatment command 1900 includes a scan path corresponding to a model-interface 804 of a plurality of workpiece-interfaces 120 (e.g., a plurality of nominal workpiece-interfaces 120 or a plurality of aberrant workpiece-interfaces 1502). Additional pretreatment commands 1900 may be generated for each respective slice of a pretreatment as described with reference to FIG. 14.

In exemplary embodiments, the pretreatment-CAD model 1500 may include a model of a plurality of pretreatment commands 1900, in which at least a first model of a first pretreatment region 1510 differs from at least a second model of a second pretreatment region 1510. The first model of the first pretreatment region 1510 may conform to and may be substantially congruent with a first workpiece-interface 120 (e.g., a first aberrant workpiece-interface 1502) of a first workpiece 116, and the second pretreatment region 1510 may conform to and be substantially congruent with a second workpiece-interface 120 (e.g., a second aberrant workpiece-interface 1502) of a second workpiece 116. The pretreatment command 1900 may include a first scan path corresponding to a first slice of the first pretreatment region 1510 and a second scan path corresponding to a second slice of the second pretreatment region 1510, and the first scan path may differ from the second scan path. For example, the first scan path may define a first pretreatment region 1510 perimeter and the second scan path may define a second pretreatment perimeter, in which the first pretreatment perimeter differs from the second pretreatment region 1510 perimeter, such as in respect of curvature, surface area, and/or geometry.

Now referring to FIGS. 20-26, in some embodiments, an exemplary additive manufacturing system 100 may be configured to perform a calibration adjustment so as to prevent or mitigate discrepancies, biases, misalignments, calibration errors, or the like which may otherwise arise from time to time as between one or more aspects of the additive manufacturing system 100. For example, a calibration adjustment may be configured to prevent or mitigate discrepancies, biases, misalignments, calibration errors, or the like between a vision system 102 and an additive manufacturing machine 104, between a vision system 102 and one or more CAD models (e.g., extension segment-CAD models and/or pretreatment-CAD models) generated based at least in part on one or more digital images obtained using the vision system 102, or between one or more CAD models and an additive manufacturing machine 104, as well as combinations of these.

Figure 20:
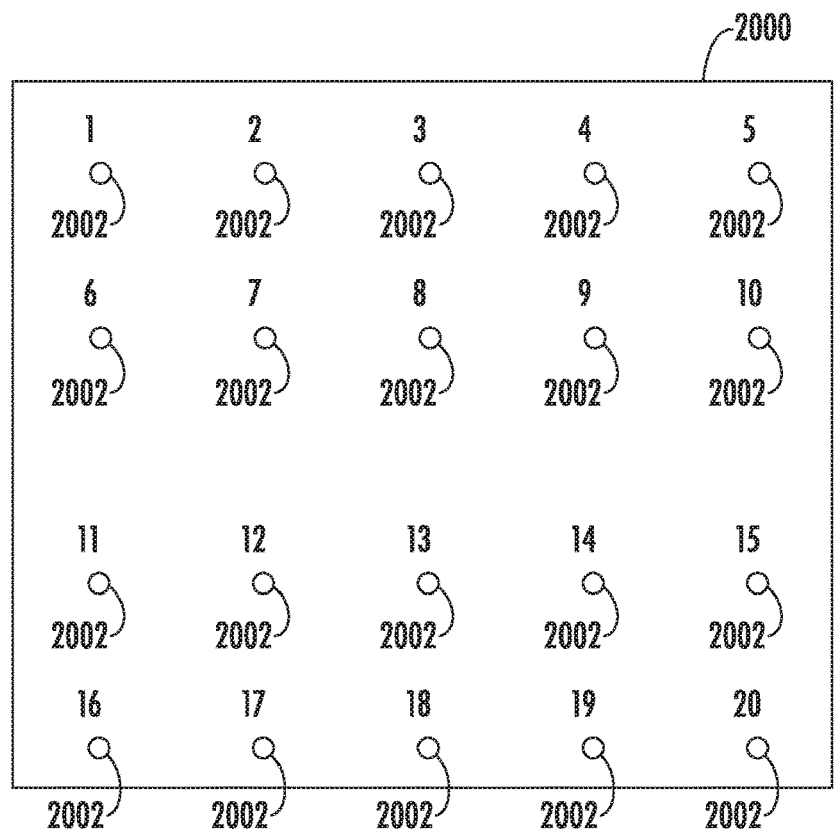
FIG. 20 schematically depicts an exemplary calibration-CAD model.

A calibration-CAD model may be utilized to calibrate an additive manufacturing system 100, such as by performing a calibration adjustment. FIG. 20 shows an exemplary calibration-CAD model 2000. The calibration-CAD model 2000 includes one or more model calibration marks 2002. The one or more model calibration marks 2002 may respectively take the form of or include a model of a registration point 202. For example, a model calibration mark 2002 may include a dot or other mark that defines a model of a registration point 202. The one or more model calibration marks 2002 may be respectively located at CAD-model coordinates corresponding respective ones of a plurality of registration points 202 (FIGS. 2A and 2B). The registration points 202 may corresponding to locations where respective ones of a plurality of workpieces 116 are to be situated when additively printing on the respective workpiece-interfaces 120 thereof.

One or more workpiece docks 210 may be respectively configured to secure a plurality of workpieces 116 to a build plate 118, and the registration points 202 may provide an indication of where the workpieces 116 are expected to be located when secured to the build plate 118 and installed in the vision system 102 and/or the additive manufacturing machine 104. A calibration-CAD model 2000 may be utilized by an additive manufacturing machine 104 to additively print model calibration marks 2002 at locations corresponding to the registration points 202, such as at locations where the workpieces 116 are expected to be located when secured to a build plate 118. For example, registration points 202 represented by model calibration marks 2002 may correspond to locations of one or more workpiece docks of a build plate 118.

In an exemplary embodiment, respective ones of the plurality of model calibration marks 2002 may have CAD model-coordinates that correspond to respective ones of the plurality of registration points 202. The model calibration marks 2002 may include a geometric shape or pattern, and at least a portion of the geometric shape or pattern may have CAD model-coordinates that correspond to a respective registration point 202. In yet another exemplary embodiment, a model calibration mark 2002 may include a contour corresponding to a perimeter of a model of an extension segment 802, such as a model-interface perimeter 806, and the contour may have CAD model-coordinates corresponding to a location of a workpiece 116 onto which an extension segment 206 may be additively printed based on the model of the extension segment 802.

Figure 21:
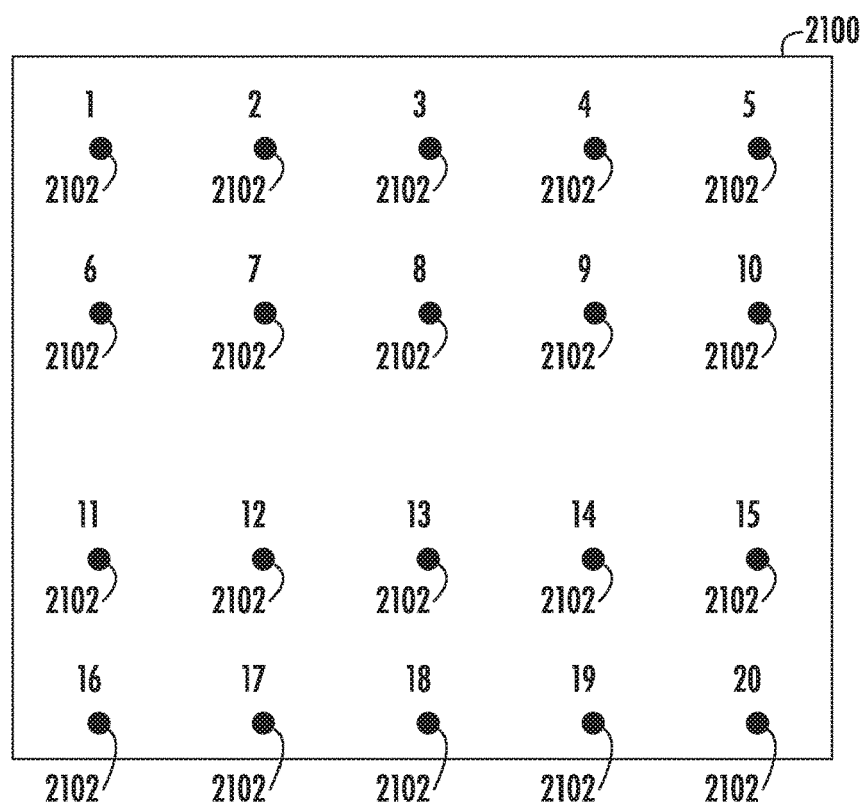
FIG. 21 schematically depicts an exemplary calibration surface that includes a plurality of printed calibration marks that were printed using an additive manufacturing machine.

FIG. 21 shows an exemplary calibration surface 2100 that includes a plurality of printed calibration marks 2102 that were printed on the calibration surface 2100 using the additive manufacturing machine 104. The printed calibration marks 2102 may have been printed on the calibration surface 2100 based at least in part on a calibration-CAD model 2000, such as the calibration-CAD model 2000 shown in FIG. 20. The calibration surface 2100 may include a build plate 118, and/or a calibration sheet applied to a build plate 118. An exemplary calibration sheet may include transfer paper, carbon paper, or other material suitable for the additive manufacturing machine 104 to print the calibration marks 2102 thereon. In an exemplary embodiment, the printed calibration marks 2102 may be printed using an additive manufacturing tool such as a laser, but without utilizing powder 126 or other additive material. For example, an additive manufacturing machine 104 may include an energy source 142 such as a laser configured to additively print the plurality of extension segments 206 by marking the calibration surface 2100 using the energy source 142.

Figures 22, 23:
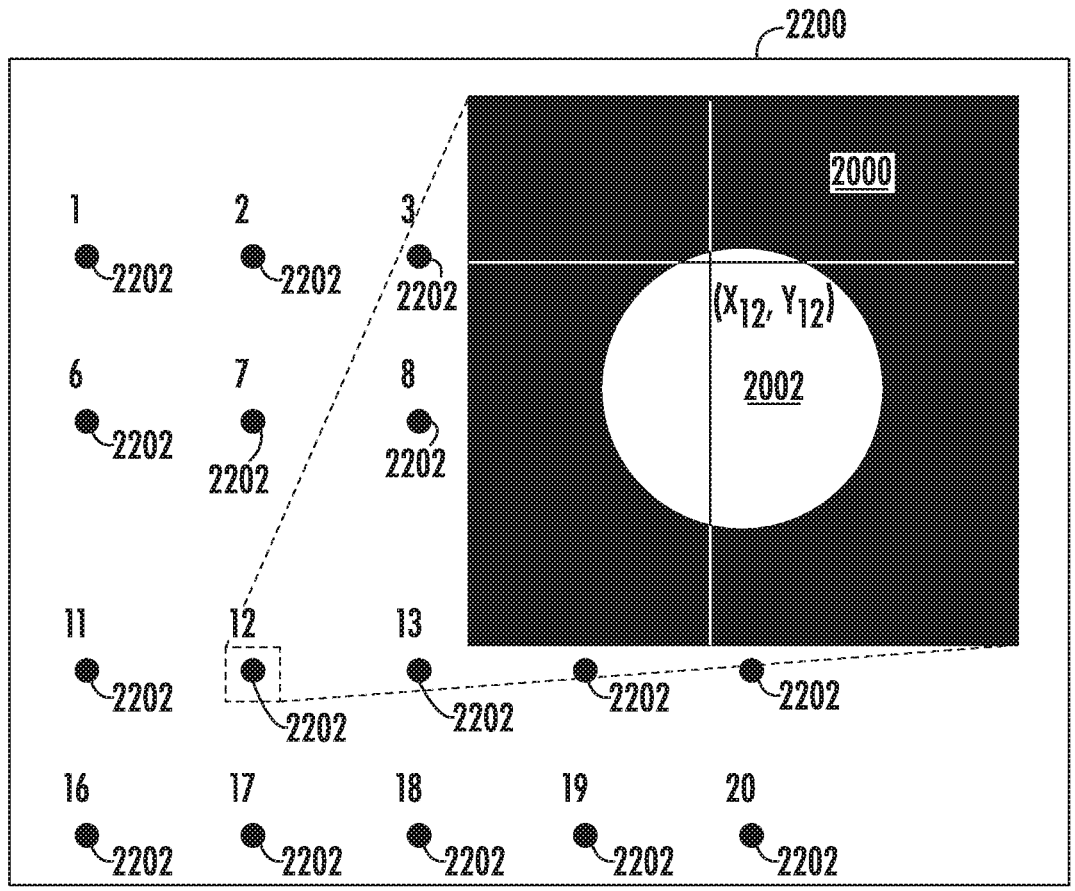
FIG. 22 schematically depicts an exemplary digital representation of a field of view that includes a plurality of calibration marks having been obtained using a vision system.
FIG. 23 schematically depicts an exemplary comparison table illustrating an exemplary comparison of respective ones of a plurality of digitally represented calibration marks to corresponding respective ones of a plurality of model calibration marks.

FIG. 22 shows an exemplary digital representation 2200 of a field of view 114 that includes a plurality of digitally represented calibration marks 2202 having been obtained using a vision system 102. The digital representation 2200 of the digitally represented calibration marks 2202 in the field of view 114 may be determined using an edge detection algorithm. An exemplary edge detection algorithm may determine the digitally represented calibration marks 2202 by determining pixels within the digital representation 2200 of the field of view 114 that have discontinuities, such as changes in brightness or contrast. As shown in FIG. 22, the digital representation 2200 of the field of view 114 may be compared to calibration-CAD model 2000. For example, respective ones of a plurality of digitally represented calibration marks 2202 may be compared to respective ones of a corresponding plurality of model calibration marks 2002.

FIG. 23 shows an exemplary comparison table 2300 illustrating an exemplary comparison of respective ones of a plurality of digitally represented calibration marks 2202 to corresponding respective ones of a plurality of model calibration marks 2002. As shown in FIG. 23, such a comparison may include determining nominal coordinates 2302 for the model calibration marks 2002 and determining measured coordinates 2304 for the digitally represented calibrations marks 2202. Such a comparison may additionally include determining a system offset 2306, such as a difference between respective digitally represented calibrations mark 2202 and corresponding model calibration marks 2002. Comparison data may be obtained for each model calibration mark 2002, such as for each corresponding registration point 202.

A system offset 2306 may indicate a discrepancy, bias, misalignment, calibration error, or the like. A calibration adjustment may be performed responsive to the comparison. The calibration adjustment may be applied to any aspect of the additive manufacturing system 100, including the vision system 102, the additive manufacturing machine 104, or a control system 106. Additionally, or in the alternative, a calibration adjustment may be applied to one or more CAD models, including a library-CAD model and/or an extension segment-CAD model 800. For example, a calibration adjustment applied to a CAD model may be configured to align coordinates of the CAD model with coordinates of the additive manufacturing system 100, such as vision system coordinates and/or additive manufacturing machine coordinates. The calibration adjustment may be applied so as to any one or more of the model calibration marks 2002 so as to align each model calibration mark 2002 with a corresponding registration point 202. For example, a calibration adjustment may be applied as to a model calibration mark 2002 when the system offset 2306 exceeds a threshold offset value.

Figure 24A:
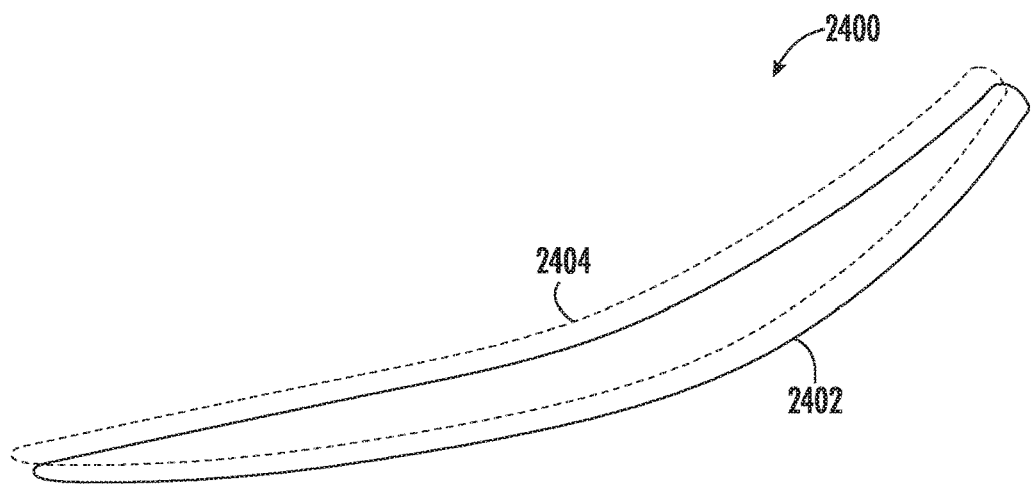
FIG. 24A schematically depicts an exemplary digital representation of a workpiece-interface obtained from a vision system before calibration and after calibration, such as for a calibration adjustment applied to the vision system.
Figure 24B:
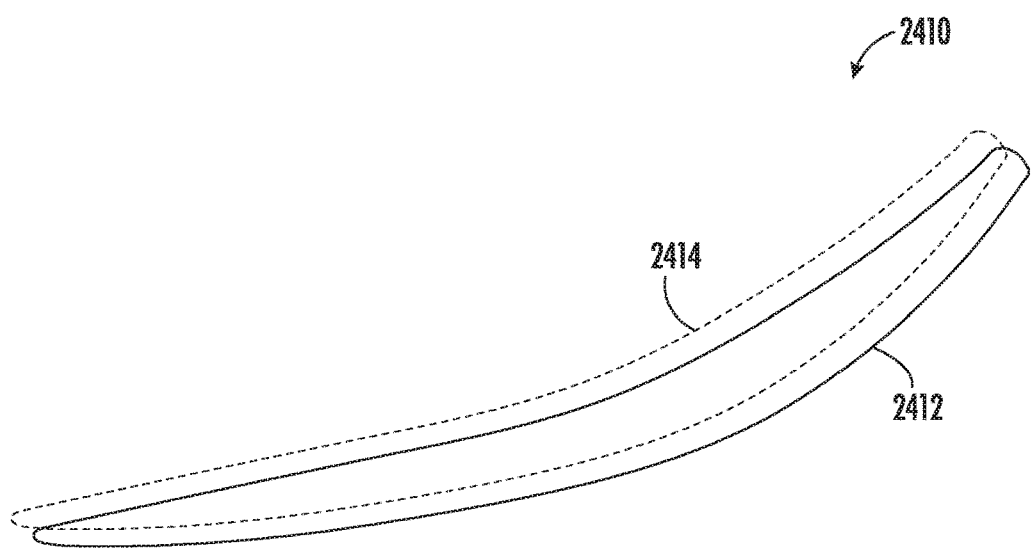
FIG. 24B schematically depicts an exemplary location of an extension segment additively printed using an additive manufacturing machine before calibration and after calibration, such as for a calibration adjustment applied to the additive manufacturing machine.
Figure 24C:
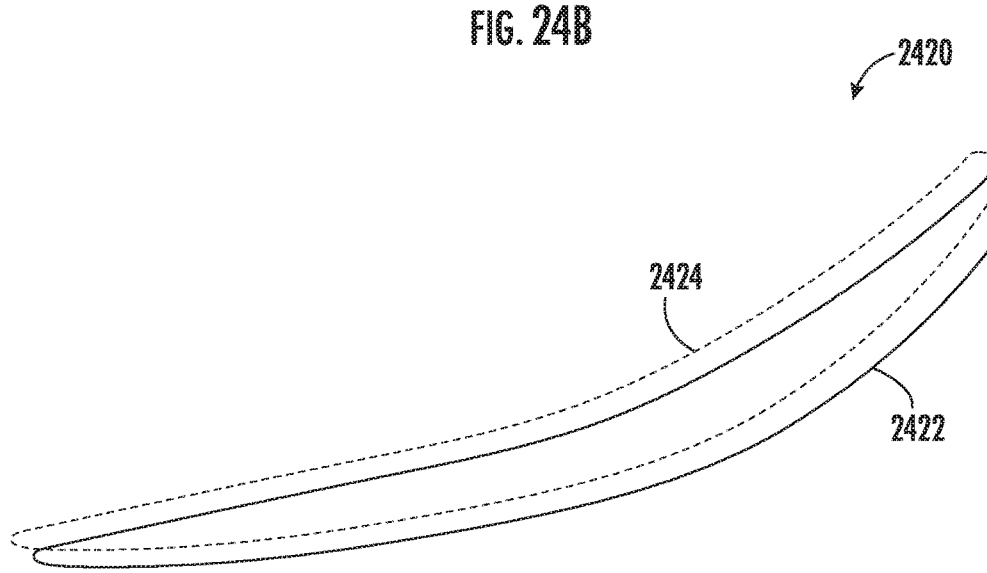
FIG. 24C schematically depicts an exemplary location of a model of an extension segment in an extension-segment CAD model before calibration and after calibration, such as for a calibration adjustment applied to the extension-segment CAD model.

Exemplary results of a calibration adjustment are schematically illustrated in FIGS. 24A-24C. FIG. 24A shows an exemplary digital representation 2400 of a workpiece-interface 120 obtained from a vision system 102 before calibration 2402 and after calibration 2404, such as for a calibration adjustment applied to the vision system 102. FIG. 24B shows an exemplary location of an extension segment 2410 additively printed using an additive manufacturing machine 104 before calibration 2412 and after calibration 2414, such as for a calibration adjustment applied to the additive manufacturing machine 104. FIG. 24C shows an exemplary location of a model of an extension segment 2420 in an extension-segment CAD model before calibration 2422 and after calibration 2424, such as for a calibration adjustment applied to the extension-segment CAD model.

Now referring to FIG. 25, exemplary methods of calibrating an additive manufacturing system 100 will be described. An exemplary method 2500 may include, at step 2502, comparing a digital representation of one or more digitally represented calibration marks 2202 to a calibration-CAD model 2000. The calibration-CAD model 2000 may include one or more model calibration marks 2002. The digital representation of the one or more digitally represented calibration marks 2202 may have been obtained using a vision system 102, and the one or more printed calibration marks 2102 may have been printed on a calibration surface 2100 according to the calibration-CAD model 2000 using an additive manufacturing machine 104. In some embodiments, the exemplary method 2500 may include obtaining the digital representation of the one or more digitally represented calibration marks 2202 using the vision system 102.

One or more calibration adjustments may be applied responsive to step 2502. For example, in some embodiments, an exemplary method 2500 may include, at step 2504, applying a calibration adjustment to one or more CAD models based at least in part on the comparison. The calibration adjustment may align the one or more CAD models with one or more coordinates of the additive manufacturing system 100, such as vision system coordinates and/or additive manufacturing machine coordinates. For example, the calibration adjustment may align the coordinates of one or more model calibration marks 2002 with coordinates of the additive manufacturing machine 104. Additionally, or in the alternative, an exemplary method 2500 may include, at step 2506, applying a calibration adjustment to the additive manufacturing system 100 based at least in part on the comparison. The calibration adjustment applied to the additive manufacturing system 100 may be configured to align one or more coordinates of the vision system 102 with one or more coordinates of the additive manufacturing machine 104.

In an exemplary embodiment, a method 2500 of calibrating an additive manufacturing system 100 may include printing one or more model calibration marks 2002 on a calibration surface 2100 according to a calibration-CAD model 2000 using an additive manufacturing machine 104. The model calibration marks 2002 may be printed on the calibration surface 2100 at a plurality of registration points 202 according to the calibration-CAD model 2000. The registration points 202 may have CAD-model coordinates respectively corresponding to locations where respective ones of a plurality of workpieces 116 are to be situated when additively printing respective ones of a plurality of extension segments 206 onto the respective ones of the plurality of workpieces 116.

The digital representation of the digitally represented calibration marks 2202 may be compared to the model calibration marks 2002 in the calibration CAD-model 2000 based at least in part on coordinates and/or dimensions of the model calibration marks 2002 and digitally represented calibration marks 2202. For example, comparing the digital representation of the one or more digitally represented calibration marks 2202 to the model calibration marks 2002 in the calibration-CAD model 2000 may include comparing one or more coordinates of the one or more digitally represented calibration marks 2202 in the digital representation thereof with a corresponding one or more coordinates of the model calibration marks 2002 in the calibration-CAD model 2000, and determining one or more differences therebetween. The one or more coordinates may include coordinates of respective ones of a plurality of registration points 202 respectively corresponding to locations of respective ones of a plurality of workpieces 116 onto which respective ones of a plurality of extension segments 206 are to be additively printed using the additive manufacturing machine 104. Additionally, or in the alternative, comparing the digital representation of the one or more digitally represented calibration marks 2202 to the model calibration marks 2002 in the calibration-CAD model 2000 may include comparing one or more dimensions of the one or more digitally represented calibration marks 2202 in the digital representation thereof with a corresponding one or more dimensions of the one or more model calibration marks 2002 in the calibration-CAD model 2000, and determining one or more differences therebetween.

Figure 25:
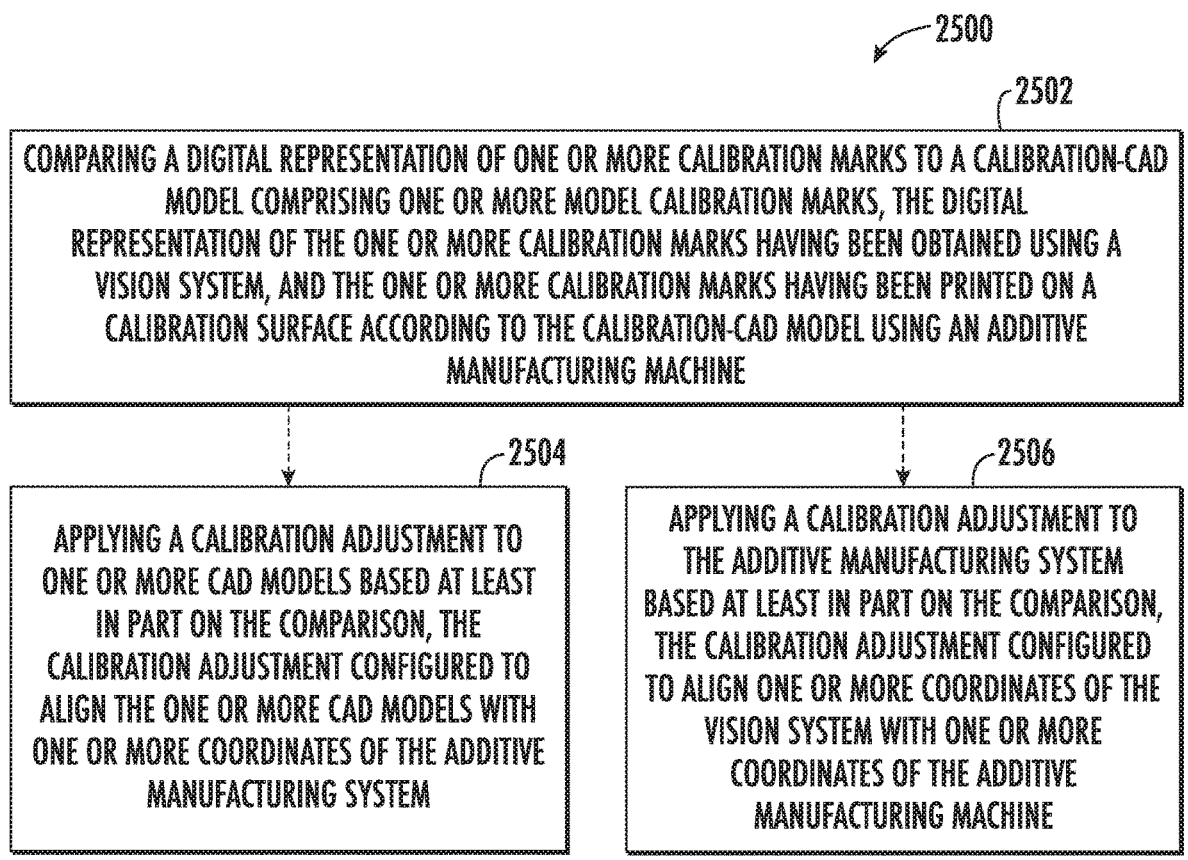
FIG. 25 shows a flowchart depicting an exemplary method of calibrating an additive manufacturing system.

Still referring to FIG. 25, the step 2504 of applying a calibration adjustment to one or more CAD models may include transforming at least a portion of the one or more CAD models based at least in part on the comparison at step 2502. The transforming may include rotating, bending, twisting, shifting, scaling, smoothing, aligning, offsetting, and/or morphing at least a portion of the one or more CAD models.

In an exemplary embodiment, the one or more CAD models may include an extension segment-CAD model 800 that has a model of a plurality of extension segments 802 respectively located at CAD model-coordinates corresponding to respective ones of a plurality of registration points 202 respectively corresponding to locations where respective ones of a plurality of workpieces 116 are to be situated when additively printing respective ones of a plurality of extension segments 206 onto the respective ones of the plurality of workpieces 116. In some embodiments, applying a calibration adjustment to one or more CAD models at step 2504 may include transforming at least a portion of the extension segment-CAD model 800 based at least in part on the comparison so as to align respective ones of the plurality models of extension segments 802 of the extension segment-CAD model 800 with the respective ones of the plurality of registration points 202 of the additive manufacturing system 100.

In still another exemplary embodiment, applying a calibration adjustment to one or more CAD models at step 2504 may include generating an extension segment-CAD model 800. The generated extension segment-CAD model 800 may include a model of a plurality of extension segments 802 configured to be additively printed onto respective ones of a plurality of workpieces 116, and the plurality of models of extension segments 802 may be respectively located at CAD model-coordinates determined based at least in part on the calibration adjustment. The plurality of models of extension segments 802 may be aligned with respective ones of a plurality of registration points 202 of the additive manufacturing system 100. The plurality of registration points 202 may correspond to locations where respective ones of a plurality of workpieces 116 are to be situated when additively printing respective ones of a plurality of extension segments 206 onto the respective ones of the plurality of workpieces 116.

Figure 26:
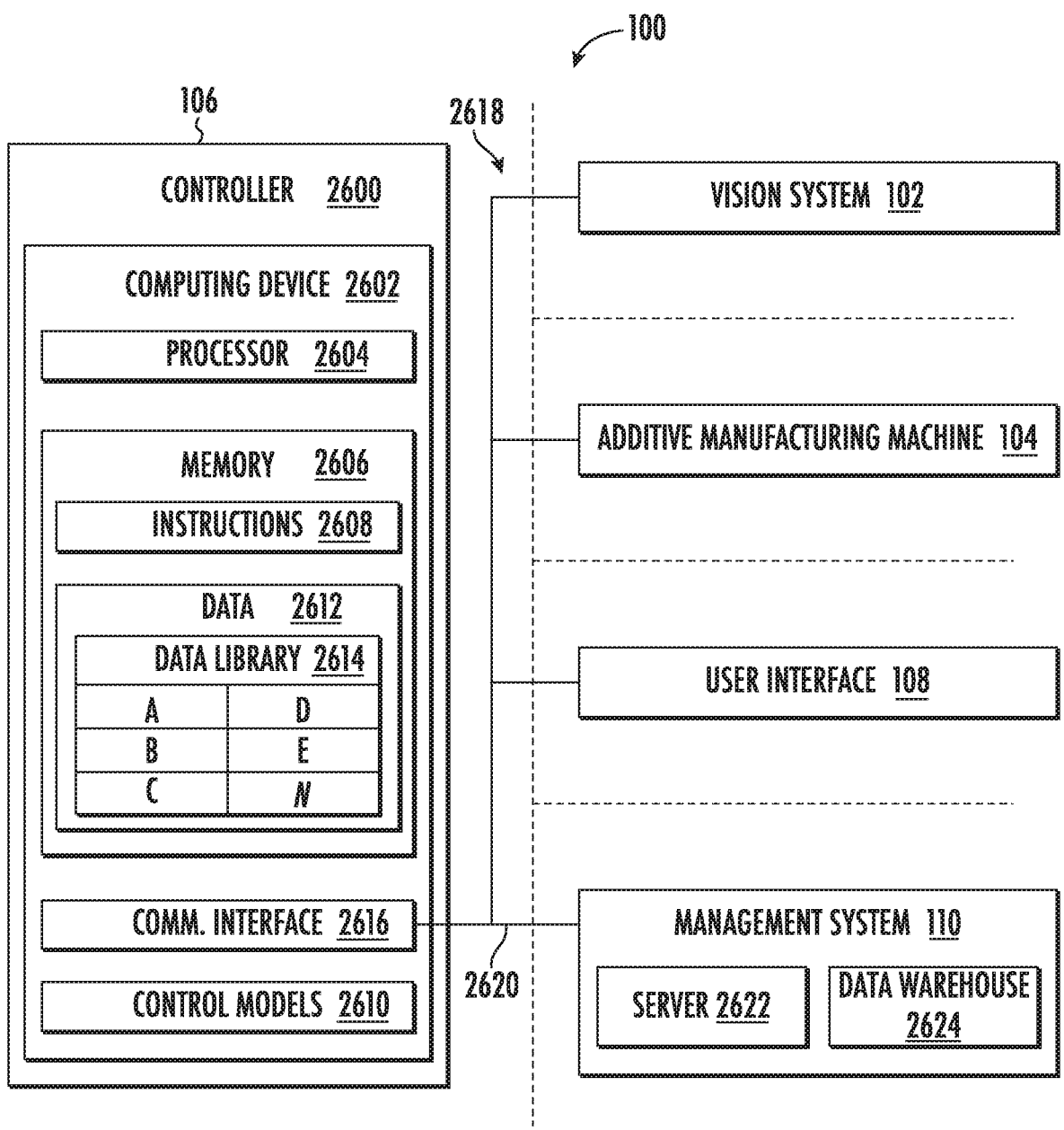
FIG. 26 shows a block diagram depicting an exemplary control system of an additive manufacturing system.

Now referring to FIG. 26, further features of an additive manufacturing system 100 will be described. As shown in FIG. 26, an exemplary additive manufacturing system 100 may include a control system 106. An exemplary control system 106 includes a controller 2600 communicatively coupled with a vision system 102 and/or an additive manufacturing machine 104. The controller 2600 may also be communicatively coupled with a user interface 108 and/or a management system 110.

The controller 2600 may include one or more computing devices 2602, which may be located locally or remotely relative to the additive vision system 102 and/or the additive manufacturing machine 104. The one or more computing devices 2602 may include one or more processors 2604 and one or more memory devices 2606. The one or more processors 2604 may include any suitable processing device, such as a microprocessor, microcontroller, integrated circuit, logic device, and/or other suitable processing device. The one or more memory devices 2606 may include one or more computer-readable media, including but not limited to non-transitory computer-readable media, RAM, ROM, hard drives, flash drives, and/or other memory devices.

The one or more memory devices 2606 may store information accessible by the one or more processors 2604, including machine-executable instructions 2608 that can be executed by the one or more processors 2604. The instructions 2608 may include any set of instructions which when executed by the one or more processors 2604 cause the one or more processors 2604 to perform operations. In some embodiments, the instructions 2608 may be configured to cause the one or more processors 2604 to perform operations for which the controller 2600 and/or the one or more computing devices 2602 are configured. Such operations may include controlling the vision system 102 and/or the additive manufacturing machine 104, including, for example, causing the vision system 102 to capture a digital representation of a field of view 114 that includes a workpiece-interface 120 of one or more workpieces 116, generating one or more print commands 1300 based at least in part on the one or more digital representations of the one or more fields of view 114, and causing the additive manufacturing machine 104 to additively print respective ones of the plurality of extension segments 206 on corresponding respective ones of the plurality of workpieces 116. For example, such instructions 2608 may include one or more print commands 1300, which, when executed by an additive manufacturing machine 104, cause an additive-manufacturing tool to be oriented with respect to a scan path that includes a plurality of scan path coordinates and to additively print at certain portions of the scan path so as to additively print a layer of the plurality of extension segments 206. The layer of the plurality of extension segments 206 may correspond to the slice of the extension segment-CAD model 800. Such operations may additionally or alternatively include calibrating an additive manufacturing system 100.

Such operations may further additionally or alternatively include receiving inputs from the vision system 102, the additive manufacturing machine 104, the user interface 108, and/or the management system 110. Such operations may additionally or alternatively include controlling the vision system 102 and/or the additive manufacturing machine 104 based at least in part on the inputs. Such operations may be carried out according to control commands provided by a control model 2610. As examples, exemplary control models 2610 may include one or more control models 2610 configured to determine a workpiece-interface 120 of each of a plurality of workpieces 116 from one or more digital representations of one or more fields of view 114; one or more control models 2610 configured to determine and/or generate an extension segment-CAD model 800 based at least in part on the one or more digital representations of the one or more fields of view 114; and/or one or more control models 2610 configured to slice an extension segment-CAD model 800 into a plurality of slices and/or to determine or generate a scan path and an additive printing area for each of the plurality of slices. The machine-executable instructions 2608 can be software written in any suitable programming language or can be implemented in hardware. Additionally, and/or alternatively, the instructions 2608 can be executed in logically and/or virtually separate threads on processors 2604.

The memory devices 2606 may store data 2612 accessible by the one or more processors 2604. The data 2612 can include current or real-time data, past data, or a combination thereof. The data 2612 may be stored in a data library 2614. As examples, the data 2612 may include data associated with or generated by additive manufacturing system 100, including data 2612 associated with or generated by a controller 2600, the vision system 102, the additive manufacturing machine 104, the user interface 108, the management system 110, and/or a computing device 2602. The data 2612 may also include other data sets, parameters, outputs, information, associated with an additive manufacturing system 100, such as those associated with the vision system 102, the additive manufacturing machine 104, the user interface 108, and/or the management system 110.

The one or more computing devices 2602 may also include a communication interface 2616, which may be used for communications with a communications network 2618 via wired or wireless communication lines 2620. The communication interface 2616 may include any suitable components for interfacing with one or more network(s), including for example, transmitters, receivers, ports, controllers, antennas, and/or other suitable components. The communication interface 2616 may allow the computing device 2602 to communicate with the vision system 102, the additive manufacturing machine 104. The communication network 2618 may include, for example, a local area network (LAN), a wide area network (WAN), SATCOM network, VHF network, a HF network, a Wi-Fi network, a WiMAX network, a gatelink network, and/or any other suitable communications network for transmitting messages to and/or from the controller 2600 across the communication lines 2620. The communication lines 2620 of communication network 2618 may include a data bus or a combination of wired and/or wireless communication links.

The communication interface 2616 may additionally or alternatively allow the computing device 2602 to communicate with a user interface 108 and/or a management system 110. The management system 110, which may include a server 2622 and/or a data warehouse 2624. As an example, at least a portion of the data 2612 may be stored in the data warehouse 2624, and the server 2622 may be configured to transmit data 2612 from the data warehouse 2624 to the computing device 2602, and/or to receive data 2612 from the computing device 2602 and to store the received data 2612 in the data warehouse 2624 for further purposes. The server 2622 and/or the data warehouse 2624 may be implemented as part of a control system 106.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of additively printing an extension segment on a workpiece,
the method comprising:
pretreating a workpiece-interface of a workpiece using an energy beam source from an additive manufacturing machine,
providing a pretreated workpiece-interface having received a pretreatment,
the pretreatment remediating an aberrant feature of the workpiece and/or the workpiece-interface; and
additively printing an extension segment on the pretreated workpiece-interface using an energy beam emitted from the energy beam from the additive manufacturing machine;
wherein the aberrant feature comprises one or more aberrant regions of the workpiece interface that differ in elevation and/or that are at least partially askew relative to a congruent region of the workpiece-interface,
the one or more aberrant regions having been determined from one or more digital representations of the workpiece-interface captured by a vision system, and
wherein the pretreatment comprises additive-interface captured by a vision system; and
wherein the pretreatment comprises additive-leveling at least a portion of the workpiece-interface comprising a first one of the one or more aberrant regions and/or melt-leveling at least a portion of the workpiece-interface comprising a second one of the one or more aberrant regions.

2. The method of claim 1, comprising:
determining the workpiece-interface from the one or more digital representations captured by vision system; and
transmitting to the additive manufacturing machine,
one or more pretreatment commands configured to expose the workpiece-interface to the pretreatment.

3. The method of claim 2, comprising:
transmitting to the additive manufacturing machine,
one or more print commands configured to additively print the extension segment on the pretreated workpiece-interface.

4. The method of claim 3, comprising:
generating the one or more pretreatment commands based at least in part on the one or more digital representations of the workpiece-interface; and/or
generating the one or more print commands based at least in part on the one or more digital representations of the workpiece-interface.

5. The method of claim 2, comprising:
determining the pretreated workpiece-interface from the one or more digital representations of the pretreated workpiece-interface having been captured by the vision system; and
transmitting to the additive manufacturing machine, one or more print commands configured to additively print the extension segment on the pretreated workpiece-interface.

6. The method of claim 1,
wherein the pretreatment comprises:
heat-conditioning at least a portion of the workpiece-interface.

7. The method of claim 1,
wherein the pretreatment comprises:
removing oxidation, contaminants, debris, and/or subtractive modification artifacts from at least a portion of the workpiece-interface.

8. The method of claim 1, wherein the pretreatment comprises:
modifying the grain structure of the workpiece at or near the workpiece-interface.

9. The method of claim 1, wherein the pretreatment comprises:
additive-leveling a first portion of the workpiece-interface comprising a first aberrant region; and
melt-leveling a second portion of the workpiece-interface comprising a second aberrant region.

10. The method of claim 1, comprising:
pretreating the workpiece-interface using the energy beam source to emit an energy beam at a first energy density and additively printing the extension segment on the pretreated workpiece-interface using the energy beam at a second energy density, wherein the first energy density is from about 10% to about 100% of the second energy density.

11. The method of claim 1, comprising:
pretreating the workpiece-interface using the energy mean source to emit an energy beam at a first energy density and additively printing the extension segment on the pretreated workpiece-interface using the energy beam at a second energy density, wherein the first energy density is from about 100% to about 300% of the second energy density.

12. The method of claim 1, comprising:
additively printing the extension segment on the pretreated workpiece-interface using an energy density of from about 70 J/mm $\wedge$3 to about 200 J/mm $\wedge$3.

13. The method of claim 1,
wherein the extension segment exhibits a relative density of from about 0.950 to about 0.9999.

14. The method of claim 1, comprising:
pretreating the workpiece-interface based at least in part on a pretreatment-CAD model, the pretreatment-CAD model generated and/or determined based at least in part on the one or more digital representations of the workpiece-interface; and/or
additively printing the extension segment on the pretreated workpiece-interface based at least in part on an extension segment-CAD model, the extension segment-CAD model generated and/or determined based at least in part on the one or more digital representations of the workpiece-interface.

15. The method of claim 1,
wherein the workpiece comprises a compressor blade and/or a turbine bladed and wherein the extension segment comprises a blade tip.

16. An additive manufacturing system, comprising:
a controller operably coupled to a vision system and an additive manufacturing machine, the controller comprising one or more non-transitory computer readable medium and one or more processors, the one or more non-transitory computer readable medium comprising computer-executable instructions, which, when executed by the one or more processors, cause the additive manufacturing system to perform a method comprising:

pretreating a workpiece-interface using an energy beam emitted from an energy beam source of the additive manufacturing machine, providing a pretreated workpiece-interface, wherein pretreating the workpiece-interface comprises remediating an aberrant feature of the workpiece and/or the workpiece-interface at least in part by additive-leveling the workpiece-interface and/or melt-leveling the workpiece-interface; and additively printing an extension segment on the pretreated workpiece-interface using an energy beam emitted from the energy beam source of the additive manufacturing machine;

wherein the aberrant feature comprises one or more aberrant regions of the workpiece-interface that differ in elevation and/or that are at least partially askew relative to a congruent region of the workpiece-interface, the one or more aberrant regions having been determined from one or more digital representations of the workpiece captured by the vision system; and wherein the pretreatment comprises additive-leveling at least a portion of the workpiece-interface comprising a first one of the one or more aberrant regions and/or melt-leveling at least a portion of the workpiece-interface comprising a second one of the one or more aberrant regions.

17. The additive manufacturing system of claim 16,

Wherein the computer-executable instructions,

When executed by the one or more processes, cause the additive manufacturing system to perform the method, the method further comprising:

determining the workpiece-interface from the one or more digital representations captured by the vision system; and transmitting the additive manufacturing machine, one or more pretreatment commands configured to expose the workpiece-interface to the pretreatment.

18. The additive manufacturing system of claim 17, wherein the computer-executable instructions, when executed by the one or more processors, cause the additive manufacturing system to perform the method, the method further comprising:

determining the pretreated workpiece-interface from the one or more digital representations of the pretreated workpiece-interface having been captured by the vision system; and transmitting to the additive manufacturing machine, one or more print commands configured to additively print the extension segment on the pretreated workpiece-interface.

19. The additive manufacturing system of claim 16, wherein the computer-executable instructions, when executed by the one or more processors, cause the additive manufacturing system to perform the method, the method further comprising:

pretreating the workpiece-interface using an energy beam emitted from the energy source at a first energy density, and additively printing the extension segment on the pretreated workpiece-interface using an energy beam emitted from the energy beam source at a second energy density, wherein the first energy density is from about 10% to about 100% of the second energy density.

20. A non-transitory computer readable medium comprising computer-executable instructions, which, when executed by one or more processors associated with an additive manufacturing machine, cause the additive manufacturing machine to perform a method comprising:

pretreating a workpiece-interface using an energy beam from the additive manufacturing machine, providing a pretreated workpiece-interface, wherein pretreat the workpiece-interface comprises remediating an aberrant feature of the workpiece and/or the workpiece-interface at least in part by additive-leveling the workpiece-interface and/or melt-leveling the workpiece-interface; and additively printing an extension segment on the pretreated workpiece-interface using an energy beam emitted from the energy beam source of from the additive manufacturing machine;

wherein the aberrant feature comprises one or more aberrant regions of the workpiece-interface that differ in elevation and/or that are at least partially askew relative to a congruent region of the workpiece-interface, the one or more aberrant regions having been determined from one or more digital representations of the workpiece-interface captured by a vision system; and wherein the pretreatment comprises additive-leveling at least a portion of the workpiece-interface comprising a first one of the one or more aberrant regions and/or melt-leveling at least a portion of the workpiece-interface comprising a second one of the one or more aberrant regions.

* * * * *